United States Patent
Tezuka

(10) Patent No.: US 8,811,773 B2
(45) Date of Patent: Aug. 19, 2014

(54) IMAGE ENLARGEMENT APPARATUS, METHOD, INTEGRATED CIRCUIT, AND PROGRAM

(75) Inventor: Tadanori Tezuka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/533,160

(22) Filed: Jun. 26, 2012

(65) Prior Publication Data

US 2012/0263384 A1    Oct. 18, 2012

Related U.S. Application Data

(62) Division of application No. 12/918,109, filed as application No. PCT/JP2009/007054 on Dec. 21, 2009, now Pat. No. 8,233,744.

(30) Foreign Application Priority Data

| Dec. 22, 2008 | (JP) | 2008-325210 |
| Aug. 21, 2009 | (JP) | 2009-191549 |
| Aug. 21, 2009 | (JP) | 2009-191550 |

(51) Int. Cl.
| G06K 9/32 | (2006.01) |
| G06K 9/40 | (2006.01) |
| H04N 7/01 | (2006.01) |
| G06T 3/00 | (2006.01) |
| H04N 1/40 | (2006.01) |
| G09G 5/00 | (2006.01) |

(52) U.S. Cl.
CPC ............. *H04N 1/40068* (2013.01); *G09G 5/00* (2013.01); *H04N 7/012* (2013.01); *G06T 3/00* (2013.01); *G09G 2340/0407* (2013.01); *H04N 7/0142* (2013.01); *H04N 7/0125* (2013.01); *H04N 7/0135* (2013.01); *G09G 2320/0242* (2013.01)

USPC .......................................... 382/298; 382/266

(58) Field of Classification Search
CPC ....... G06T 5/001; G06T 3/4007; G06T 5/003; G06T 5/004; G06T 2207/20192; G06T 3/403; G06T 5/00; G06T 5/002; H04N 5/142; H04N 2209/046; H04N 1/40068; H04N 1/6027; H04N 7/0135; H04N 7/0142; H04N 1/409; H04N 1/4092; H04N 5/357; H04N 1/3935; G06K 9/40

See application file for complete search history.

(56) References Cited

U.S. PATENT DOCUMENTS

| 5,125,072 A | * | 6/1992 | Ng .................................. 358/1.13 |
| 5,131,057 A | * | 7/1992 | Walowit et al. ................ 382/264 |

(Continued)

FOREIGN PATENT DOCUMENTS

| CN | 1668108 | 9/2005 |
| CN | 1804901 | 7/2006 |

(Continued)

OTHER PUBLICATIONS

International Search Report issued Mar. 9, 2010 in International (PCT) Application No. PCT/JP2009/007054.

(Continued)

*Primary Examiner* — Manav Seth
(74) *Attorney, Agent, or Firm* — Wenderoth, Lind & Ponack, L.L.P.

(57) ABSTRACT

An image enlargement apparatus includes an interpolation unit that generates a high-resolution interpolation image from a low-resolution image; and a synthesis unit that generates a first high-resolution image by synthesizing the interpolation image and a correction amount. Additionally, a re-correction unit generates a second high-resolution image by re-correcting the first high-resolution image using a generated feature value.

8 Claims, 38 Drawing Sheets

(56) References Cited

U.S. PATENT DOCUMENTS

| | | | | |
|---|---|---|---|---|
| 5,469,274 | A * | 11/1995 | Iwasaki et al. | 358/450 |
| 5,617,224 | A * | 4/1997 | Ichikawa et al. | 358/530 |
| 5,657,402 | A * | 8/1997 | Bender et al. | 382/284 |
| 5,912,708 | A * | 6/1999 | Kondo et al. | 348/415.1 |
| 6,002,810 | A * | 12/1999 | Wakisawa et al. | 382/298 |
| 6,151,425 | A * | 11/2000 | Wakisawa et al. | 382/298 |
| 6,160,845 | A * | 12/2000 | Kondo et al. | 375/240 |
| 6,339,615 | B1 * | 1/2002 | Kondo et al. | 375/240.14 |
| 6,389,180 | B1 * | 5/2002 | Wakisawa et al. | 382/298 |
| 6,587,602 | B2 * | 7/2003 | Wakisawa et al. | 382/298 |
| 6,646,760 | B1 * | 11/2003 | Hanihara | 358/1.9 |
| 6,714,688 | B1 * | 3/2004 | Gallagher et al. | 382/266 |
| 6,760,489 | B1 | 7/2004 | Kuwata | |
| 6,795,587 | B2 * | 9/2004 | Slavin | 382/260 |
| 6,848,087 | B2 * | 1/2005 | Sengupta et al. | 382/278 |
| 6,898,332 | B2 * | 5/2005 | Matsuhira | 382/284 |
| 6,933,970 | B2 * | 8/2005 | Koshiba et al. | 348/273 |
| 6,961,479 | B1 * | 11/2005 | Takarada | 382/300 |
| 6,985,641 | B1 * | 1/2006 | Michel et al. | 382/298 |
| 7,003,176 | B1 * | 2/2006 | Suzuki et al. | 382/299 |
| 7,031,515 | B2 * | 4/2006 | Fuchigami | 382/165 |
| 7,068,396 | B1 * | 6/2006 | Gallagher et al. | 358/3.01 |
| 7,103,228 | B2 * | 9/2006 | Kraft et al. | 382/274 |
| 7,149,369 | B2 * | 12/2006 | Atkins | 382/299 |
| 7,330,209 | B2 * | 2/2008 | Osamato | 348/273 |
| 7,340,098 | B2 * | 3/2008 | Motomura et al. | 382/190 |
| 7,352,910 | B2 * | 4/2008 | Kanamori et al. | 382/254 |
| 7,409,653 | B2 * | 8/2008 | Sengupta et al. | 716/111 |
| 7,466,871 | B2 | 12/2008 | Hosoda et al. | |
| 7,474,794 | B2 * | 1/2009 | Boneh et al. | 382/239 |
| 7,508,987 | B2 * | 3/2009 | Nishida | 382/204 |
| 7,567,723 | B2 | 7/2009 | Sakakima | |
| 7,583,859 | B2 * | 9/2009 | Suzuki et al. | 382/298 |
| 7,609,912 | B2 * | 10/2009 | Chae | 382/300 |
| 7,613,363 | B2 * | 11/2009 | Platt et al. | 382/299 |
| 7,792,384 | B2 * | 9/2010 | Gomi et al. | 382/266 |
| 7,916,937 | B2 * | 3/2011 | Utsugi et al. | 382/162 |
| 8,098,961 | B2 | 1/2012 | Ida et al. | |
| 8,107,765 | B2 * | 1/2012 | Hwang et al. | 382/275 |
| 8,294,812 | B2 * | 10/2012 | Okada et al. | 348/362 |
| 8,594,424 | B2 * | 11/2013 | Hwang et al. | 382/173 |
| 2002/0030690 | A1 | 3/2002 | Someya et al. | |
| 2004/0135798 | A1 | 7/2004 | Someya et al. | |
| 2005/0156944 | A1 | 7/2005 | Someya et al. | |
| 2005/0157940 | A1 | 7/2005 | Hosoda et al. | |
| 2005/0201632 | A1 | 9/2005 | Sakakima | |
| 2007/0116375 | A1 * | 5/2007 | Utsugi et al. | 382/264 |
| 2008/0267533 | A1 | 10/2008 | Ida et al. | |
| 2009/0116763 | A1 * | 5/2009 | Hwang et al. | 382/266 |
| 2009/0148063 | A1 | 6/2009 | Hosoda et al. | |

FOREIGN PATENT DOCUMENTS

| | | |
|---|---|---|
| JP | 11-298718 | 10/1999 |
| JP | 2000-115526 | 4/2000 |
| JP | 2002-158869 | 5/2002 |
| JP | 2005-182199 | 7/2005 |
| JP | 2008-276393 | 11/2008 |
| JP | 2010-041497 | 2/2010 |

OTHER PUBLICATIONS

Kazumasa Enami et al., "A Consideration on Various Image Interpolation Functions and Their Image Qualities", The institute of electronics, information and communication engineers, Nov. 20, 1986 (with English translation).

An Office Action, issued Aug. 13, 2013 along with a Search Report (with English translation) in a Chinese application that is a foreign counterpart to the present application.

* cited by examiner

FIG. 3

| -1 | 1 |
|---|---|
| -1 | 1 |

FIG. 4

| -1 | -1 |
|---|---|
| 1 | 1 |

FIG. 5

| 0 | -1 | 0 |
|---|---|---|
| -1 | 5 | -1 |
| 0 | -1 | 0 |

FIG. 6

| -1 | -1 | -1 |
|---|---|---|
| -1 | 8 | -1 |
| -1 | -1 | -1 |

IMAGE ENLARGEMENT APPARATUS, METHOD, INTEGRATED CIRCUIT, AND PROGRAM

This application is a Divisional of U.S. application Ser. No. 12/918,109, now U.S. Pat. No. 8,233,744 which is the U.S. national stage of International application No. PCT/JP2009/007054, filed Dec. 21, 2009, which is hereby incorporated by reference in its entirety.

BACKGROUND OF INVENTION

1. Technical Field

The present invention relates to an image enlargement method performed by an apparatus that converts a low-resolution image to a high-resolution image, such as a display apparatus that enlarges an inputted low-resolution image according to a resolution of a display device, an image output apparatus such as a printer that enlarges a low-resolution image and outputs the enlarged image, and an imaging apparatus that enlarges an image included in a moving image to generate a still image.

2. Background Art

Conventionally, various methods have been proposed as interpolation enlargement techniques of converting an inputted low-resolution image to a high-resolution image. NPL 1 discloses representative techniques including a nearest neighbor method, a bilinear method, and a bicubic convolution method. In the nearest neighbor method, an interpolation pixel value is determined by selecting a low-resolution pixel nearest an interpolation pixel position. In the bilinear method, the interpolation pixel value is determined by linear interpolation with distances between the interpolation pixel position and four pixels of the low-resolution image that surround the interpolation pixel position. In the bicubic convolution method, the interpolation pixel value is determined by using a sampling function ($f(x)=\sin c(x)$), from neighboring N×N pixels of the low-resolution image that surround the interpolation pixel position.

However, these methods have the following drawbacks. In the nearest neighbor method, the interpolation pixel value is a low-resolution pixel value in the neighborhood of the interpolation pixel position. This being so, when an enlargement factor increases, visual blocks become noticeable and cause degradation in image quality. In the bilinear method and the bicubic convolution method, though the occurrence of blocks as seen in the nearest neighbor method can be suppressed, the resulting image is blurred.

To solve these problems, a method of performing an edge enhancement process using a high-pass enhancement filter before or after interpolation enlargement is often employed. When edge enhancement is performed, however, an artifact called overshoot or undershoot occurs near an edge in the image.

FIG. 8 is a diagram showing an example where overshoot and undershoot occur as a result of edge enhancement.

FIG. 8 shows a level value of a part of a horizontal line in an image. As can be seen from FIG. 8, overshoot 801 and undershoot 802 occur near edges. Thus, when performing the edge enhancement by the high-pass enhancement filter, though a sharp image is obtained, there is also an adverse effect that the image has visual degradation as a neighborhood of an edge in the image appears bright.

FIG. 48 is a diagram showing a technique disclosed in PTL 1.

PTL 1 discloses a means of solving the adverse effect of the edge enhancement in resolution conversion. The following describes the technique disclosed in PTL 1, with reference to FIG. 48.

In FIG. 48, 2901 denotes an original low-resolution image (input image) that is subject to the resolution conversion. 2902 denotes information about an interpolation process relating to the resolution conversion, such as the number of pixels to be interpolated. 2903 denotes an enhancement coefficient determination unit that determines a filter coefficient for performing the edge enhancement, on the basis of the information 2902. 2904 denotes an edge enhanced image generation unit that performs the edge enhancement using the determined enhancement coefficient. 2905 denotes an interpolation pixel generation unit that generates an interpolation pixel by interpolating a pixel value in a designated position, from the edge enhanced low-resolution image. 2906 denotes a comparison unit that compares a pixel of interest in the input image 2901 and an output value of the interpolation pixel generation unit 2905, and outputs a value showing a degree of weighting of each pixel value according to a result of the comparison. 2909 denotes information for designating a range of neighboring pixels of the pixel of interest, from which a maximum value and a minimum value of the pixel value are detected. The comparison unit 2906 calculates the value showing the degree of weighting, on the basis of the information 2909. A weighting synthesis unit 2907 is a synthesis unit that weights the pixel of interest in the low-resolution image inputted from the input image 2901 and the output of the interpolation pixel generation unit 2905 according to the weight outputted from the comparison unit 2906, and synthesizes the weighted pixel and output.

The following describes the processes of the comparison unit 2906 and the weighting synthesis unit 2907 in detail. Let n be the maximum and minimum value detection pixel range (the information 2909) inputted to the comparison unit 2906. When a position of the pixel of interest is given by (i,j), the comparison unit 2906 detects a pixel value of a maximum level and a pixel value of a minimum level from pixels in a range of its neighboring pixel positions (i−n+1, j−n+1) to (i+n, j+n), and outputs the maximum value and the minimum value to the weighting synthesis unit 2907 as weighting coefficients. The weighting synthesis unit 2907 calculates an output pixel on the basis of the weighting coefficients outputted from the comparison unit 2906. In detail, when Pi,j outputted from the interpolation pixel generation unit 2905 is in a range of the maximum value to the minimum value, the weighting synthesis unit 2907 outputs Pi,j. When Pi,j is larger than the maximum value, the weighting synthesis unit 2907 outputs the maximum value. When Pi,j is smaller than the minimum value, the weighting synthesis unit 2907 outputs the minimum value.

In this way, the enlargement process that suppresses edge blurriness can be achieved without causing overshoot and undershoot (overcorrection) associated with edge enhancement.

CITATION LIST

Patent Literature

[PTL 1]
Japanese Unexamined Patent Application Publication No. 2000-115526

Non Patent Literature

[NPL 1]
Consideration for Interpolation Filter for Geometric Transformation of Image Signals and Image Quality, Kazumasa Enami, et al., IEICE Transactions on Information and Systems, vol. 45, J69-D, No. 11, pp. 1617-1623, 1986

SUMMARY OF INVENTION

However, the method described in PTL 1 has the following drawbacks. First, there is a problem that, since the enlargement interpolation is performed by the interpolation pixel generation unit 2905 after the edge enhancement by the edge enhanced image generation unit 2904, the enlargement interpolation process is affected by a noise component and the like enhanced by the edge enhancement. Second, there is a problem that arises as a result of cutting the value at the maximum value and the minimum value in the neighborhood of the pixel of interest.

FIG. 9 is a conceptual diagram of an image signal processed according to the technique in PTL 1.

FIG. 9 shows a level value of a part of a horizontal line in an image, as in FIG. 8. In FIG. 9, overshoot and undershoot (overcorrection) shown in FIG. 8 do not occur, and edges have steep angles. In the case of a nature description image, however, this signal tends to cause unnaturalness. For example, when a fine texture portion such as grass grain or leaves is represented by such a signal, the resulting picture looks like an oil painting with a paint daub appearance, which is unnatural in subjective assessment. Therefore, in the case of applying the technique in PTL 1 to a nature description image, the coefficient in the enhancement coefficient determination unit 2903 needs to be decreased to thereby reduce the extent of edge enhancement, in order to prevent unnaturalness. In this case, a gradient of an edge portion is insufficient, so that the effect of reducing blurriness caused by enlargement diminishes.

The present invention has a first object of providing an enlargement process that enables a natural, unblurred image to be generated by suppressing blurriness which occurs in resolution conversion and also suppressing unnatural edge generation in edge correction.

The method in PTL 1 also has the following drawback.

FIG. 49 is a conceptual diagram of an image signal processed according to the technique in PTL 1.

In FIG. 49, a vertical axis represents a signal level value, where a top portion corresponds to white and a bottom portion corresponds to black. A horizontal axis represents a pixel position.

FIG. 50 is a diagram showing an example where the same portion as FIG. 49 is enlarged by linear interpolation.

In FIG. 49, while an edge is made steep as compared with FIG. 50, there is no overshoot or undershoot. However, as a result of making the edge steep, an inclined portion in FIG. 50 becomes white or black, causing each of white and black to become thicker. In signal level, white and black are thickened to the same width. In human sense, however, there is an impression that white is thicker. This is because white is an expansive color. Even when a white object and a black object are equal-sized, human beings perceive the white object to be larger. This is a commonly known phenomenon as a feature of human vision. As an example, stones used in the game of Go are formed so that white stones are smaller than black stones by about 0.3 mm, in order to make each stone appear to be equal-sized. Thus, when a bright color and a dark color have the same thickness, the bright color appears thicker. This phenomenon is noticeable especially in the enlargement process.

Hence, the technique in PTL 1 has a problem that a bright color, white in particular, appears thicker.

In view of the above problem, the present invention has a second object of providing an enlargement process that prevents white from appearing thicker in the case where an edge is steeply corrected in the enlargement process.

In view of the stated problems, an image enlargement apparatus according to the present invention is an image enlargement apparatus that receives a low-resolution image and outputs a high-resolution image of a higher resolution than the low-resolution image, the image enlargement apparatus including: an interpolation unit that receives the low-resolution image, and generates an interpolation image having the number of pixels of the high-resolution image; a feature value analysis unit that analyzes a feature value of the low-resolution image, and outputs the feature value for each pixel of the high-resolution image; a correction amount calculation unit that receives the feature value outputted by the feature value analysis unit and the low-resolution image, and calculates a correction amount for each pixel of the high-resolution image; a synthesis unit that generates a first high-resolution image, by synthesizing the correction amount calculated by the correction amount calculation unit and the interpolation image generated by the interpolation unit; and a re-correction unit that generates a corrected second high-resolution image by re-correcting the first high-resolution image outputted by the synthesis unit using the feature value generated by the feature value analysis unit, and outputs the generated second high-resolution image from the image enlargement apparatus.

In detail, this image enlargement apparatus may include, for example, some or all of technical matters of the following image enlargement apparatus A1 and the like.

To achieve the first object stated above, the image enlargement apparatus A1, in a process of generating a high-resolution image from a low-resolution image by enlargement interpolation, includes: an interpolation unit that generates a provisional high-resolution image by interpolation; a feature value analysis unit that extracts a feature value according to a gradient strength from the low-resolution image, and calculates a feature value corresponding to each pixel of the high-resolution image; a correction amount calculation unit that adjusts a correction amount of an edge component according to the feature value, and outputs a correction amount corresponding to each pixel of the high-resolution image; and a synthesis unit that synthesizes the high-resolution image generated by the interpolation unit and the correction amount calculated by the correction amount calculation unit, wherein a correction value of each pixel of a high-resolution image synthesized by the synthesis unit is determined according to the feature value, and a result of performing re-correction is outputted as a high-resolution image.

In this way, a portion (overcorrection component) where overshoot or undershoot occurs in an edge portion because the correction amount calculated by the correction amount calculation unit is excessively large can be adjusted again, so that a sharp, natural enlarged image with little shoot can be generated.

In an image enlargement apparatus A2, the feature value outputted from the feature value analysis unit includes a gradient amount, an upper threshold, and a lower threshold. By adjusting the amount of correction performed in the correction amount calculation unit and the re-correction unit according to the gradient amount, for example, it is possible to decrease the correction amount in a portion, such as noise, having a small gradient amount and increase the correction amount in a portion, such as grass grain, having an intermediate gradient amount. Moreover, by outputting the upper threshold and the lower threshold as the feature value, a portion (overcorrection portion) where overshoot or undershoot occurs can be specified more easily, with it being possible to appropriately correct such shoot.

In an image enlargement apparatus A3, a first gradient amount inputted to the correction amount calculation unit and a second gradient amount inputted to the re-correction unit are different. This allows the correction amount calculation unit that determines an edge enhancement amount and the re-correction unit that suppresses shoot in an edge portion, to operate according to different criteria. For example, by setting a gradient corresponding to an edge of a narrow image portion as the first gradient amount and a gradient corresponding to an edge of a wide image portion as the second gradient amount, it is possible to perform the edge enhancement only in the vicinity of the edge and the shoot suppression process in a large area around the edge.

To achieve the first object stated above, an image enlargement apparatus B1, in a process of generating a high-resolution image from a low-resolution image by enlargement interpolation, includes: an interpolation unit that generates a provisional high-resolution image by interpolation; a feature value analysis unit that extracts a feature value according to a gradient strength from the low-resolution image, and calculates a feature value corresponding to each pixel of the high-resolution image; a correction amount calculation unit that adjusts a correction amount of an edge component according to the feature value, and outputs a correction amount corresponding to each pixel of the high-resolution image; and a synthesis unit that synthesizes the high-resolution image generated by the interpolation unit and the correction amount calculated by the correction amount calculation unit, wherein a correction value of each pixel of a high-resolution image synthesized by the synthesis unit is determined using a threshold calculated from the feature value and a pixel value of the high-resolution image generated by interpolation, and a result of performing re-correction is outputted as a high-resolution image.

In this way, a portion (overcorrection component) where overshoot or undershoot occurs in an edge portion because the correction amount calculated by the correction amount calculation unit is excessively large can be adjusted again, so that a sharp, natural enlarged image with little shoot can be generated.

In an image enlargement apparatus B2, the feature value outputted from the feature value analysis unit includes a gradient amount, an upper threshold, and a lower threshold. By adjusting the amount of correction performed in the correction amount calculation unit and the re-correction unit according to the gradient amount, for example, it is possible to decrease the correction amount in a portion, such as noise, having a small gradient amount and increase the correction amount in a portion, such as grass grain, having an intermediate gradient amount. Moreover, by outputting the upper threshold and the lower threshold as the feature value, a portion (overcorrection component) where overshoot or undershoot occurs can be specified more easily, with it being possible to appropriately correct such shoot.

In an image enlargement apparatus B3, a difference between a pixel value of the high-resolution image outputted from the interpolation unit and each of the upper threshold and the lower threshold of the pixel of the high-resolution image outputted from the feature value analysis unit is calculated and, when a pixel value outputted from the synthesis unit exceeds a threshold determined from the difference between the pixel value outputted from the interpolation unit and each of the upper and lower thresholds, the pixel value outputted from the synthesis unit is corrected and a result of the correction is outputted. This enables correction in an edge neighborhood to be started before the upper limit or the lower limit is exceeded, so that a change in edge gradient around a strong edge can be controlled more finely.

To achieve the second object stated above, an image enlargement apparatus C1, in a process of generating a high-resolution image from a low-resolution image by enlargement interpolation, includes: an interpolation pixel position generation unit that generates a first interpolation pixel position corresponding to each pixel of the high-resolution image; an interpolation unit that generates an interpolation pixel corresponding to the first interpolation pixel position; a white thinning unit that generates a second interpolation pixel position from the low-resolution image and the first interpolation pixel position, by correcting the interpolation pixel position according to a change in pixel value in a neighborhood of the interpolation pixel position; a correction amount calculation unit that calculates a correction amount corresponding to the second interpolation pixel position; and a synthesis unit that synthesizes a pixel value interpolated by the interpolation unit and the correction amount to generate an output pixel value.

The second interpolation pixel position corrected by the white thinning unit is used in the correction amount calculation unit. By changing the interpolation pixel position from the first interpolation pixel position in this way, a center of edge enhancement is shifted. As a result, a bright portion, white in particular, can be thinned.

An image enlargement apparatus C2, in a process of generating a high-resolution image from a low-resolution image by enlargement interpolation, includes: an interpolation pixel position generation unit that generates a first interpolation pixel position corresponding to each pixel of the high-resolution image; an interpolation unit that generates an interpolation pixel corresponding to the first interpolation pixel position; a feature value analysis unit that calculates a feature value corresponding to the first interpolation pixel position; a white thinning unit that generates a second interpolation pixel position from the low-resolution image and the first interpolation pixel position, by correcting the interpolation pixel position according to a change in pixel value in a neighborhood of the interpolation pixel position; a correction amount calculation unit that calculates a correction amount corresponding to the second interpolation pixel position; a synthesis unit that synthesizes a pixel value interpolated by the interpolation unit and the correction amount to generate a synthesized pixel value; and a re-correction unit that generates a corrected second high-resolution image by re-correcting the output result of the synthesis unit using the feature value.

In the second invention, by performing the re-correction according to the feature value, an image with little overshoot or undershoot can be generated as in the first invention. When overshoot and undershoot are re-corrected, an edge becomes flat, which causes a white line to appear thicker. However, by calculating the correction amount using the second interpolation pixel position calculated by the white thinning unit, a color near white is thinned, with it being possible to prevent white from appearing thicker.

In an image enlargement apparatus C3, the second interpolation pixel position corrected by the white thinning unit is used in the feature value calculation. As a result, a control position of the re-correction process is shifted according to the second interpolation pixel position, allowing for finer control of white line thickness.

First, according to the present invention, a portion where overshoot or undershoot occurs in an edge portion because the correction amount calculated by the correction amount calculation unit is excessively large can be adjusted again, so that a sharp, natural enlarged image with little shoot can be generated.

Moreover, according to the present invention, a visual phenomenon that white appears thicker as a result of an edge sharpening process in an enlargement process can be suppressed.

BRIEF DESCRIPTION OF DRAWINGS

FIG. 1 is a block diagram of an image enlargement unit in an embodiment A1.
FIG. 2 is a block diagram of a system that includes the image enlargement unit.
[FIG. 3]
FIG. 3 is a diagram showing a coefficient of a gradient detection filter in the embodiment A1.
[FIG. 4]
FIG. 4 is a diagram showing a coefficient of a gradient detection filter in the embodiment A1.
[FIG. 5]
FIG. 5 is a diagram showing a first example of a Laplacian filter used in edge extraction.
[FIG. 6]
FIG. 6 is a diagram showing a second example of the Laplacian filter used in edge extraction.
FIG. 7 is a diagram showing a graph for gain calculation in the embodiment A1.
FIG. 8 is a diagram showing an image in which shoot occurs.
FIG. 9 is a diagram showing an example where shoot is suppressed according to a conventional technique.
FIG. 10 is a diagram showing an example where shoot is suppressed.
FIG. 11A is a diagram showing an example of an outputted image in the embodiment A1.
FIG. 11B is a diagram showing an example of an outputted image in the embodiment A1.
FIG. 11C is a diagram showing an example of an outputted image in the embodiment A1.
FIG. 11D is a diagram showing an example of an outputted image in the embodiment A1.
FIG. 12 is a block diagram in the case of inputting a YCbCr signal in the embodiment A1.
FIG. 13 is a block diagram in the case of inputting a YCbCr signal in the embodiment A1.
FIG. 14 is a block diagram in the case of inputting a RGB signal in the embodiment A1.

FIG. 15 is a block diagram of an image enlargement apparatus in an embodiment A2.
FIG. 16 is a diagram showing an example of pixel positions in double enlargement in the embodiment A2.
FIG. 17 is a flowchart in the embodiment A2.
FIG. 18 is a block diagram of an image enlargement unit in the embodiment A2.
FIG. 19 is a block diagram of a feature value analysis unit in the embodiment A2.
FIG. 20 is a diagram showing block division from 4×4 pixels to 2×2 pixels in the embodiment A2.
FIG. 21 is an explanatory diagram of area determination in the embodiment A2.
[FIG. 2sA]
FIG. 22B is an explanatory diagram of area division for area determination in the embodiment A2.
FIG. 22C is an explanatory diagram of area division for area determination in the embodiment A2.
FIG. 22D is an explanatory diagram of area division for area determination in the embodiment A2.
FIG. 23 is a block diagram of a correction amount calculation unit in the embodiment A2.
FIG. 24 is an explanatory diagram of an interpolation position px,py in the embodiment A2.
FIG. 25 is an explanatory diagram of interpolation in the embodiment A2.
FIG. 26 is a diagram showing a relation between grad0 and a gain in the embodiment A2.
FIG. 27 is a diagram showing a relation between grad1 and the gain in the embodiment A2.
FIG. 28 is a diagram showing a relation between grad1 and a clipping value in the embodiment A2.
FIG. 29 is a block diagram of an image enlargement unit in an embodiment 131.
FIG. 30A is a diagram showing an example of processing of a re-correction unit in the embodiment B1.
FIG. 30B is a diagram showing an example of processing of the re-correction unit in the embodiment B1.
FIG. 31 is a block diagram of an image enlargement unit in an embodiment B2.
FIG. 32A is an explanatory diagram of a difference in output waveform according to a constant E.
FIG. 32B is an explanatory diagram of a difference in output waveform according to the constant E.

FIG. 32C is an explanatory diagram of a difference in output waveform according to the constant E.

FIG. 33 is a block diagram of an image enlargement unit in an embodiment C1.

FIG. 34 is a flowchart of processing of an interpolation pixel position generation unit in the embodiment C1.

FIG. 35 is a flowchart of processing of a white thinning unit in the embodiment C1.

FIG. 36 is a first diagram showing an example of an outputted image in the embodiment C1.

FIG. 37 is a second diagram showing an example of an outputted image in the embodiment C1.

FIG. 38 is a block diagram of an image enlargement apparatus in an embodiment C2.

FIG. 39 is a block diagram of an image enlargement unit in the embodiment C2.

FIG. 40 is a block diagram of a white thinning unit in the embodiment C2.

FIG. 41 is a diagram showing a correction direction of the white thinning unit in the embodiment C2.

FIG. 42 is a diagram showing diagonal correction of the white thinning unit in the embodiment C2.

FIG. 43 is a block diagram of a feature value analysis unit in the embodiment C2.

FIG. 44 is a block diagram of a correction amount calculation unit in the embodiment C2.

FIG. 45 is a diagram showing a re-correction unit and data processed by the re-correction unit.

FIG. 46 is a flowchart of processing in an embodiment C.

FIG. 47 is a diagram showing data processed in the embodiment C.

FIG. 48 is a block diagram of a conventional image enlargement apparatus.

FIG. 49 is a diagram showing an example of an output signal of the conventional image enlargement apparatus.

FIG. 50 is a diagram showing an example of an output signal when enlargement is performed by linear interpolation.

DETAILED DESCRIPTION OF INVENTION

Figure 1:
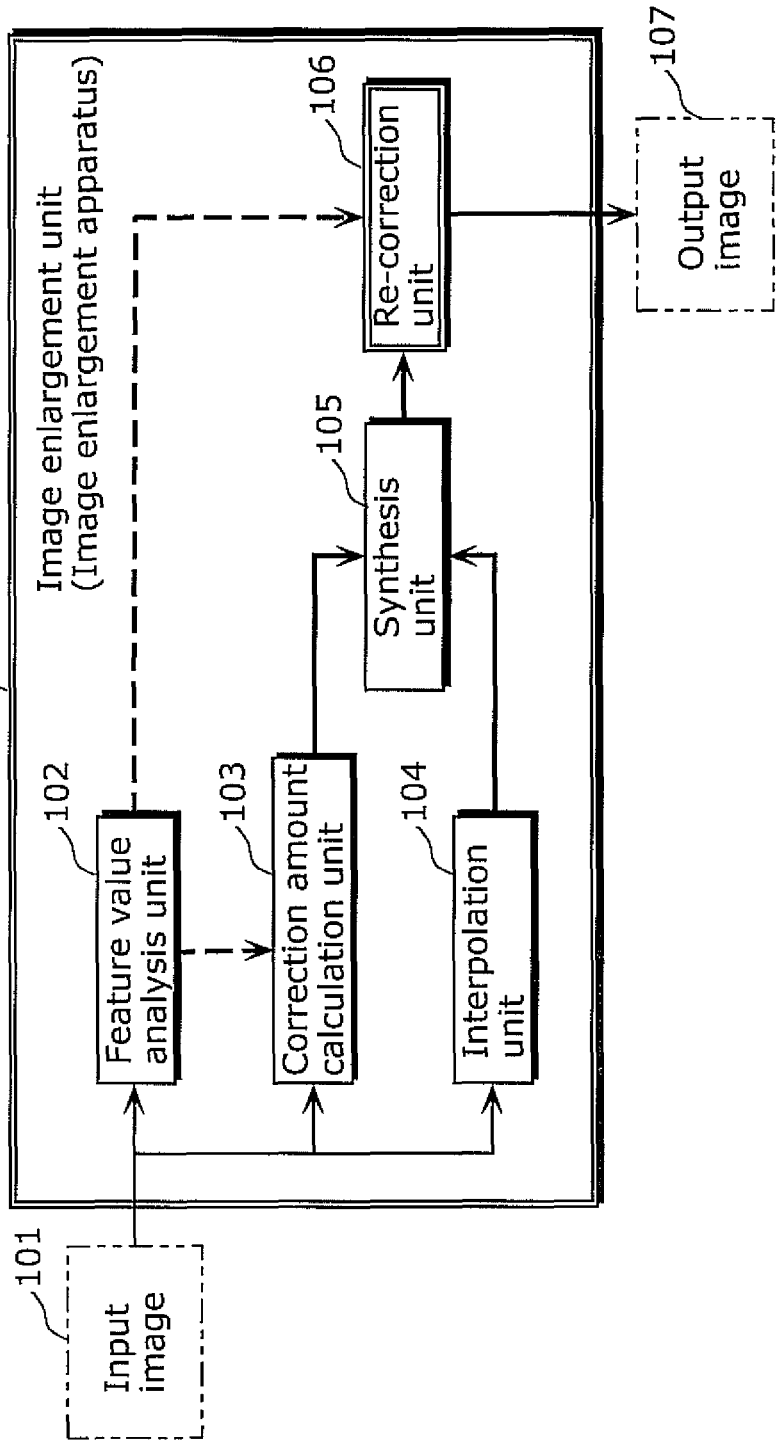
[FIG. 1]

The following describes an image enlargement apparatus (image enlargement unit) 108 according to embodiments, with reference to drawings. The image enlargement apparatus 108 is a superordinate conception of each of an image enlargement apparatus 108A (for example, FIG. 1) according to an embodiment A, an image enlargement apparatus 108B (for example, FIG. 29) according to an embodiment B, and an image enlargement apparatus 108C (for example, FIG. 33) according to an embodiment C.

The image enlargement apparatus 108 according to the embodiments (such as the image enlargement apparatus 108A) is an image enlargement apparatus that receives a low-resolution image (an input image 101) and outputs a high-resolution image (an output image 107) of a higher resolution than the low-resolution image, the image enlargement apparatus including: an interpolation unit (such as an interpolation unit 104) that receives the low-resolution image, and generates an interpolation image (such as an interpolation image OL in FIG. 18) having the number of pixels of the high-resolution image; a feature value analysis unit (such as a feature value analysis unit 102) that analyzes a feature value of the low-resolution image, and outputs the feature value (such as grad1, grad0, MIN, and MAX in FIG. 18) for each pixel of the high-resolution image; a correction amount calculation unit (such as a correction amount calculation unit 103) that receives the feature value outputted by the feature value analysis unit and the low-resolution image, and calculates a correction amount for each pixel of the high-resolution image; a synthesis unit (such as a synthesis unit 105) that generates a first high-resolution image (FIG. 11B, alternate long and short dash line data in a lower part of FIG. 45, and the like), by synthesizing the correction amount calculated by the correction amount calculation unit and the interpolation image generated by the interpolation unit; and a re-correction unit (such as a re-correction unit 106) that generates a corrected second high-resolution image (FIG. 11D, solid line data in the lower part of FIG. 45, and the like) by re-correcting the first high-resolution image outputted by the synthesis unit using the feature value generated by the feature value analysis unit, and outputs the generated second high-resolution image from the image enlargement apparatus.

[Embodiment A]

The following describes the embodiment A with reference to drawings. Note that the embodiment A includes embodiments A1 and A2.

[Embodiment A1]

FIG. 1 is a block diagram of an image enlargement unit (image enlargement apparatus) 108A in the embodiment A1.

Note that the image enlargement unit 108A is a subordinate conception of the image enlargement apparatus 108 (mentioned above).

In FIG. 1, 101 denotes a low-resolution input image (original image, low-resolution image). 102 denotes a feature value analysis unit that outputs a feature value corresponding to each pixel of a high-resolution image (output image, second high-resolution image) 107 outputted from the image enlargement unit 108A, from the low-resolution input image. 103 denotes a correction amount calculation unit that calculates a correction amount of an edge component according to the feature value outputted from the feature value analysis unit 102, that is, calculates a correction amount of each pixel of the outputted high-resolution image 107, and outputs the calculated correction amount. 104 denotes an interpolation unit that receives the low-resolution input image 101, and generates an image (interpolation image) having the same number of pixels as the outputted high-resolution image 107. 105 denotes a synthesis unit that receives a pixel of a high-resolution image (interpolation image) outputted from the interpolation unit 104 and also receives a correction amount corresponding to the pixel from the correction amount calculation unit 103, and outputs a pixel after first correction (first high-resolution image) obtained by performing correction (first correction) on the pixel using the correction amount. 106 denotes a re-correction unit that performs re-correction (second correction) on a synthesis result (pixel after first correction) outputted from the synthesis unit 105 using a feature value that is received from the feature value analysis unit 102 and corresponds to the pixel after first correction outputted from the synthesis unit 105, and outputs a pixel after second correction (second high-resolution image). 107 denotes the outputted high-resolution image (second high-resolution image). 108A denotes the image enlargement unit that receives the low-resolution image 101, and outputs the high-resolution image (second high-resolution image) 107 generated by enlarging the inputted low-resolution image 101.

Note that the image enlargement unit 108A may specifically be an integrated circuit, and each component such as the feature value analysis unit 102 may be a functional block (circuit) implemented in the integrated circuit. Moreover, the image enlargement unit 108A may be a computer, and a function of each functional block may be realized by the computer executing software.

Figure 2:
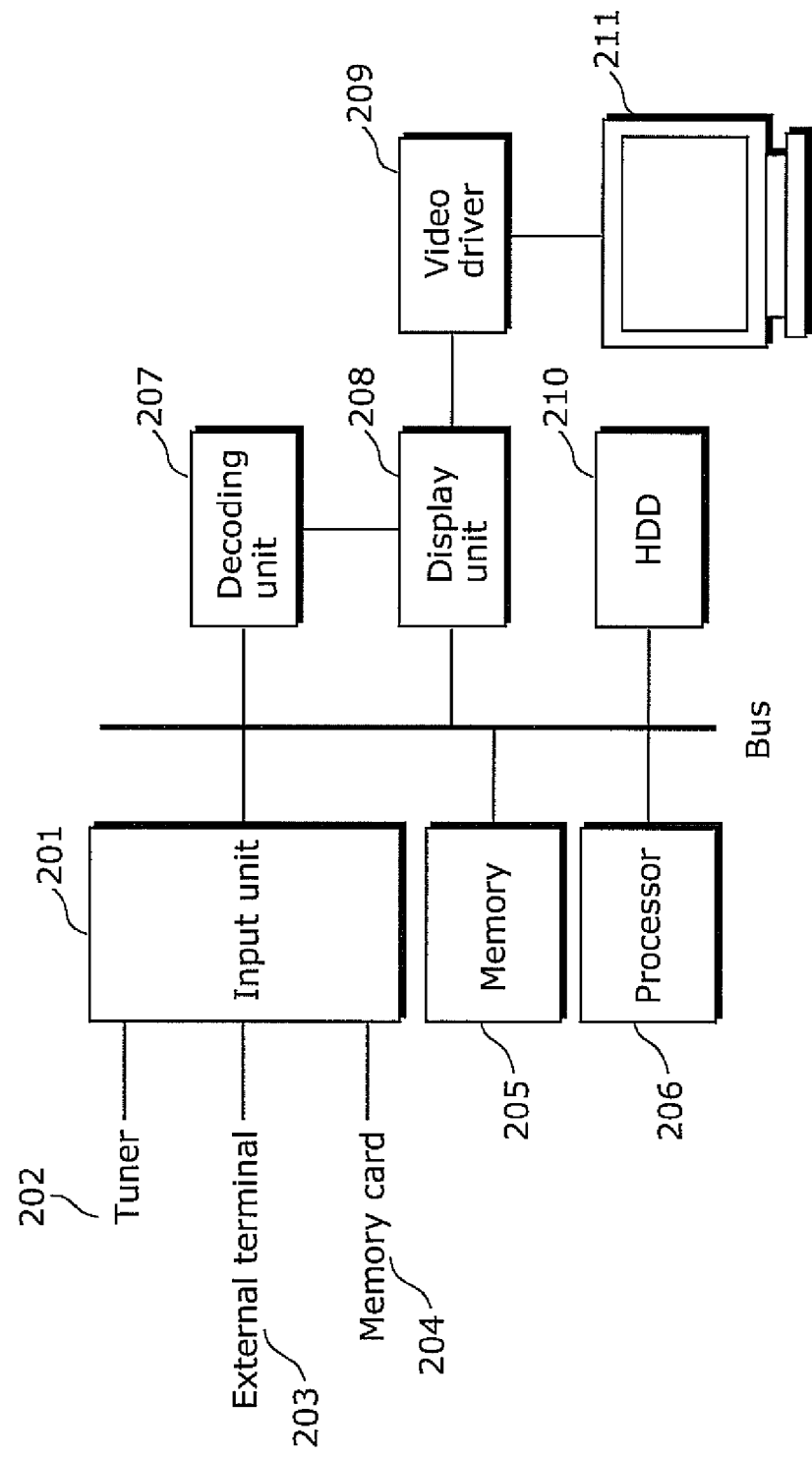
[FIG. 2]

FIG. 2 is a diagram showing an example of a system that includes the image enlargement unit 108A.

In FIG. 2, 201 denotes an input unit that receives an image. 202 denotes a tuner that inputs a TV signal to the input unit 201. 203 denotes an external terminal that inputs video to the input unit 201. 204 denotes a memory card such as a SD card on which a moving image or a still image is recorded. 205 denotes a memory such as a DRAM used as a primary storage of this system. 206 denotes a processor that controls the entire system. 207 denotes a decoding unit that, when the image inputted to the input unit 201 is a compressed image, decodes the image. 208 denotes a display unit that outputs the decoded image to a video driver 209. 209 denotes the video driver for outputting the image outputted from the display unit 208, to a display device 211 such as a liquid crystal display, a plasma display, or a CRT display. 210 denotes a hard disk (HDD) which is a secondary storage for storing an image and the like.

In this system, a compressed image inputted to the input unit 201 or stored in the hard disk 210 is sent to the decoding unit 207 and, having been decoded by the decoding unit 207, sent to the display unit 208 directly or via the memory, by control of the processor 206. The display unit 208 converts a format of the received decoded image (the input image 101 in FIG. 1) to a format corresponding to the display device 211, and sends the converted image (the output image 107) to the video driver 209. The video driver 209 displays the sent output image 107 on the display device 211. In this system, the image enlargement unit 108A shown in FIG. 1 is implemented, for example, as a process (functional block) in the display unit 208 for enlarging the input image 101 to generate the output image 107 of a resolution of the display device 211, or as a software process (functional block) in the processor 206. In either case, the image enlargement unit 108A is implemented so as to be also applicable in cases where, for example, the enlarged image is coded again and the coded image is written back to the hard disk 210 or the like.

The following describes processing of the image enlargement unit 108A in FIG. 1.

(Feature Value Analysis Unit)

Figure 46:
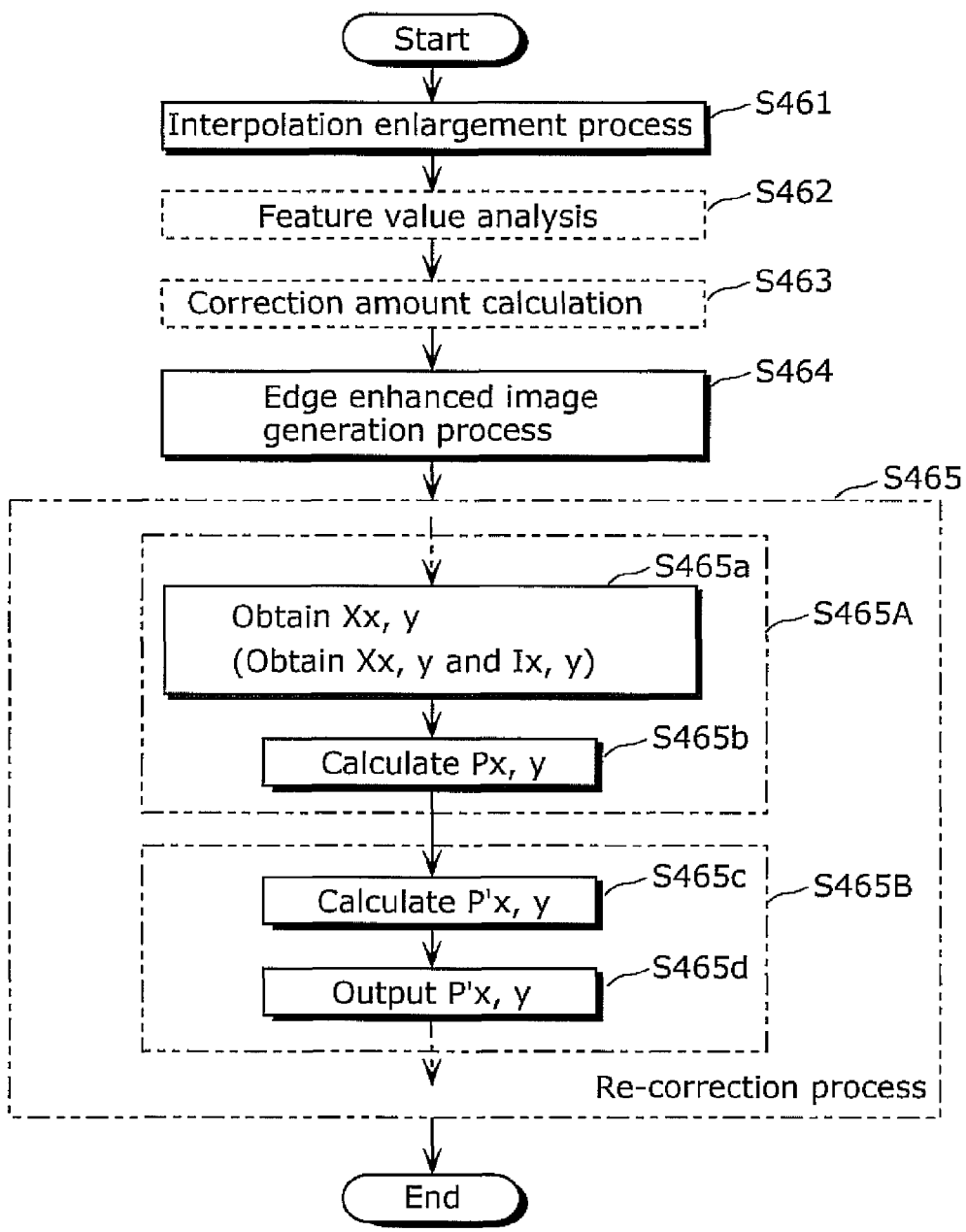
[FIG. 46]

The feature value analysis unit 102 calculates and outputs a feature value for each pixel that is outputted from the interpolation unit 104 after enlargement (Step S462 in FIG. 46). That is, the feature value analysis unit 102 calculates a feature value for each pixel of a high-resolution image after enlargement. Data outputted as the feature value includes a gradient strength (for example, grad0 and grad1 in FIG. 18) around a position (position in the low-resolution image, coarse position) corresponding to an interpolation pixel position (fine position) in the high-resolution image at which the interpolation unit 104 performs interpolation, and a lower limit and an upper limit (MIN, MAX) of neighboring pixels of the position. The feature value includes the gradient strength, the upper limit, and the lower limit which are specified from the low-resolution image.

FIG. 3 is a diagram showing an example of a differential filter in a horizontal direction for detecting a vertical line.

FIG. 4 is a diagram showing an example of a differential filter in a vertical direction for detecting a horizontal line.

As a method of specifying the gradient strength included in the feature value as mentioned above, for example, there is a method in which 2×2 pixels in the low-resolution image that are adjacent to the interpolation pixel position (coarse position) are extracted, horizontal and vertical differential components dx and dy are obtained from the extracted 2×2 pixels using the filters shown in FIGS. 3 and 4, and a larger one of dx and dy is specified as the gradient strength included in the feature value. Note that the gradient strength calculation method is not limited to this, and may be a method using a sobel filter, a prewitt filter, or the like.

Regarding the upper limit and the lower limit, a maximum pixel value and a minimum pixel value from among n×n pixels in the low-resolution image that are positioned in the neighborhood of the interpolation pixel position (coarse position) are respectively set as the upper limit and the lower limit.

Thus, the feature value analysis unit 102 calculates and outputs the three values, namely, the gradient strength, the upper limit, and the lower limit, as the feature value.

(Correction Amount Calculation Unit)

The correction amount calculation unit 103 calculates a correction amount according to an extent of edge of a pixel corresponding to the interpolation pixel position (Step S463 in FIG. 46). First, through the use of pixel values in the low-resolution input image 101 corresponding to the neighborhood of the interpolation pixel position (coarse position), the correction amount calculation unit 103 calculates an edge component of the coarse position. When doing so, a fine position corresponding to an edge portion in the low-resolution image is specified from among a plurality of fine positions.

FIG. 5 is a diagram showing a first example of a Laplacian filter.

FIG. 6 is a diagram showing a second example of the Laplacian filter.

As a method of extracting the edge component, a method using the Laplacian filter shown in FIG. 5 or 6 is employed as an example.

Note that the pixel of the interpolation pixel position (fine position, for example, decimal coordinate position) in the high-resolution image is not present in the low-resolution image (having, for example, only pixels of integer coordinates). Accordingly, in the case of performing the above filtering, 3×3 filtering centered on a pixel (having an integer coordinate position) near the same position (for example, a decimal coordinate position in the low-resolution image) as the interpolation pixel position (fine position) is performed.

After extracting the edge component, that is, after specifying the fine position of the edge portion, the correction amount calculation unit 103 calculates an extent of enhancement of the extracted edge using the gradient strength (feature value, for example, grad0 in FIG. 18) calculated by the feature value analysis unit 102.

Figure 7:
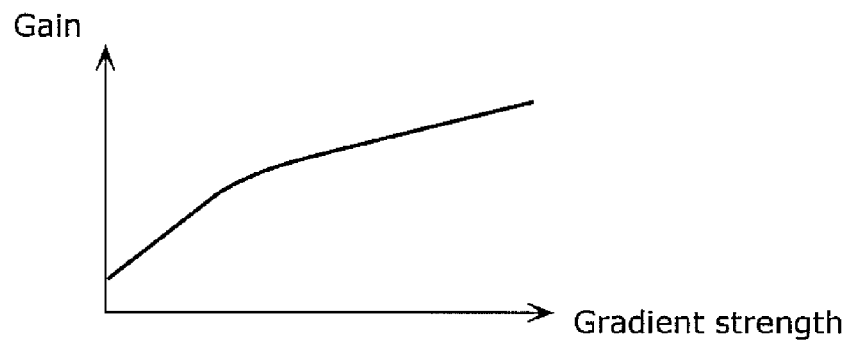
[FIG. 7]

FIG. 7 is a diagram showing an example of a gain in the case where the gain by which the extracted edge component is to be multiplied is adjusted according to the gradient strength (feature value).

In this example, a correction amount is increased in a strong gradient portion, and decreased in a weak gradient portion. Such adjustment makes it possible to reduce a correction amount of a signal with a small gradient such as noise, which corresponds to a weak gradient portion.

Thus, the correction amount calculation unit 103 extracts the edge component from the low-resolution image, and outputs the correction amount corresponding to each pixel of the high-resolution image, where the correction amount is adjusted in factor by the gain according to the gradient strength.

That is, the correction amount calculation unit 103 calculates, for each fine position, a correction amount that is to be added to the fine position to thereby perform edge enhancement.

(Interpolation Unit)

The interpolation unit 104 generates a high-resolution image (for example, see an interpolation image OL in FIG. 18, FIG. 11A, and the like) from the low-resolution image (the input image 101) by interpolation enlargement, using the bilinear method, the bicubic convolution method, or the like (Step S461 in FIG. 46). Since these typical enlargement techniques are not the essential features of the embodiment, their detailed description is omitted here. A conventionally used enlargement interpolation technique can be employed as the interpolation unit 104.

That is, the interpolation unit 104 calculates a high-resolution image before edge enhancement (interpolation image), from the low-resolution image.

(Synthesis Unit)

Figure 8:
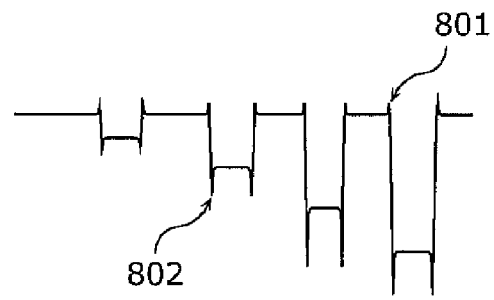
[FIG. 8]

The synthesis unit 105 adds the correction amount (difference value) calculated by the correction amount calculation unit 103 for each pixel of the high-resolution image, to the high-resolution image (interpolation image, FIG. 11A) generated by the interpolation unit 104, thereby generating an edge enhanced image (first high-resolution image, FIG. 11B, data indicated by an alternate long and short dash line in a lower part of FIG. 45) (Step S464 in FIG. 46). The image generated at this point includes overshoot and undershoot (overcorrection component in edge enhancement) as shown in FIG. 8.

(Re-Correction Unit)

The re-correction unit 106 receives the edge enhanced high-resolution image (for example, FIG. 11B) outputted from the synthesis unit 105 and the upper limit and the lower limit (feature value) outputted from the feature value analysis unit 102 for each pixel of the high-resolution image, and re-corrects the high-resolution image (FIG. 11B) outputted from the synthesis unit 105 (Step S465 in FIG. 46).

Figure 11A:
[FIG. 11A]
Figure 11B:
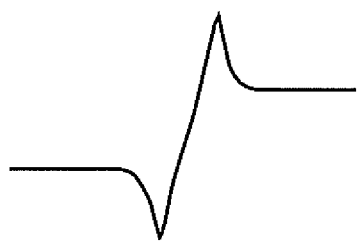
[FIG. 11B]
Figure 11C:
[FIG. 11C]
Figure 11D:
[FIG. 11D]
Figure 45:
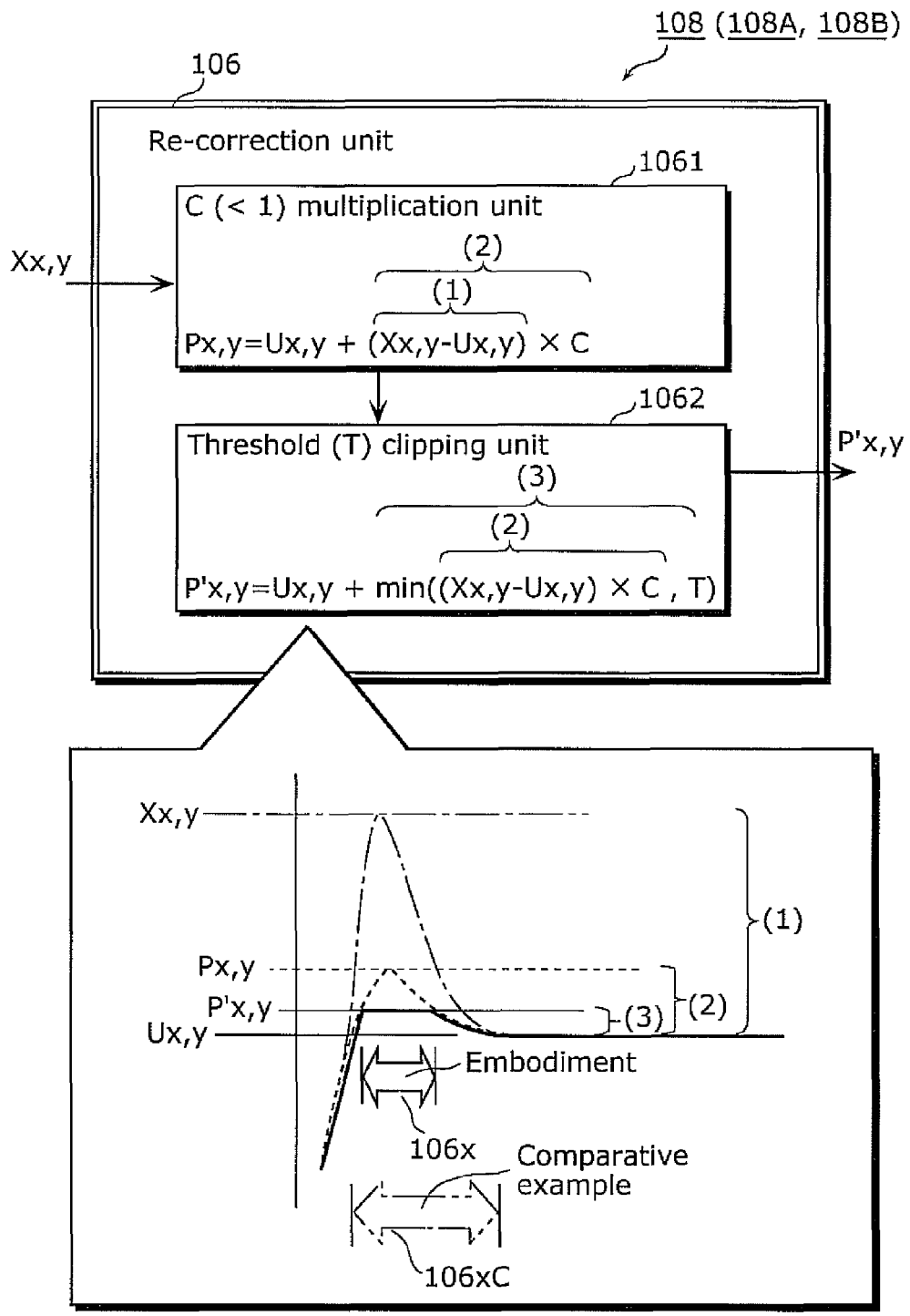
[FIG. 45]

That is, the re-correction unit 106 performs re-correction (second correction) on the edge enhanced high-resolution image (FIG. 11B, the alternate long and short dash line data in FIG. 45), to calculate a high-resolution image after second correction (FIG. 11D, data indicated by a solid line in FIG. 45).

The following describes a procedure of the re-correction.

For a pixel position (x,y) in the edge enhanced high-resolution image (FIG. 11B, the alternate long and short dash line in FIG. 45), let $Xx,y$ be an output pixel value of the synthesis unit 105, $Ux,y$ be an upper limit, and $Lx,y$ be a lower limit. The re-correction unit 106 calculates a first correction value $Px,y$ (data indicated by a broken line) according to the following Math. A1 (see an upper part of FIG. 45) (Step S465A (Steps S465a, S465b) in FIG. 46, a C multiplication unit 1061 in the upper part of FIG. 45). In the Math. A1, C is a constant in a range of 0.0 to 1.0, which is set in the C multiplication unit 1061 beforehand.

Note that four horizontal lines (an alternate long and short dash line, a broken line, a solid line, and a solid line in this order from above) in FIG. 45 each indicate a value at a maximum point of $Xx,y$ as an example.

When $Xx,y > Ux,y$, $Px,y = Ux,y + (Xx,y - Ux,y) \times C$.

When $Xx,y < Lx,y$, $Px,y = Lx,y(Lx,y - Xx,y) \times C$.

Otherwise, $Px,y = Xx,y$. [Math. A1]

By this calculation, a portion (for example, a portion near the maximum point in FIG. 45) exceeding the upper limit ($Ux,y$) and the lower limit ($Lx,y$) is multiplied by C, and $Px,y$ (FIG. 11C, the broken line data in FIG. 45) as a result of the multiplication by C is obtained. Here, C is set to be no more than 1.0, so that the portion (overcorrection component) exceeding the upper limit and the lower limit is reduced by the second correction.

Next, the re-correction unit 106 calculates a second correction value $P'x,y$ (FIG. 11D, the solid line data in FIG. 45) by further correcting the first correction value $Px,y$ (FIG. 11C, the broken line data in FIG. 45), according to the following Math. A2 (Step S465B (Step S465c) in FIG. 46, a threshold clipping unit 1062 in FIG. 45). In the Math. A2, T is a constant set beforehand, and min(a, b) is a function of selecting a smaller one of a and b.

Note that the structure of the re-correction unit 106 shown in the upper part of FIG. 45, namely, the structure of having two parts that are the C multiplication unit 1061 and the threshold clipping unit 1062, is merely an example, and other structures may be employed instead.

When $Px,y > Ux,y$, $P'x,y = Ux,y + \min(Px,y - Ux,y, T)$.

When $Px,y < Lx,y$, $P'x,y = Lx,y - \min(Lx,y - Px,y, T)$.

Otherwise, $P'x,y = Px,y$. [Math. A2]

According to the Math. A2, a component of overshoot and undershoot exceeding the constant T is converted to T. In other words, a portion in shoot (overshoot or undershoot) exceeding the constant T is removed by clipping.

The re-correction unit 106 outputs the second correction value $P'x,y$ (FIG. 11D, the solid line data in FIG. 45) (Step S465d in Step S465B in FIG. 46, the threshold clipping unit 1062 in FIG. 45).

Note that, for example, the re-correction unit 106 performs this process (Steps S465a to S465d in FIG. 46) for each pixel ($Xx,y$) of a plurality of pixels of the edge enhanced high-resolution image (first high-resolution image) generated by the synthesis unit 105. As a result, a re-corrected high-resolution image (second high-resolution image) in which each of the plurality of pixels is re-corrected is generated.

FIGS. 11A to 11D are each a diagram showing an image in the image enlargement unit 108.

According to the embodiment A1, an enlarged image (the output image 107) in which undershoot and overshoot are suppressed is outputted from the image enlargement unit 108A as a result of the above processing. The following describes a signal change during the processing and a flow of the processing, with reference to FIGS. 11A to 11D. Note that FIG. 11 is a diagram showing specific horizontal pixel values in an image as in FIGS. 8, 9, and 10, where a horizontal axis represents a horizontal pixel position and a vertical axis represents a pixel value in each horizontal pixel position.

FIG. 11A shows an image (interpolation image) obtained by interpolation enlargement in the interpolation unit 104 according to the bicubic convolution method. Since the processing of the bicubic convolution method includes an edge enhancement element, a slight shoot component occurs near an edge as shown in FIG. 11A.

FIG. 11B shows the image (first high-resolution image, the alternate long and short dash line and Xx,y in FIG. 45) to which the output of the correction amount calculation unit 103 has been added by the synthesis unit 105. At this point, large shoot occurs around the edge, as compared with FIG. 11A. Note that the graphs of the alternate long and short dash line, the broken line, and the solid line in the lower part of FIG. 45 schematically represent the graphs of FIGS. 11B, 11C, and 11D, respectively. For details of each graph in the lower part of FIG. 45, see FIG. 11B and the like according to need.

FIG. 11C shows the result (the broken line data, Px,y in FIG. 45) of applying the process of the Math. A1 where C=0.25. As shown in FIG. 11C, the shoot component is reduced as compared with FIG. 11B, and also the edge is enhanced in steepness as compared with FIG. 11A.

FIG. 11D shows the result (the solid line data, P'x,y in FIG. 45) of applying the process of the Math. A2 where T=4. As shown in FIG. 11D, the shoot remaining in FIG. 11C is not wholly removed but only partially clipped, resulting in an image similar to the signal of FIG. 11A. Meanwhile, the edge is enhanced in steepness as compared with FIG. 11A, thereby suppressing edge blurriness. Moreover, there is still a shoot component remaining in FIG. 11D, so that an unnatural picture with a paint daub appearance (an unnatural picture lacking sharpness) can be prevented while suppressing shoot around the edge.

As described above, according to the embodiment A1, it is possible to provide a natural image (FIG. 11D, the solid line data, P'x,y in FIG. 45) in which shoot caused by edge enhancement is suppressed while alleviating blurriness (see FIG. 11A) caused by an enlargement process by means of edge enhancement (see FIGS. 11B to 11D, the alternate long and short dash line data, the broken line data, and the solid line data in FIG. 45). Therefore, even when enlarging a low-resolution image, a natural image can be displayed without a loss of image sharpness.

Thus, the image enlargement apparatus 108 (the image enlargement apparatus 108A) includes the interpolation unit (the interpolation unit 104), the edge enhancement unit (the synthesis unit 105), and the re-correction unit (the re-correction unit 106).

The interpolation unit calculates the high-resolution interpolation image (FIG. 11A) by enlarging the low-resolution image (the input image 101).

The edge enhancement unit calculates the first high-resolution image (FIG. 11B, the alternate long and short dash line, Xx,y in the lower part of FIG. 45) by edge-enhancing the calculated interpolation image.

The re-correction unit removes, among a first component (a component removed by multiplication by C and clipping) and a second component (other component) that compose a component causing an edge neighborhood to appear bright (for example, a shoot component in FIG. 11B, a component exceeding Ux,y (the lower part of FIG. 45 and the like), an overcorrection component), only the first component from the first high-resolution image. By doing so, the re-correction unit calculates the second high-resolution image (FIG. 11D, the solid line data in FIG. 45) in which only the first component has been removed.

As a result, the edge blurriness can be suppressed by edge enhancement. Moreover, the edge neighborhood can be prevented from appearing bright, by removing the above first component. While suppressing the edge blurriness and also preventing the edge neighborhood from appearing bright, excessive removal can be avoided as only the first component is removed. Accordingly, as shown by a relatively narrow range 106x in FIG. 45, a flat range in the second high-resolution image is narrower than that (for example, a range 106xC) in a conventional example and the like, with it being possible to prevent an unnatural image with a paint daub appearance. Hence, the blurriness suppression, the edge neighborhood bright appearance prevention, and the image paint daub appearance prevention can all be achieved. This contributes to a sufficient and reliable improvement in image quality.

Note that the synthesis unit (the synthesis unit 105, the edge enhancement unit) may add the correction amount to a pixel value of the interpolation image (FIG. 11A), to generate the first high-resolution image (FIG. 11B, the alternate long and short dash line data in the lower part of FIG. 45) in which an edge in the interpolation image is enhanced.

Moreover, the re-correction unit may multiply an overcorrection component (for example, a shoot component in FIG. 11B) in the first high-resolution image by a value C (the C multiplication unit 1061 in FIG. 45, Step S465A in FIG. 46, where 0<C<1), and further perform clipping on the overcorrection component multiplied by the value C (the threshold clipping unit 1062, Step S465B in FIG. 46), to generate the second high-resolution image as a result of the multiplication by the value C and the clipping, the overcorrection component being a component that is overcorrected in the enhancement of the edge and causes a neighborhood of the edge to appear bright.

Moreover, the re-correction unit may specify a smaller value as the value C (vertical axis in FIG. 27) and a smaller width as a width T of the clipping (vertical axis in FIG. 28) when a gradient in an area of the overcorrection component is larger (rightward direction in horizontal axes of FIGS. 27 and 28), the gradient being indicated by the feature value outputted by the feature value analysis unit.

Moreover, the overcorrection component may be a component a complete removal of which (removal of the whole shoot component) from the first high-resolution image causes a paint daub appearance.

Moreover, the feature value outputted by the feature value analysis unit may specify the value C and a width T of the clipping so that the paint daub appearance is not caused when, in the overcorrection component, only a component (the above first component) to be removed by the multiplication by the value C and the clipping by the width T is removed.

Moreover, the re-correction unit may calculate each of the value C and the width T (see FIGS. 27 and 28) specified by the feature value, and perform the multiplication by the calculated value C and the clipping by the calculated width T, to generate the second high-resolution image in which only the component to be removed using the value C and the width T is removed.

Figure 48:
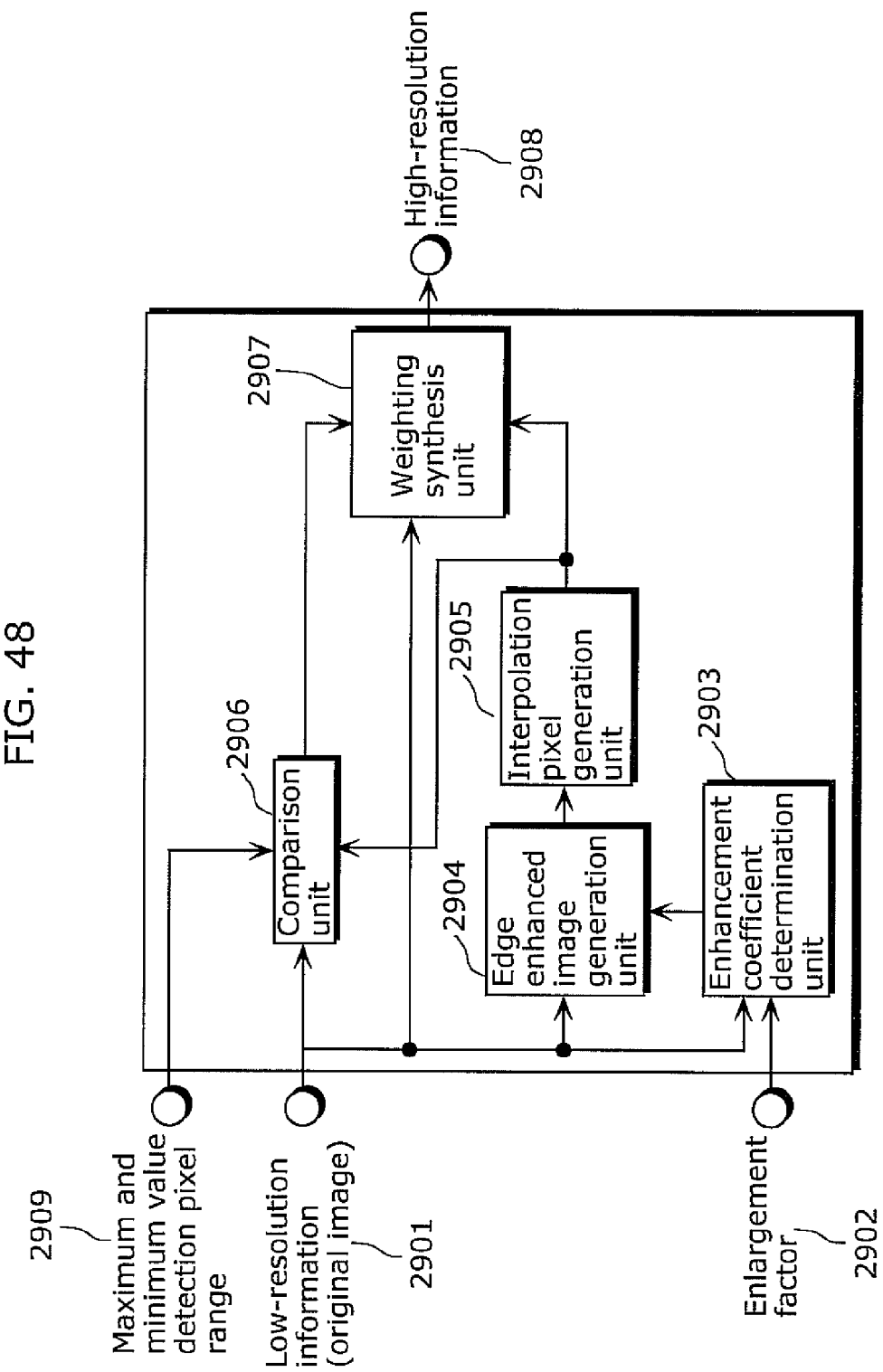
[FIG. 48]
Figure 49:
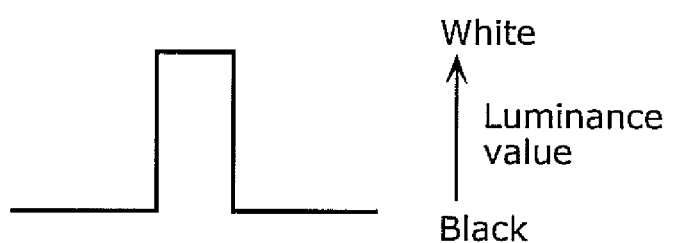
[FIG. 49]
Figure 50:
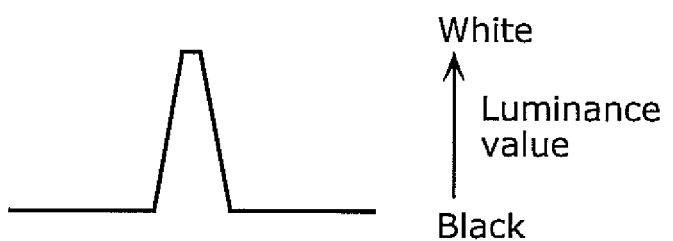
[FIG. 50]

Note that, in the conventional technique (FIG. 48), after the edge enhanced image generation unit 2904 performs edge enhancement on an image, the interpolation pixel generation unit 2905 performs interpolation on the edge enhanced image. This interpolation process also involves some edge enhancement. That is, edge enhancement is further performed after edge enhancement, which leads to degradation in image quality.

In the image enlargement apparatus 108, on the other hand, the interpolation unit 104 performs interpolation before the synthesis unit 105 performs edge enhancement by adding the correction amount, with it being possible to prevent degradation in image quality caused by performing interpolation after edge enhancement. This further contributes to sufficiently high image quality.

(Variation of the Embodiment A1)

The embodiment A1 describes the case where each pixel has one pixel value. In the case of a color image, however, the image is often defined in a multidimensional color space of red (R), green (G), and blue (B), or luminance (Y) and chrominance (Cb, Cr). The following describes a method of applying the present technique in a color space of RGB or YCbCr.

Figure 12:
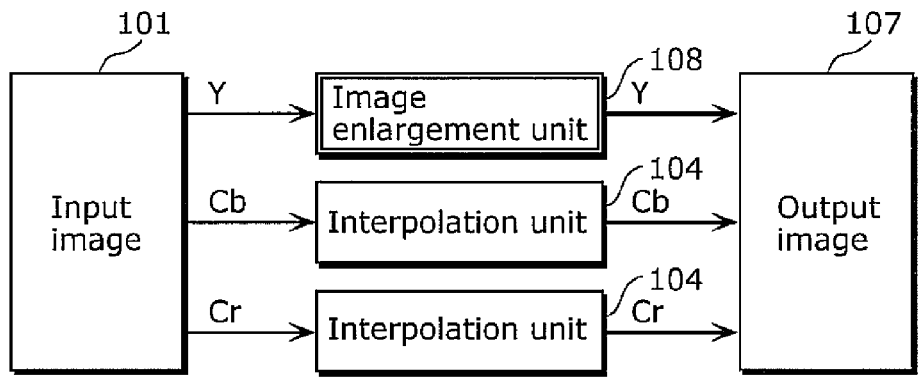
[FIG. 12]
Figure 13:
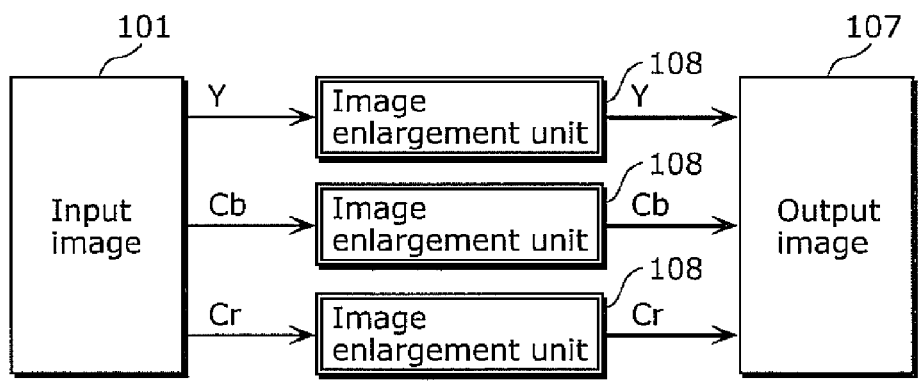
[FIG. 13]

FIGS. 12 and 13 are each a diagram showing an example of processing when a color space of an image to be processed is YCbCr.

In FIG. 12, each of the interpolation units 104 is the same as the interpolation unit 104 in FIG. 1, and the image enlargement unit 108 is the same as the image enlargement unit 108 in FIG. 1. In a system shown in FIG. 12, only the luminance component Y is subject to the processing by the image enlargement unit 108, and the chrominance components Cb and Cr are subject to conventional enlargement processing. By performing the processing of the present technique only on the luminance component associated with high visual effectiveness in this manner, the above-mentioned advantageous effects can be attained. In addition, by performing the conventional processing on the chrominance components, a reduction in processing amount can be expected.

FIG. 13 is a diagram showing an example where all components of YCbCr are subject to the processing by the image enlargement unit 108. As shown in FIG. 13, each component can be individually processed by the image enlargement unit 108.

Figure 14:
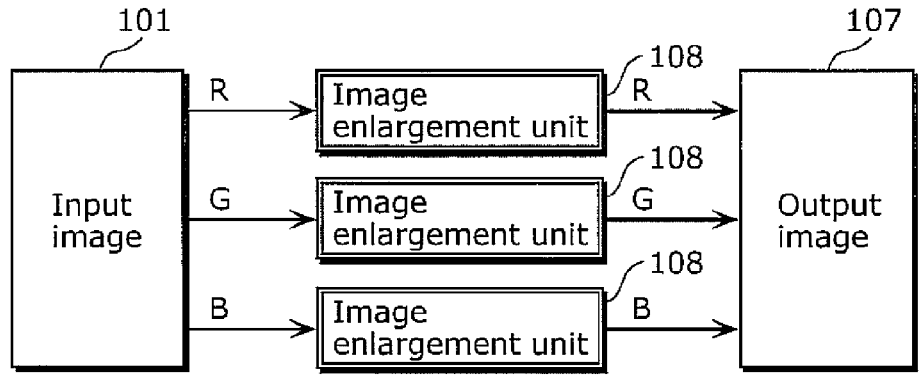
[FIG. 14]

FIG. 14 is a diagram showing an example of processing when a color space of an image to be processed is RGB.

Note that, in the case of the RGB space, all components are preferably subject to the processing by the image enlargement unit 108 as shown in FIG. 14. However, it is also possible to subject only one component such as the G component to the processing.

As described above, in the case of a color image defined in a multidimensional color space, too, the same advantageous effects as the embodiment A1 can be attained by applying the image enlargement unit 108 to each component individually.

[Embodiment A2]

The following describes the embodiment A2 with reference to drawings.

Figure 15:
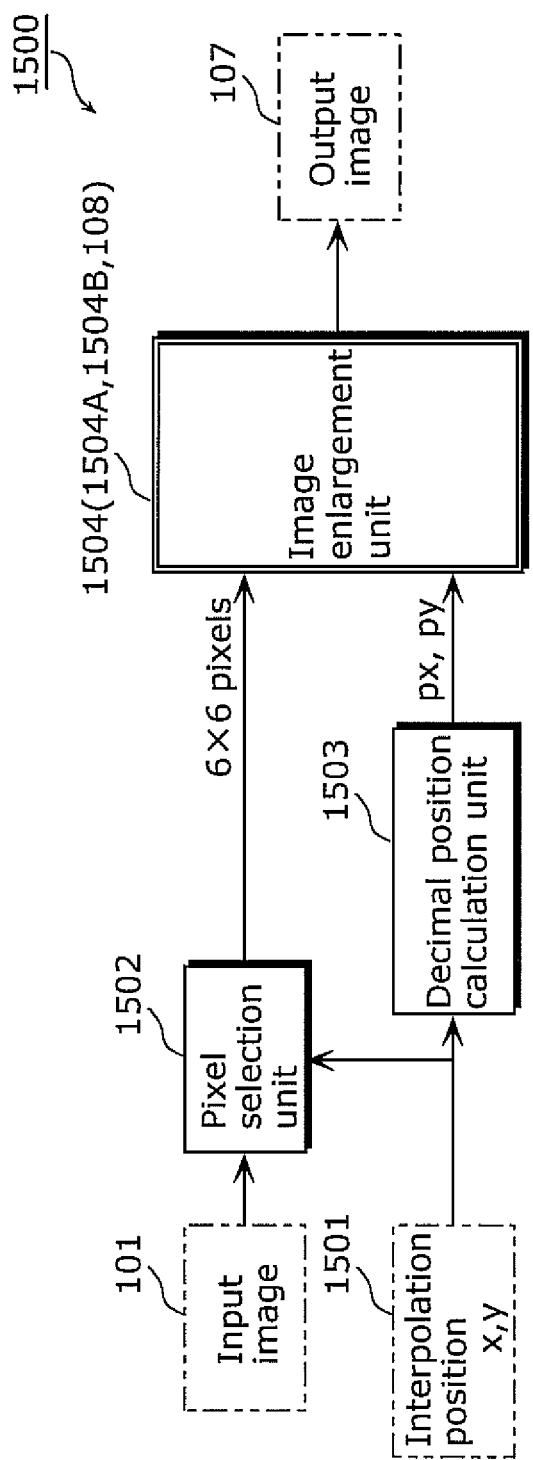
[FIG. 15]

FIG. 15 is a block diagram of an image enlargement apparatus 1500 in the embodiment A2.

In FIG. 15, 101 denotes an input image. 1501 denotes an interpolation position x,y. 1502 denotes a pixel selection unit that selects neighboring 6×6 pixels of the interpolation position x,y 1501. 1503 denotes a decimal position calculation unit that extracts a decimal part px,py of the interpolation position x,y 1501. 1504 denotes an image enlargement unit that receives the 6×6 pixels of the input image and the decimal position px,py, calculates a pixel value of the interpolation position x,y 1501, and outputs the calculated pixel value. 107 denotes a high-resolution image after an enlargement process.

Note that the image enlargement apparatus 1500 is also a subordinate conception of the image enlargement apparatus 108 (mentioned above). The image enlargement unit 1504 is a superordinate conception of an image enlargement unit 1504A in the embodiment A2, an image enlargement unit 1504B (FIG. 31) in an embodiment B2, and an image enlargement unit 1504C (FIG. 38) in an embodiment C2. The image enlargement unit 1504 is also a subordinate conception of the image enlargement apparatus 108.

Figure 16:
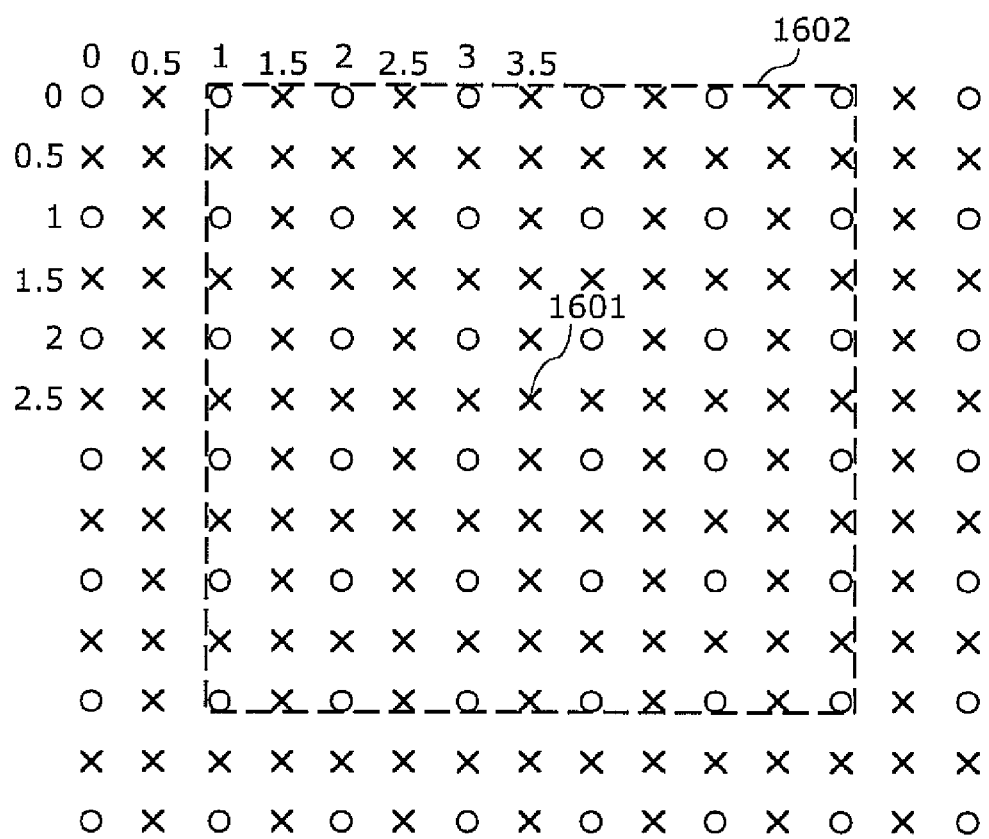
[FIG. 16]

FIG. 16 is a diagram showing relations between the interpolation position x,y 1501 and each of the low-resolution input image 101 and the high-resolution output image 107.

FIG. 16 shows an example where an enlargement factor is 2.0 in both horizontal and vertical directions. In FIG. 16, each circle indicates a pixel position in the low-resolution image, and each cross indicates a pixel position interpolated as the high-resolution image. That is, in the example of FIG. 16, the input image is composed of pixels indicated by the circles, and the outputted high-resolution image is composed of pixels indicated by both the circles and the crosses. Numbers in FIG. 16 show the interpolation position (x,y). The circle pixel positions in the inputted low-resolution image are integer positions such as (0,0), (1,0), (2,0), . . . , (1,0), (1,1), . . . . Meanwhile, the cross pixel positions are positions with a decimal point such as (0.5,0), (1.5,0), . . . .

Figure 17:
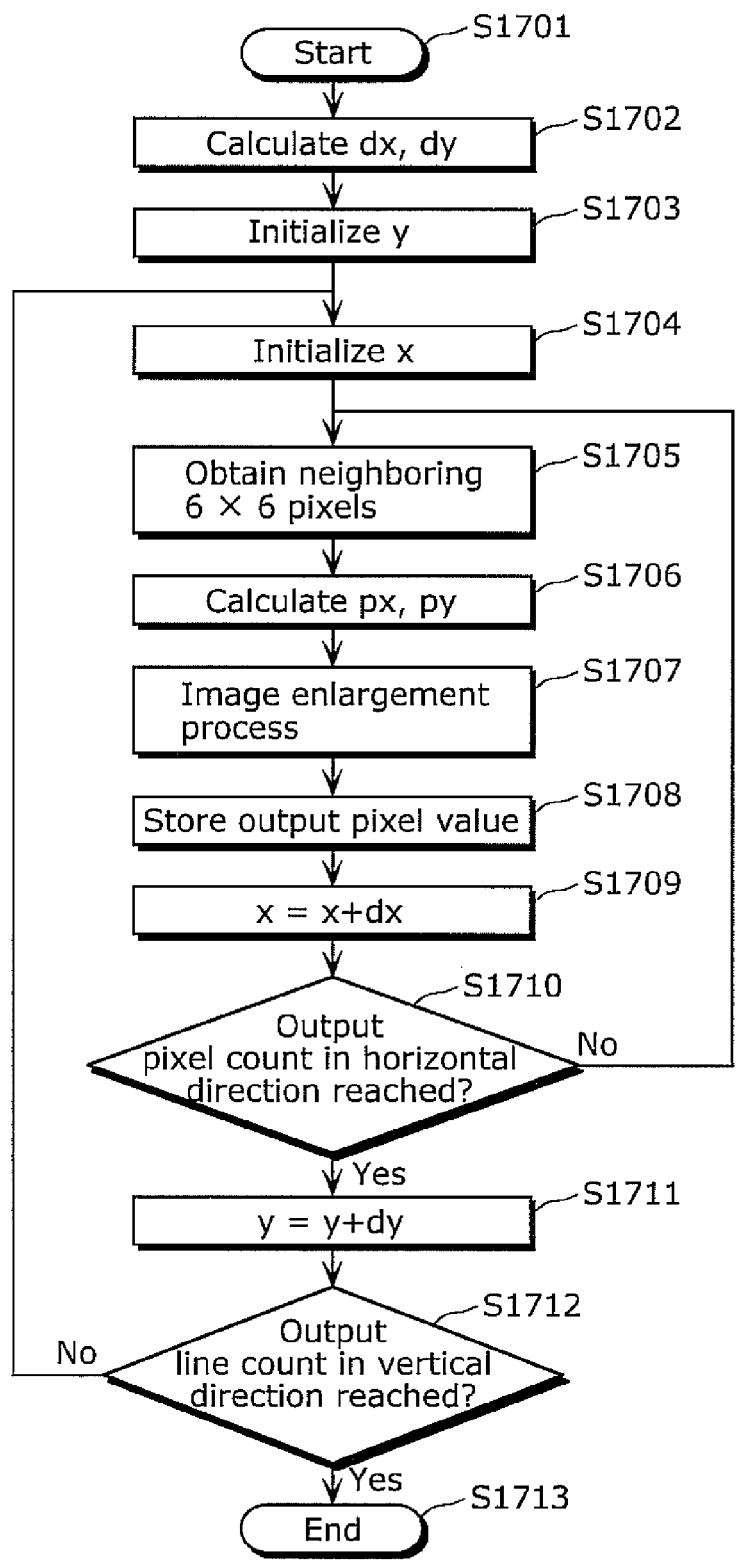
[FIG. 17]

FIG. 17 is a flowchart (Steps S1701 to S1713) of processing of generating the high-resolution output image 107 from the low-resolution input image 101 in the image enlargement apparatus 1500 in FIG. 15.

In an enlargement process, first, the pixel selection unit 1502 or the like calculates dx,dy which is an interpolation position increment in an enlarged image (Step S1702). This can be calculated from sizes of the input image 101 and the output image 107, according to the following Math. A3. In the Math. A3, Sw and Sh are respectively a width and a height of the input image, and Dw and Dh are respectively a width and a height of the output image.

$$dx = Sw/Dw$$

$$dy = Sh/Dh \qquad \text{[Math. A3]}$$

Though dx,dy is calculated according to the Math. A3 here, the method of calculating dx,dy is not limited to this. For example, the same advantageous effects can be expected even when dx,dy calculated according to the following Math. A4 is used. The Math. A4 is particularly effective in the case of a high enlargement factor.

$$dx = (Sw-1)/Dw$$

$$dy = (Sh-1)/Dh \qquad \text{[Math. A4]}$$

According to the calculation of the Math. A3, when the enlargement factor is 2, dx=0.5 and dy=0.5.

Next, the pixel selection unit 1502 or the like initializes the interpolation position y (Step S1703), and also initializes the interpolation position x (Step S1704). Such an initial position determines an initial phase upon enlargement. Here, the initial position is set to x=0 and y=0. Note that, to prevent a deviation from a center of the enlarged image, the initial position may be set to x=−0.25 and y=−0.25.

Following this, the pixel selection unit 1502 obtains neighboring 6×6 pixels including, at their center, four pixels adjacent to the interpolation position x,y, from the input image 101 (Step S1705). As an example, when the interpolation position is 1601 in FIG. 16, input pixels of neighboring 6×6 pixels centering on four pixels adjacent to the interpolation position 1601, indicated by a dotted line box 1602, are obtained.

Next, the decimal position calculation unit 1503 calculates the decimal position px,py of the interpolation position x,y (Step S1706). When the interpolation position is 1601 in FIG. 16, x=3.5 and y=2.5, from which an integer part is removed to yield px=0.5 and py=0.5.

After the input image of the neighboring 6×6 pixels of the interpolation position is obtained (Step S1705) and px,py is calculated (Step S1706), the image enlargement unit 1504A executes an image enlargement process using these inputs (Step S1707). Note that the image enlargement process will be described in detail later. As a result of the image enlargement process, an output pixel value corresponding to the interpolation position is outputted. The image enlargement unit 1504A stores the output pixel value corresponding to the interpolation position (Step S1708).

Next, the pixel selection unit 1502 or the like updates the interpolation position by dx in the horizontal direction (Step S1709). When the number of outputted pixels in the horizontal direction is less than an output pixel count (width), the process from Step S1705 is repeated (Step S1710: No).

When the number of outputted pixels in the horizontal direction is the output pixel count (Step S1710: Yes), the pixel selection unit 1502 or the like updates the interpolation position by dy in the vertical direction (Step S1711). When the number of outputted lines is less than an output line count (height), the process from Step S1704 is repeated (Step S1712: No). When the number of outputted lines is the output line count, the processing ends (Step S1712: Yes). As a result of the above processing, the enlarged high-resolution image is generated.

Figure 18:
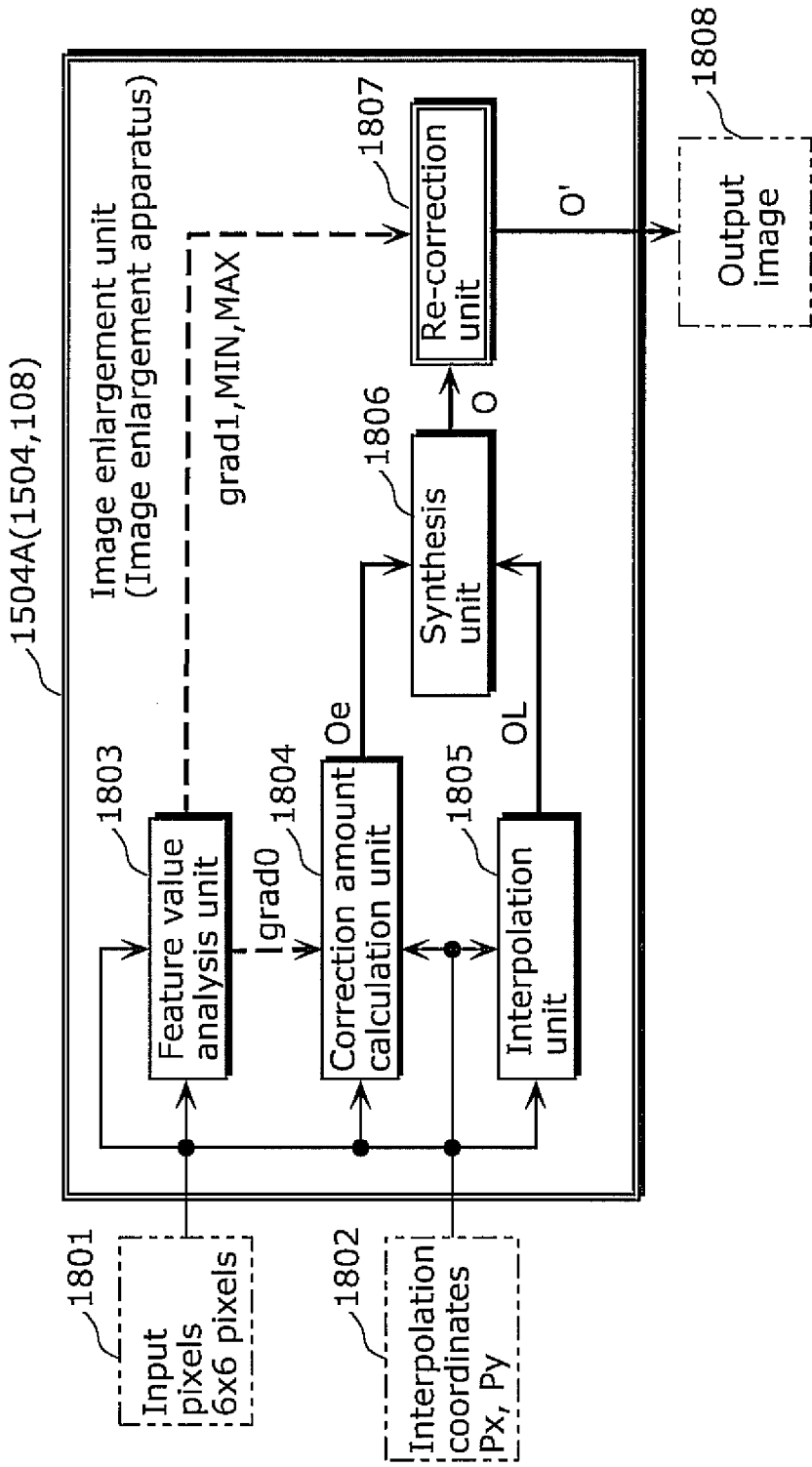
[FIG. 18]

FIG. 18 is a diagram showing a flow of processing of the image enlargement unit 1504A that performs the image enlargement process of Step S1707. The following describes the image enlargement process in detail, with reference to FIG. 18.

Note that details of the image enlargement unit 108A in the embodiment A1 are, for example, the same as the image enlargement unit 1504A.

(Feature Value Analysis Unit)

Figure 19:
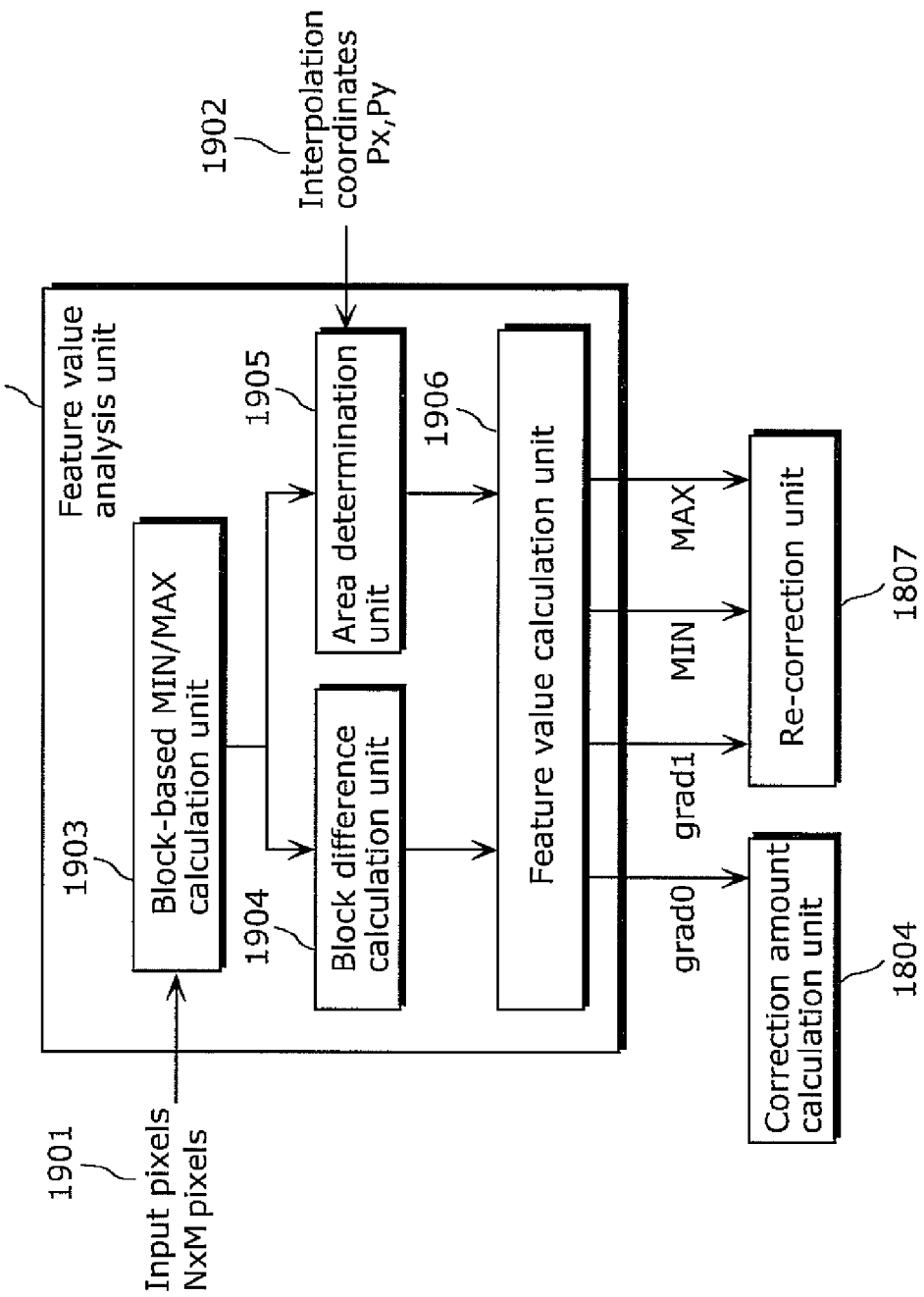
[FIG. 19]

FIG. 19 is a diagram showing a detailed process of a feature value analysis unit 1803 in FIG. 18.

The feature value analysis unit 1803 receives neighboring N×M pixels of the interpolation position (see Step S1705 in FIG. 17 and the like) in the input image 101 and px,py (see Step S1706, interpolation coordinates px,py 1802 in FIG. 18), and outputs grad0, grad1, MIN, and MAX as the feature value. It is assumed here that the inputted neighboring N×M pixels are 16 pixels where N=M=4, though the feature value may be calculated using pixels of a smaller or larger range.

When 4×4 pixels at the center of 6×6 pixels 1801 (FIG. 18) inputted to the image enlargement unit 1504A are inputted to the feature value analysis unit 1803, the feature value analysis unit 1803 first calculates a maximum value and a minimum value of pixel values of each 2×2 pixel block, in a block-based MIN/MAX calculation unit 1903.

Figure 20:
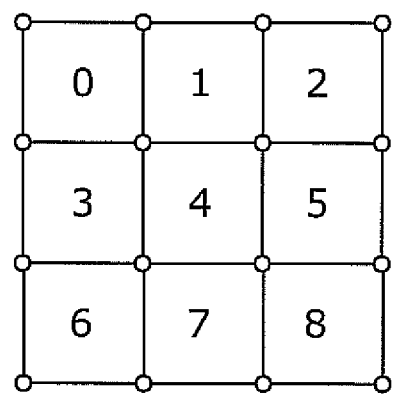
[FIG. 20]

FIG. 20 is a diagram showing division into nine 2×2 pixel blocks.

As shown in FIG. 20, a 2×2 pixel block is a block obtained by dividing 4×4 pixels into nine blocks each having 2×2 pixels. In FIG. 20, each circle indicates a pixel, and each number from 0 to 8 is a block number. Here, the minimum value and the maximum value of each block are denoted by MINn and MAXn (n=0, 1, 2, 3, ..., 8, which correspond to the block numbers in FIG. 20). A block difference calculation unit 1904 calculates a difference DIFFn for each block. An expression for calculating DIFFn is given by the following Math. A5.

$$DIFFn = MAXn - MINn \quad \text{[Math. A5]}$$

An area determination unit 1905 calculates 2×2 pixel blocks used for calculating MIN and MAX, and DX and DY used for interpolation, from the interpolation coordinates px,py (Step S1706 in FIG. 17).

Figure 21:
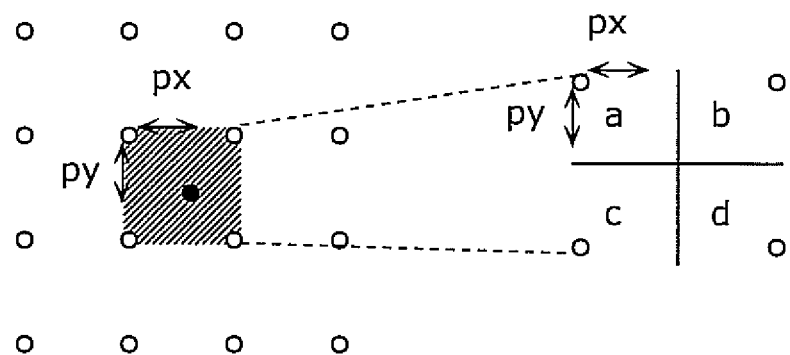
[FIG. 21]

FIG. 21 is a diagram showing relations between 4×4 pixels, px,py, and an interpolation pixel.

px,py is a decimal component of the interpolation position x,y, so that $0.0 \leq px, py < 1.0$. Accordingly, the position of px,py is within a diagonally shaded area in FIG. 21.

Depending on which of areas a, b, c, and d in FIG. 21 px,py belongs to, MINn and MAXn used for interpolation are changed as shown in FIG. 22.

Figure 22A:
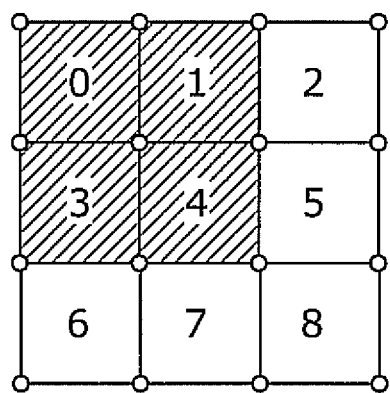
FIG. 22A is an explanatory diagram of area division for area determination in the embodiment A2.
Figure 22B:
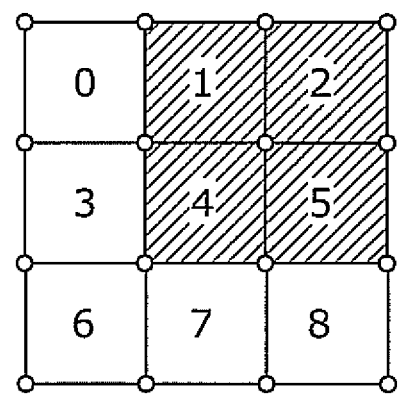
[FIG. 22B]
Figure 22C:
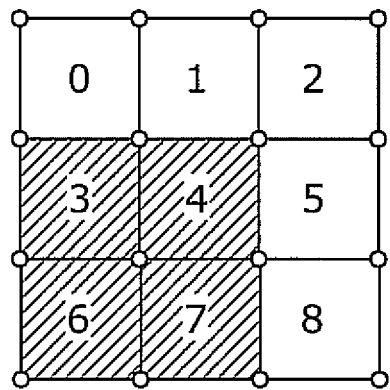
[FIG. 22C]
Figure 22D:
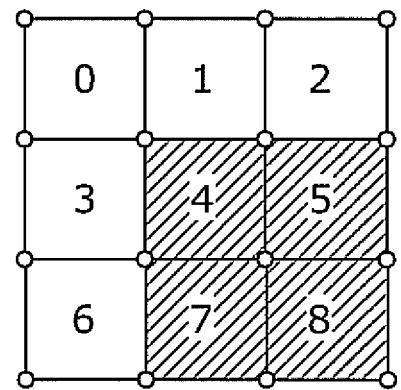
[FIG. 22D]

In detail, diagonally shaded blocks in FIG. 22A indicate MINn and MAXn selected when px,py belongs to the area a in FIG. 21. Diagonally shaded blocks in FIG. 22B indicate MINn and MAXn selected when px,py belongs to the area b in FIG. 21. Diagonally shaded blocks in FIG. 22C indicate MINn and MAXn selected when px,py belongs to the area c in FIG. 21. Diagonally shaded blocks in FIG. 22D indicate MINn and MAXn selected when px,py belongs to the area d in FIG. 21.

2×2 pixel blocks in the neighborhood of the interpolation position x,y are selected in this way.

The following Math. A6 is an expression for calculating MI0, MI1, MI2, MI3, MA0, MA1, MA2, MA3, DX, and DY. In detail, MINn of the selected 2×2 pixel blocks are used as MI0 to MI3, and MAXn of the selected 2×2 pixel blocks are used as MA0 to MA3. In the Math. A6, "DX=Px+0.5" indicates a ratio between a distance from the x coordinate of the interpolation position x,y to an x coordinate of a center of two left blocks (for example, 0 and 3) of the 2×2 pixel blocks and a distance from the x coordinate of the interpolation position x,y to an x coordinate of a center of two right blocks (for example, 1 and 4) of the 2×2 pixel blocks. The same applies to the other expressions of DX and DY.

(In the Case of the Area a)

$MI0 = MIN0$ $MI1 = MIN1$ $MI2 = MIN3$ $MI3 = MIN4$ $MA1 = MAX0$ $MA1 = MAX1$ $MA2 = MAX3$ $MA3 = MAX4$ $DX = Px + 0.5$ $DY = Py + 0.5$ (In the Case of the Area b)

$MI0 = MIN1$ $MI1 = MIN2$ $MI2 = MIN4$ $MI3 = MIN5$ $MA0 = MAX1$ $MA1 = MAX2$ $MA2 = MAX4$ $MA3 = MAX5$ $DX = Px - 0.5$ $DY = Py + 0.5$ (In the Case of the Area c)

$MI0 = MIN3$ $MI1 = MIN4$ $MI2 = MIN6$ $MI3 = MIN7$ $MA0 = MAX3$ $MA1 = MAX4$ $MA2 = MAX6$ $MA3 = MAX7$ $DX = Px + 0.5$ $DY = Py - 0.5$ (In the Case of the Area d)

$MI0 = MIN4$ $MI1 = MIN5$ $MI2 = MIN7$ $MI3 = MIN8$ $MA0 = MAX4$ $MA1 = MAX5$ $MA2 = MAX7$ $MA3 = MAX8$ $DX = Px - 0.5$ $DY = Py - 0.5$ [Math. A6]

A feature value calculation unit 1906 calculates grad0, grad1, MIN, and MAX, from DIFFn calculated by the block difference calculation unit 1904 and MI0 to MI3, MA0 to MA3, DX, and DY calculated by the area determination unit 1905.

An expression for this calculation is given by the following Math. A7. In the Math. A7, max( ) is a function of returning a maximum value from among values of a plurality of elements in "( )", and C0 is a constant. Moreover, it is assumed that grad0 and grad1 are clipped within a pixel value range.

$MAX = (1-dy)((1-dx) \cdot MA0 + dx \cdot MA1) + dy((1-dx) \cdot MA2 + dx \cdot MA3)$ $MIN = (1-dy)((1-dx) \cdot MI0 + dx \cdot MI1) + dy((1-dx) \cdot MI2 + dx \cdot MI3)$ $grad0 = (MAX - MIN) \cdot C0$ $grad1 = ((MAX - MIN) + max(DIFF0, DIFF1, \ldots, DIFF8)) \cdot C0 / 2$ [Math. A7]

Thus, the feature value analysis unit 1803 outputs grad0, grad1, MIN, and MAX (Step S462 in FIG. 46).

Here, according to the Math. A7, grad1 is influenced by a largest maximum value and minimum value in the blocks, when compared with grad0. This being so, when there is a large gradient in the 4×4 pixels, grad1 shows a large value. In other words, grad1 is likely to take a larger value than grad0.

Note that the output of the feature value analysis unit 1803 is not limited to such. As an example, a maximum value and a minimum value in the 4×4 pixels (see FIGS. 22A to 22D) may be set as MAX and MIN, where MAX−MIN is set as grad1 and MAX4−MIN4 is set as grad0. In this case, MAX, MIN, grad0, and grad1 are fixed while the same reference pixels are used for enlargement interpolation, which may cause conspicuous block boundaries in high-factor enlargement. When the enlargement factor is about 2, however, the same advantageous effects as in this embodiment can be expected.

(Correction Amount Calculation Unit)

Figure 23:
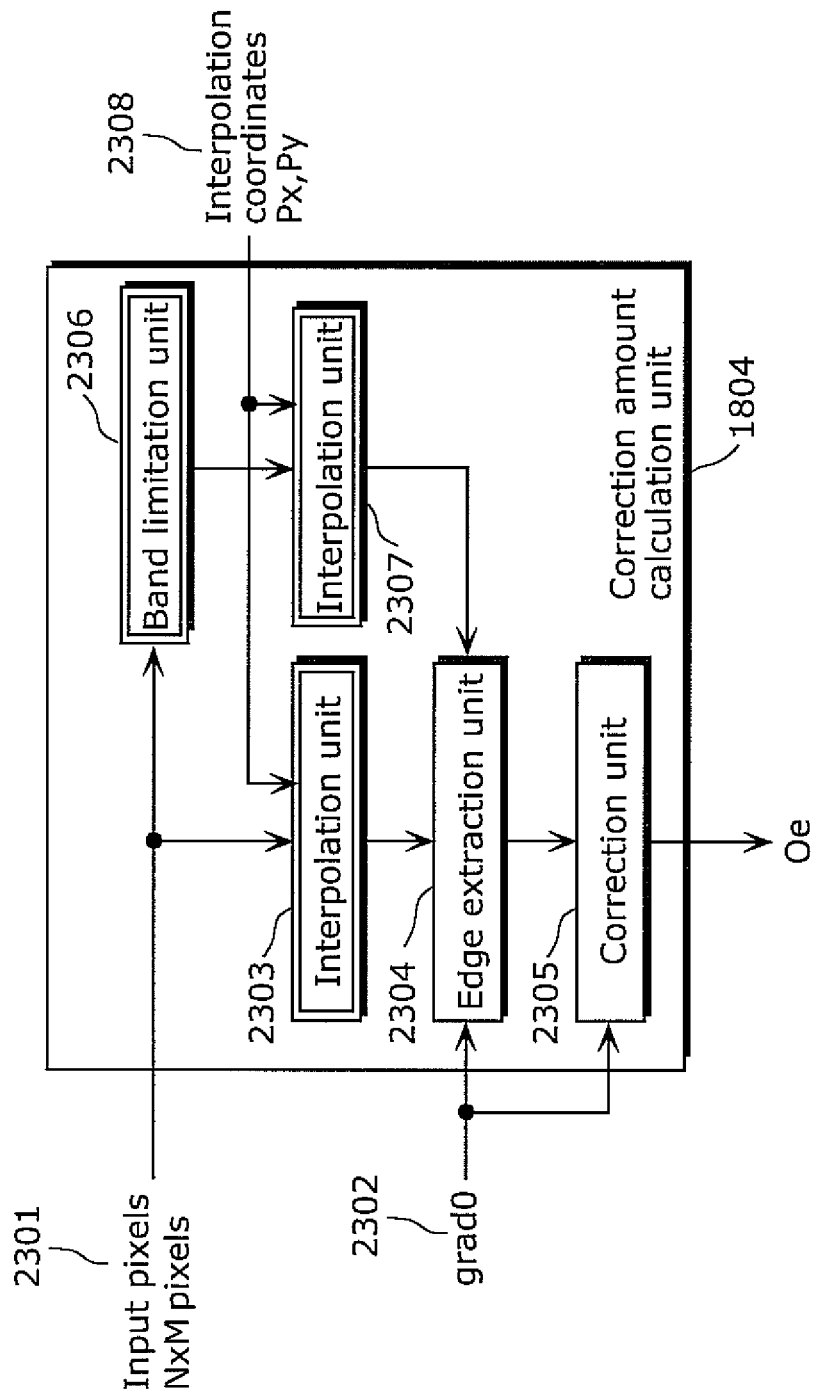
[FIG. 23]

FIG. 23 is a diagram showing a detailed process of a correction amount calculation unit 1804 in FIG. 18.

The correction amount calculation unit 1804 receives neighboring N×M pixels 2301 of the interpolation position (Step S1705 in FIG. 17) in the input image 101 (FIG. 15) and grad0 (grad0 2302 in FIG. 23) calculated by the feature value analysis unit 1803, and outputs a correction amount Oe. It is assumed here that N=M=6, though Oe may be calculated using N and M of a smaller or larger range.

A band limitation unit 2306 generates band-limited 4×4 pixels, using the 6×6 input pixels (the N×M pixels 2301 in FIG. 23). Here, a low-pass filter (LPF) of horizontal and vertical 3×3 taps is used for the band limitation. In the case of using the LPF of 3×3 taps, +1 pixel is needed on the left, right, top, and bottom in order to generate a LPF result of 4×4 pixels. Accordingly, 6×6 pixels are inputted to the correction amount calculation unit 1804. Note that the band limitation method is not limited to 3×3 taps, as a filter of more taps may be used. In such a case, though the number of inputted pixels increases, an improvement in band limitation filter property can be achieved.

Moreover, instead of using a two-dimensional LPF, LPF processing may be performed in the vertical direction after LPF processing in the horizontal direction, or LPF processing may be performed in the horizontal direction after LPF processing in the vertical direction. The same advantageous effects can be expected in either case.

An interpolation unit 2303 and an interpolation unit 2307 calculate pixel values of positions away from the interpolation position px,py by ±1 pixel, by interpolation.

Figure 24:
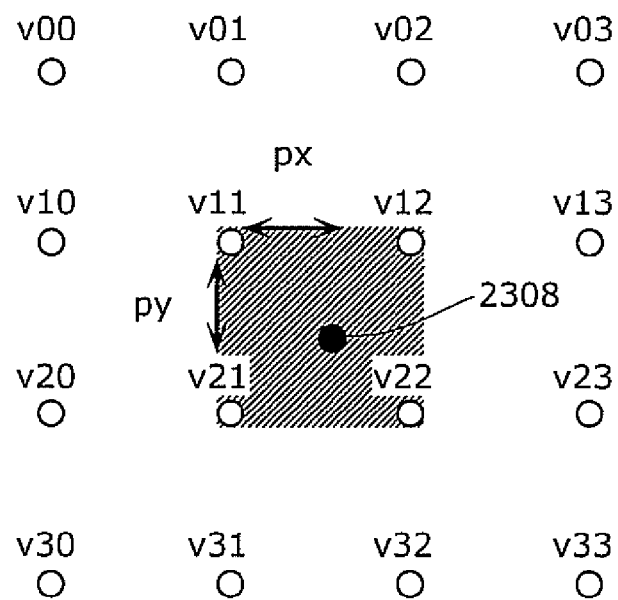
[FIG. 24]

FIG. 24 is a diagram showing a pixel position of the interpolation position px,py, where 4×4 input pixel values are denoted by v00 to v33.

Figure 25:
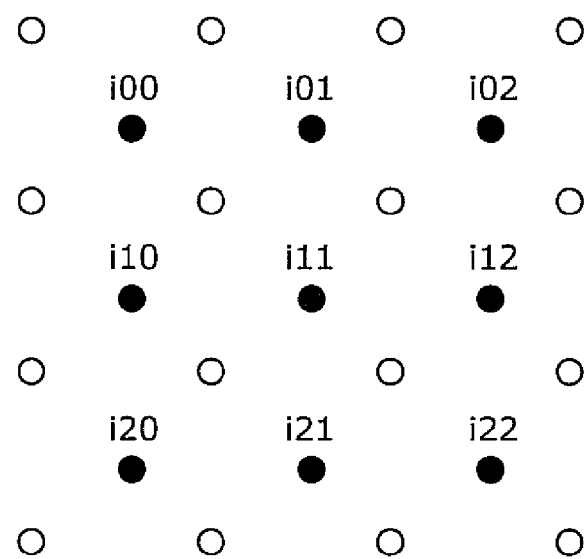
[FIG. 25]

FIG. 25 is a diagram showing eight positions i00 to i22.

Positions away from a pixel position 2308 by ±1 pixel are eight positions i00, i01, i02, i10, i12, i20, i21, and i22 shown in FIG. 25. The interpolation unit 2303 calculates pixel values of nine points including the position px,py, using the inputted 4×4 pixels. The interpolation unit 2307 calculates pixel values of nine points including the position px,py by interpolation, using the 4×4 pixels band-limited by the band limitation unit 2306.

Though the bilinear method, the bicubic convolution method, and the like can be used as the interpolation method, the bilinear method is suitable in the case of processing in the range of 4×4 pixels. Note that the bicubic convolution method is preferably used in a larger pixel range than 6×6 pixels.

An edge extraction unit 2304 extracts an edge component, using an output result of the interpolation unit 2303 or the interpolation unit 2307. Here, the result used in edge component extraction is switched between the interpolation unit 2303 and the interpolation unit 2307, according to the value of grad0 showing a gradient strength. For example, the result of the interpolation unit 2303 is used for edge extraction when grad0 is small, that is, when the gradient is small, and the band-limited result of the interpolation unit 2307 is used for edge extraction when grad0 is large. This allows for detection of even a small edge in the case of a small edge portion, and extraction of an edge component from which a noise component has been removed by the LPF in the case of a large edge portion.

As a method of extracting the edge component, coefficients in FIG. 6 and i00 to i22 are multiplied together. Note that the edge extraction using the coefficients in FIG. 6 is merely a processing example, and the edge component may be extracted using coefficients in FIG. 5 or other coefficients. By changing the filter coefficients, the strength or band of the extracted edge component can be changed. Moreover, by performing a nonlinear process called coring that rounds an edge component near 0 toward 0 in order to remove a noise component of the extracted edge component, it is possible to prevent the noise component from being enhanced.

A correction unit 2305 calculates the correction amount Oe (FIG. 18), using grad0 and the edge component extracted by the edge extraction unit 2304 (Step S463 in FIG. 46).

First, a gain for multiplying the extracted edge component is determined from grad0.

Figure 26:
[FIG. 26]

FIG. 26 is a diagram showing an example of a table for determining the gain from grad0.

In FIG. 26, a horizontal axis represents grad0, and a vertical axis represents the gain. The example in FIG. 26 is a graph that decreases the gain in a small gradient portion, i.e., a portion where grad0 is small, and increases the gain in a large gradient portion. The small gradient portion has a high possibility of being a noise component. Increasing the gain in this portion can cause noise enhancement. Therefore, the gain is reduced in the small gradient portion. Meanwhile, the large gradient portion has a high possibility of being an edge, so that the gain is increased so as to enhance the gradient.

Note that the relation between grad0 and the gain is not limited to this, and may be set freely. For example, the gain may be set to be highest in a portion where grad0 is intermediate, or may be set to have several peaks. In addition, the relation between grad0 and the gain may be represented by an expression or stored in a table. Here, only several points may be held in the table for a reduction in table size, while interpolating other points by linear interpolation or curve interpolation.

Having calculated the gain, the correction amount calculation unit 1804 outputs a result of multiplying the extracted edge component by the gain, as Oe.

As shown in FIG. 25, the correction amount calculation unit 1804 interpolates the pixel values of the pixel positions corresponding to +1 pixel from the interpolation position Px,Py, and extracts the edge component using the calculated nine pixels. When the enlargement factor is 2.0, the pixel positions corresponding to +1 pixel from the interpolation position Px,Py are present in the enlarged high-resolution image. Depending on the enlargement factor, however, the pixel positions are not present in the high-resolution image. For example, when the enlargement factor is 2.5, pixels of pixel positions such as 0, 0.4, 0.8, 1.2, 1.6, 2, 2.4, 2.8, ... are interpolated as pixel positions after enlargement. However, pixels of pixel positions corresponding to 0.6 and 2.6 which are +1 pixel from the pixel position of 1.6 as the interpolation position are not generated by enlargement. In this embodiment, by interpolating the pixels of the positions of +1 pixel in edge component extraction, an accurate, favorable edge component can be extracted for the interpolation position, as compared with the case of performing edge extraction using pixel values of the pre-enlargement image or the enlarged image.

Moreover, the correction amount calculation unit 1804 includes nonlinear processes such as coring and table lookup. Hence, the result is not the same as when enlargement is performed after edge enhancement or when edge enhancement is performed after enlargement. In edge correction amount calculation, such nonlinear processes are often included. However, in the case of performing processing sequentially, there is a possibility that the results of the nonlinear processes adversely affect subsequent processing. In this embodiment, by calculating the correction amount for the number of pixels of the high-resolution image directly from the low-resolution image, the adverse effect induced when the enlargement process and the edge enhancement process are performed sequentially can be suppressed. Note that, though this embodiment describes the case where edge extraction is performed after nine pixels are interpolated, an expression of interpolation and a determinant for simultaneously performing edge enhancement may be prepared beforehand so that the conversion is performed all at once. Such simultaneous conversion makes it possible to omit needless operations, contributing to a smaller hardware structure or calculation amount.

(Interpolation Unit)

An interpolation unit 1805 (FIG. 18) interpolates the pixel value of the pixel position Px,Py using the inputted 6×6 pixels 1801 and the interpolation coordinates Px,Py 1802, and outputs the interpolation image OL (Step S461 in FIG. 46). The interpolation in the interpolation unit 1805 is performed according to the bilinear method, the bicubic convolution method, or the like. Since these enlargement techniques are typical techniques and are not the essential features of this embodiment, their detailed description is omitted here.

(Synthesis unit)

A synthesis unit 1806 adds Oe calculated by the correction amount calculation unit 1804 to the pixel value OL of the high-resolution image generated by the interpolation unit 1805, and outputs a synthesized output pixel value O (Step S464 in FIG. 46).

An expression for calculating O is given by the following Math. A8.

$$O = OL + Oe \quad \text{[Math. A8]}$$

(Re-Correction Unit)

A re-correction unit 1807 corrects the pixel value using the pixel value O synthesized by the synthesis unit 1806 and the feature value including grad1, MIN, and MAX calculated by the feature value analysis unit 1803, and outputs a corrected pixel value O' (Step S465 in FIG. 46).

An expression for calculating the output value O' is given by the following Math. A9.

$$\text{When } O > MAX, \ O' = MAX + \min((O - MAX) \cdot GAIN, LIMIT).$$

$$\text{When } O < MIN, \ O' = MIN - \min((MIN - O) \cdot GAIN, LIMIT).$$

$$\text{Otherwise, } O' = O. \quad \text{[Math. A9]}$$

In the Math. A9, GAIN and LIMIT are parameters calculated from grad1.

Figure 27:
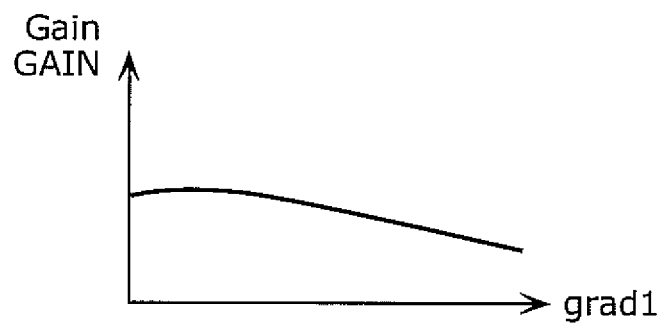
[FIG. 27]

FIG. 27 is a diagram showing a relation between grad1 and GAIN.

In FIG. 27, the gain is increased when grad1 is small, and decreased as grad1 increases (Step S465b in FIG. 46, the C multiplication unit 1061 in FIG. 45).

Figure 28:
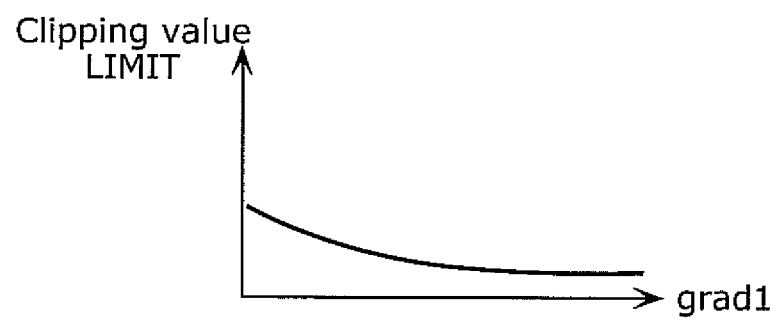
[FIG. 28]

FIG. 28 is a diagram showing a relation between grad1 and LIMIT.

In FIG. 28, LIMIT is increased when grad1 is small, and decreased when grad1 is large (Step S465c in FIG. 46, the threshold clipping unit 1062 in FIG. 45).

According to the above settings, in a portion where grad1 is large, that is, in a portion including a strong edge component, clipping by LIMIT is strict (strong), as a result of which a sharp image is generated. In a portion having a small amplitude, on the other hand, clipping is not so strict, and therefore unnaturalness caused by cutting shoot can be suppressed.

Note that FIGS. 27 and 28 show merely an example of settings, and the relation between grad1 and each of GAIN and LIMIT can be set freely by the user.

Figure 9:
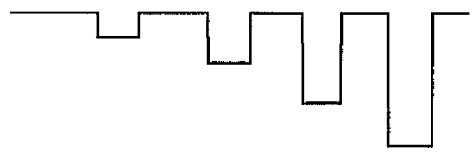
[FIG. 9]
Figure 10:
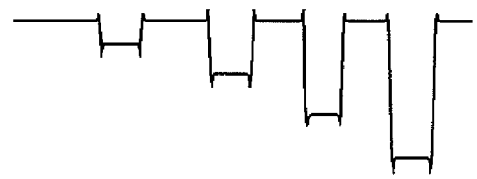
[FIG. 10]

As described above, with the image enlargement apparatus of the embodiment A, a natural image having sharp edges with no strong shoot (FIG. 10) can be generated. While preventing shoot (FIG. 8) that occurs when edge enhancement is performed before or after enlargement, the generated image is not an unnatural image in which shoot is completely suppressed (FIG. 9).

In summary, when enlarging a low-resolution image (the input image 101 in FIGS. 1 and 15) to a high-resolution image (the output image 107 in FIGS. 1 and 15) and displaying the high-resolution image, there is a problem that the enlargement causes a blurred image. In view of this, an image enlargement apparatus (the image enlargement apparatus 108, the image enlargement unit 1504, the image enlargement apparatus 1500) that receives a low-resolution input image and outputs a high-resolution output image includes: a feature value analysis unit (the feature value analysis unit 102, the feature value analysis unit 1803) that analyzes a feature value of the input image and generates a feature value for the number of pixels of the high-resolution image; a correction amount calculation unit (the correction amount calculation unit 103, the correction amount calculation unit 1804) that receives the low-resolution input image, and calculates and outputs an edge correction amount for the number of pixels of the high-resolution image on the basis of the feature value; an interpolation unit (the interpolation unit 104, the interpolation unit 1805) that generates an enlarged image (interpolation image) by interpolation; a synthesis unit (the synthesis unit 105, the synthesis unit 1806) that synthesizes the interpolation image and the correction amount; and a re-correction unit (the re-correction unit 106, the re-correction unit 1807) that receives the feature value and a synthesized pixel value, and re-corrects the pixel value to perform correction according to the input image. Hence, a sharp enlarged image with reduced shoot can be generated.

With this image enlargement apparatus, the blurriness suppression, the edge neighborhood bright appearance prevention, and the image paint daub appearance prevention can all be achieved, which contributes to a sufficient and reliable improvement in image quality.

[Embodiment B]

The following describes the embodiment B with reference to drawings. The embodiment B is a variation of the embodiment A. In the embodiment B, repeated description of the same points as the above is omitted according to need. Note that the following description references the above-mentioned drawings (FIGS. 1 to 29) according to need. Moreover, in the embodiment B, structures corresponding to the above-mentioned structures are given the same reference numerals or the same names according to need.

An image enlargement apparatus according to the embodiment B (the image enlargement apparatus 108B, the image enlargement unit 1504B, and the like) is an image enlargement apparatus in which the re-correction unit generates the corrected second high-resolution image (a thick solid line in FIG. 30B, FIG. 32C, a wide-pitch thick broken line in FIG. 47) by re-correcting the first high-resolution image (FIG. 32A, a dotted line in FIGS. 30B and 47) outputted by the synthesis unit using a threshold (see U'x,y in FIGS. 30A, 30B, and 47), the threshold being calculated from the feature value generated by the feature value analysis unit and the interpolation image (Ix,y in FIGS. 30A, 30B, and 47) outputted by the interpolation unit.

[Embodiment B1]

Figure 29:
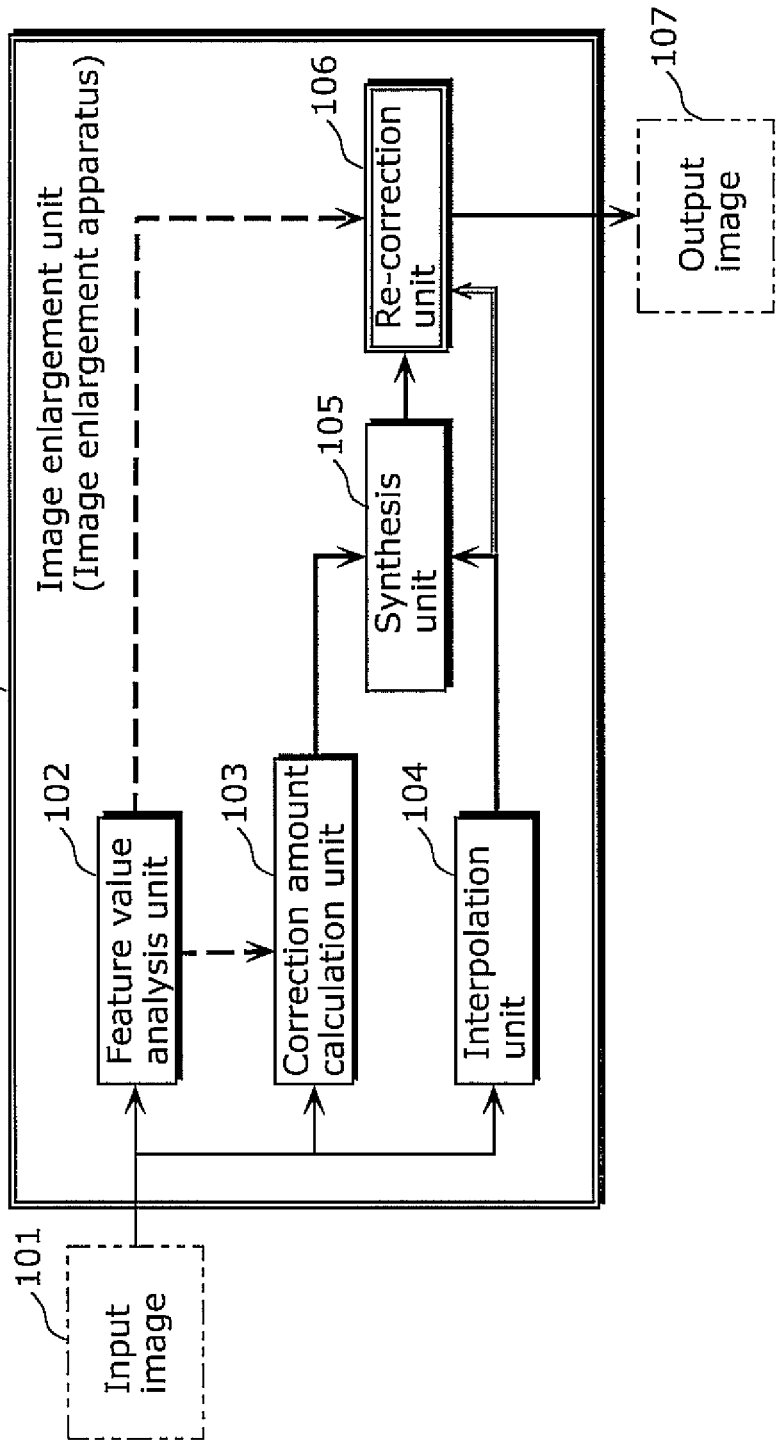
[FIG. 29]

FIG. 29 is a block diagram of the image enlargement unit 108B (a subordinate conception (an example) of the image enlargement unit 108) in an embodiment B1.

In FIG. 29, 101 denotes a low-resolution input image (original image). 102 denotes a feature value analysis unit that outputs a feature value corresponding to each pixel of an outputted high-resolution image (first high-resolution image, second high-resolution image), from the low-resolution input image 101. 103 denotes a correction amount calculation unit that calculates a correction amount of an edge component according to the feature value outputted from the feature value analysis unit 102, that is, calculates a correction amount of each pixel of the outputted high-resolution image (second high-resolution image), and outputs the calculated correction amount. 104 denotes an interpolation unit that receives the low-resolution input image 101, and generates an image (interpolation image) having the same number of pixels as the outputted high-resolution image. 105 denotes a synthesis unit that receives a pixel of a high-resolution image (interpolation image) outputted from the interpolation unit 104 and also receives a correction amount corresponding to the pixel from the correction amount calculation unit 103, and outputs a corrected pixel (first high-resolution image). 106 denotes a re-correction unit that re-corrects a synthesis result (first high-resolution image) outputted from the synthesis unit 105 using a threshold calculated from the pixel value generated by the interpolation unit 104 and a feature value corresponding to the output pixel received from the feature value analysis unit 102, and outputs a re-correction result. 107 denotes the outputted high-resolution image (second high-resolution image). 108B denotes the image enlargement unit that receives the low-resolution image and outputs the high-resolution image (second high-resolution image).

The following describes a procedure of the re-correction performed by the re-correction unit 106 in the image enlargement unit 108B (FIG. 29) in the embodiment 131.

Figure 47:
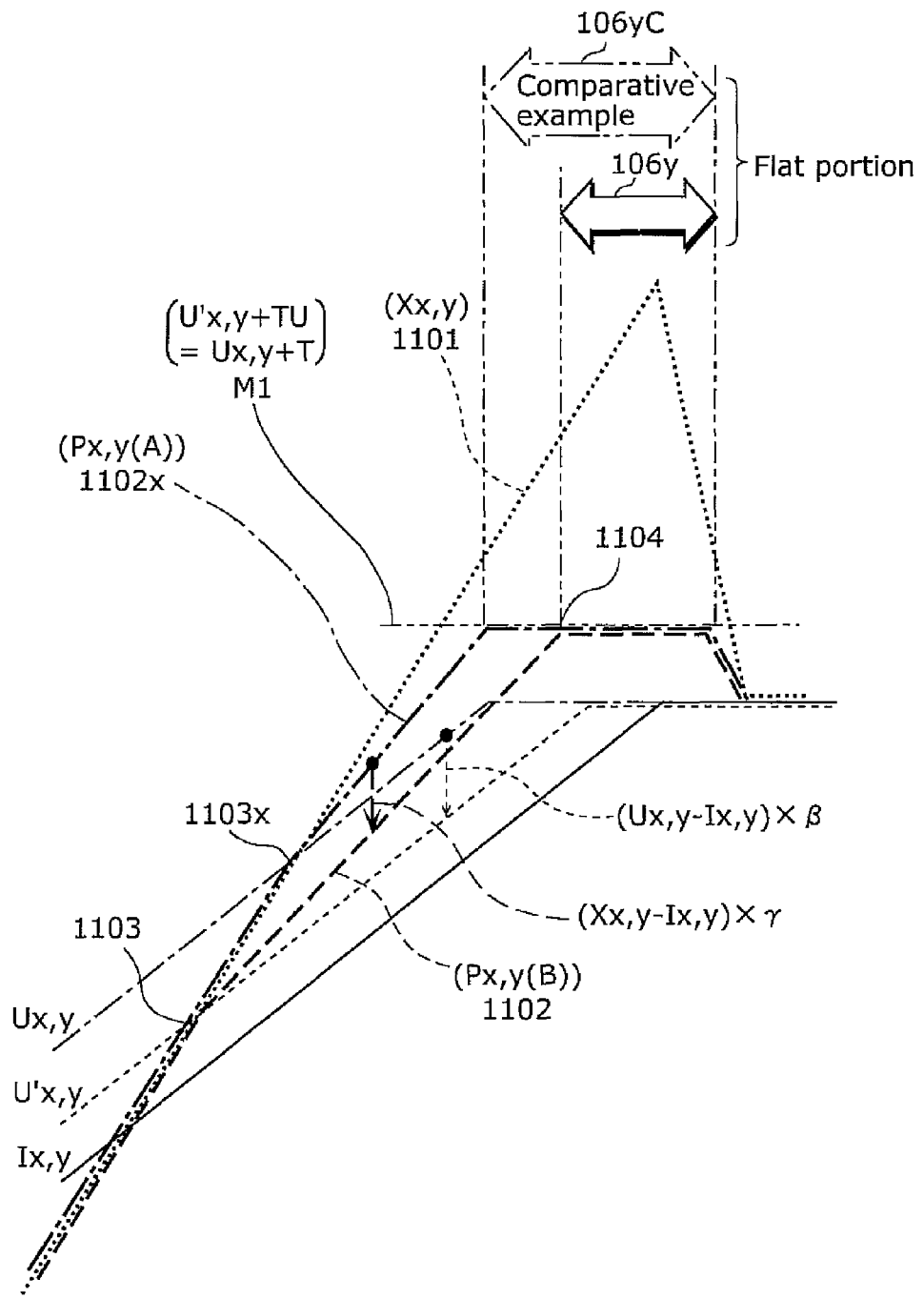
[FIG. 47]

For a pixel position (x,y) in the high-resolution image (first high-resolution image), let Xx,y (data indicated by a dotted line in FIG. 47) be an output pixel value of the synthesis unit 105, Ux,y (data indicated by a narrow-pitch thin alternate long and short dash line in FIG. 47) be an upper limit calculated by the feature value analysis unit 102, Lx,y be a lower limit calculated by the feature value analysis unit 102, and Ix,y (data indicated by a solid line in FIG. 47) be a pixel value (interpolation image) generated by the interpolation unit 104. The re-correction unit 106 calculates an upper threshold U'x,y (data indicated by a narrow-pitch thin broken line in FIG. 47), a lower threshold L'x,y, an upper limit value TU (see a value M1 of U'x,y+TU at a maximum point in FIG. 47), and a lower limit value TL, according to the following Math. B1. In the Math. B1, α and T are constants set beforehand, where α is in a range of 0.0 to 1.0.

(Calculation on the lower limit side)

When Ix,y≤Lx,y, L'x,y=Lx,y

TL=T.

When $Ix,y>Lx,y$, $d0=Ix,y-Lx,y$ $d0'=d0 \times \alpha$ $L'x,y=Ix,y-d0'$ $TL=T+d0-d0'$.

(Calculation on the upper limit side)

When $Ux,y \leq Ix,y$, $U'x,y=Ux,y$ $TU=T$.

When $Ux,y>Ix,y$, $u0=Ux,y-Ix,y$ $u0'=u0 \times \alpha$ $U'x,y=Ix,y+u0'$ $TU=T+u0-u0'$.  [Math. B1]

Here, β in FIG. 47 has a relation β=1−α (0<β<1) with α.

That is, a value smaller than $Ux,y$ by $(Ux,y-Ix,y) \times \beta$ is calculated as $U'x,y$ (see a narrow-pitch thin broken line arrow in FIG. 47). $U'x,y$ has a distance obtained by subtracting, from $Ux,y$, a proportion P portion $((Ux,y-Ix,y) \times \beta)$ of a distance $(Ux,y-Ix,y)$ from $Ux,y$ to $Ix,y$, as a distance to $Ix,y$.

Figure 31:
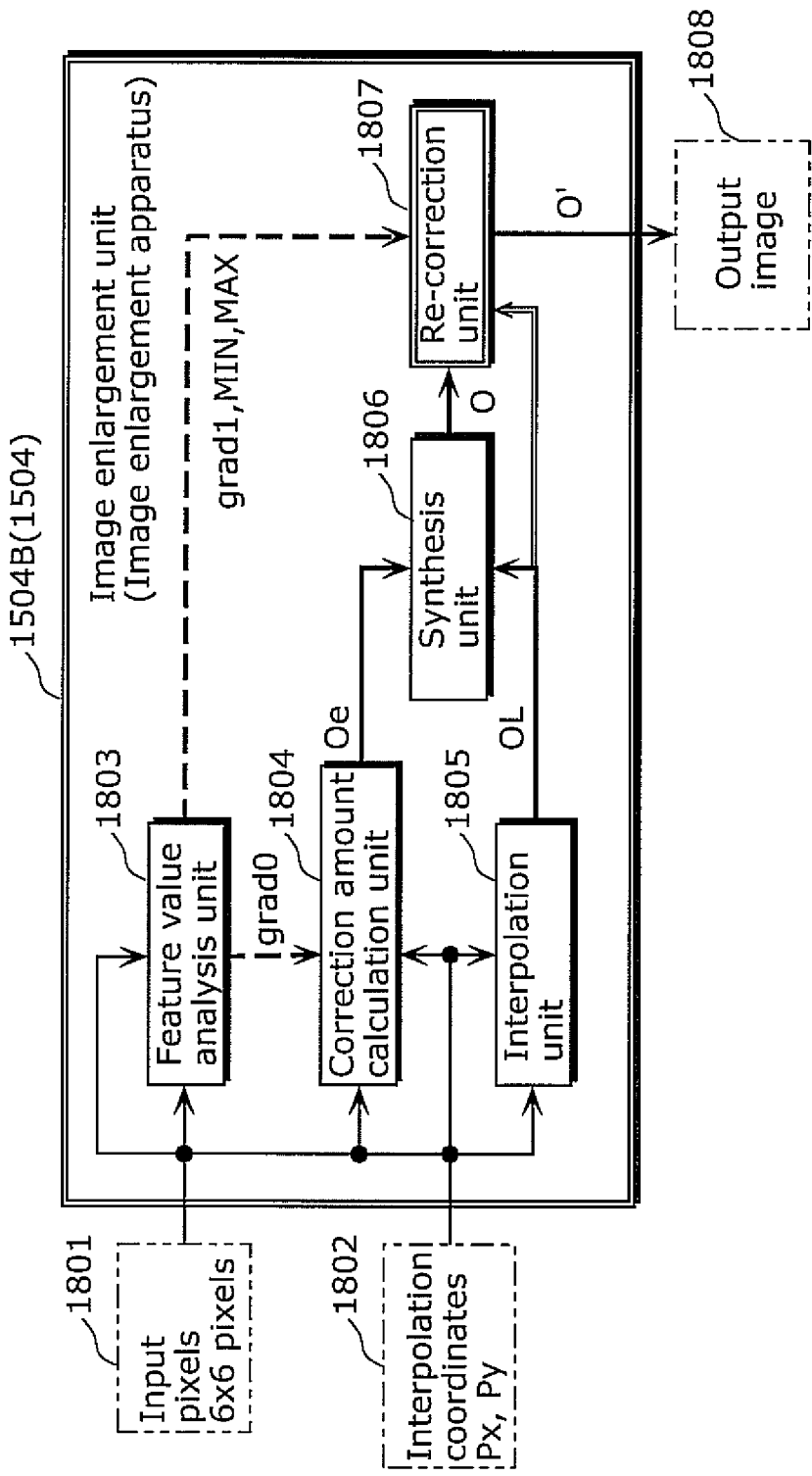
[FIG. 31]

Note that an arrow from the interpolation unit 104 to the re-correction unit 106 in FIG. 29 (an arrow from the interpolation unit 1805 to the re-correction unit 1807 in FIG. 31) indicates that the re-correction unit 106 (the re-correction unit 1807) obtains $Ix,y$ from the interpolation unit 104 (the interpolation unit 1805) in order to calculate such $U'x,y$.

After calculating $U'x,y$, $L'x,y$, TU, and TL according to the Math. B1, the re-correction unit 106 (the C multiplication unit 1061 in FIG. 45, Step S465 in FIG. 46) calculates a correction value Px,y according to the following Math. B2. The correction value Px,y calculated here is shown as a correction value Px,y(B) 1102 (data indicated by a wide-pitch thick broken line) in FIG. 47.

When $Xx,y>U'x,y$, $Px,y=U'x,y+(Xx,y-U'x,y) \times C$.

When $Xx,y<L'x,y$, $Px,y=L'x,y-(L'x,y-Xx,y) \times C$.

Otherwise, $Px,y=Xx,y$.  [Math. B2]

In the Math. B2, C is a constant set beforehand in a range of 0.0 to 1.0.

As mentioned earlier, when $Ux,y>Ix,y$, $U'x,y=Ux,y-(Ux,y-Ix,y) \times \beta$. Accordingly, when "$Ux,y>Ix,y$ and $Xx,y>U'x,y$", $Px,y=Px,y(B)=U'x,y+(Xx,y \times C=\{Ux,y+(Xx,y \quad Ux,y) \times C\}-(Ux,y-Ix,y) \times \beta \times (1-C)=Px,y(A)-(Ux,y-Ix,y) \times y$ (where $y=\beta \times (1-C)$, $0<y<1$, see FIG. 47). Here, Px,y(A) indicates not the correction value Px,y in this embodiment B1(Px,y(B)), but the above-mentioned correction value Px,y in the embodiment A (a width-pitch thick alternate long and short dash line in FIG. 47). That is, Px,y(B) is smaller than Px,y(A) by the above $(Ux,y-Ix,y) \times y$ (see a wide-pitch thick broken line arrow in FIG. 47).

As a result of this calculation, a portion exceeding the upper limit $U'x,y$ ($<Ux,y$) and the lower limit $L'x,y$ ($<Lx,y$) is multiplied by C (clipped). Since C is set to be no more than 1.0, the portion exceeding the range of $U'x,y$ to $L'x,y$ is reduced by correction.

Next, the re-correction unit 106 calculates a second correction value P'x,y (a flat portion near a maximum point of Px,y(B)) by further correcting the correction value Px,y according to the following Math. B3. Here, min(a, b) is a function of selecting a smaller one of a and b.

When $Px,y>U'x,y$, $P'x,y=U'x,y+\min(Px,y-U'x,y,TU)$.

When $Px,y<L'x,y$, $P'x,y=L'x,y-\min(L'x,y-Px,y,TL)$.

Otherwise, $P'x,y=Px,y$.

According to the Math. B3, a component of overshoot and undershoot exceeding TU or TL (the value M1) is converted to TU or IL.

The re-correction unit 106 outputs the second correction value P'x,y (Px,y(B) in FIG. 47) (Step S465*d* in FIG. 46, the threshold clipping unit 1062 in FIG. 45).

Figure 30A:
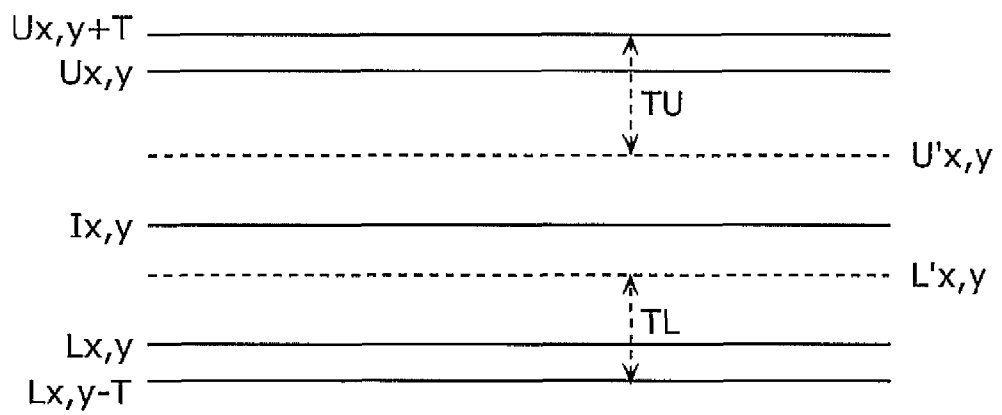
[FIG. 30A]

FIG. 30A is a diagram showing relations between Ux,y, Lx,y, Ix,y, U'x,y, L'x,y, TU, and TL.

Since the constant α is in a range of 0.0 to 1.0, the relations between these values are as shown in FIG. 30A. In FIG. 30A, U'x,y and L'x,y are closer to Ix,y than Ux,y and Lx,y (see FIG. 47), and a portion of the output of the synthesis unit 105 exceeding U'x,y and L'x,y is corrected according to the Math. B2 and the Math. B3. Here, U'x,y+TU=Ux,y+T (see FIG. 47), and L'x,y−TL=Lx,y−T.

Figure 30B:
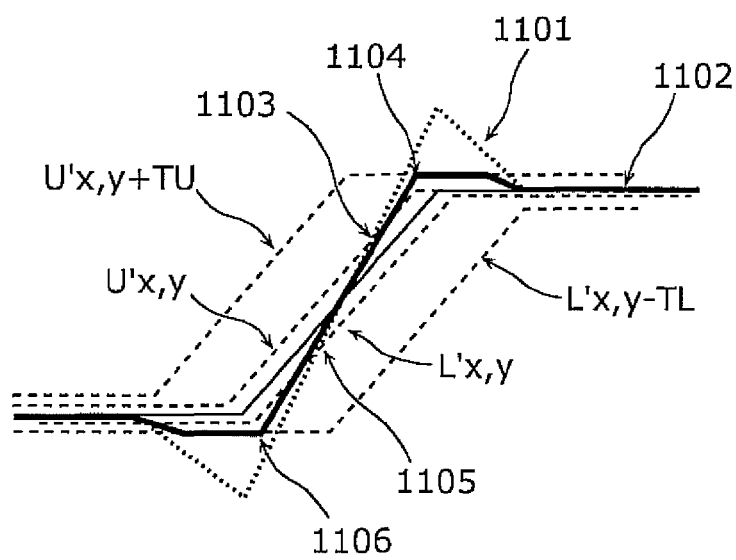
[FIG. 30B]

FIG. 30B is a diagram showing an example where the corrections according to the Math. B2 and the Math. B3 are performed.

Note that the graph of FIG. 47 schematically represents the graph of FIG. 30B. For details of FIG. 47, see FIG. 30B according to need.

In FIG. 30B, a dotted (circle) line 1101 (the dotted line data in FIG. 47) indicates the output of the synthesis unit 105, and a thick solid line 1102 (the wide-pitch thick broken line data in FIG. 47) indicates the output of the re-correction unit 106. Meanwhile, a thin solid line (the solid line data in FIG. 47) is the output Ix,y of the interpolation unit 104, and broken lines respectively indicate U'x,y, L'x,y, U'x,y+TU, and L'x,y−TL (the narrow-pitch thin alternate long and short dash line data, alternate long and two short dashes line data of the value M1 in FIG. 47).

As shown in FIG. 30B, the output (Px,y(B)) is changed in gradient by the constant C (C=1−γ/β(γ<β)) at a point 1103 (see FIG. 47) where the dotted line 1101 exceeds U'x,y, and clipped by U'x,y+TU (the alternate long and two short dashes line in FIG. 47) at a point 1104 of exceeding U'x,y+TU.

Likewise, the output is changed in gradient at a point 1105 where the dotted line 1101 decreases below L'x,y, and clipped by L'x,y−TL at a point 1106 of decreasing below L'x,y TL. Hence, an image having a strong edge gradient with reduced overshoot and undershoot is generated from the signal 1101 (Xx,y, the dotted line data in FIG. 47) of the synthesis unit 105, as shown in FIG. 30B. Here, since the correction of the edge gradient starts before reaching the upper limit or the lower limit, unnaturalness caused by gradient enhancement can be prevented.

As described above, according to the embodiment B1, it is possible to provide a natural image in which shoot caused by edge enhancement is suppressed while alleviating blurriness caused by an enlargement process by means of edge enhancement. Therefore, even when enlarging a low-resolution image, a natural image can be displayed without a loss of image sharpness.

Note that a point 1103*x* in FIG. 47 indicates a point of Px,y(A) in the embodiment A1, which corresponds to the point 1103 in the embodiment B1.

Moreover, a range 106*y* indicates a range flattened as a result of the correction in Px,y(B), whereas a range 106*y*C indicates a range flattened as a result of the correction in Px,y(A).

As mentioned above, the re-correction unit (the re-correction unit 106) removes a third component $((Xx,y-Ix,y) \times y$ in FIG. 47) from the first high-resolution image (FIG. 32A, the dotted line in FIGS. 30B and 47), as at least one part of the first component to be removed. The third component is such a component the removal of which results in the generation of the second high-resolution image (FIG. 32C, Px,y(B) in FIG. 47) having a narrower flat range (FIG. 32C, the range 106y in Px,y(B) in FIG. 47) than a flat range (the range 106yC) of the second high-resolution image (FIG. 32B, Px,y(A) in FIG. 47, and the like) in the case of not removing the third component.

Thus, the flat range can be made narrower (the range 106y) than the original range (the range 106yC), with it being possible to attain higher image quality by suppressing a paint daub appearance (lack of sharpness) of an image more sufficiently.

Here, the synthesis unit (the synthesis unit 105, the edge enhancement unit) may add the correction amount to a pixel value of the interpolation image (Ix,y in FIGS. 30A and 47, the thin solid line in FIG. 30B) generated by the interpolation unit, to generate the first high-resolution image (the dotted line in FIGS. 30B and 47) in which an edge in the interpolation image is enhanced.

Figure 32A:
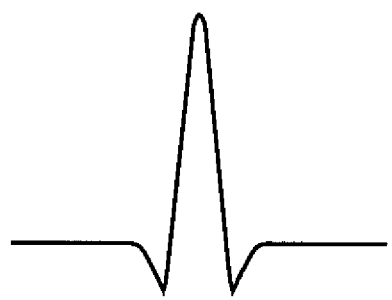
[FIG. 32A]
Figure 32B:
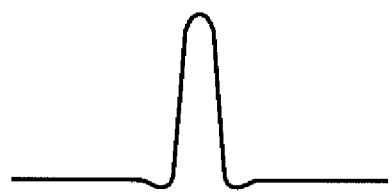
[FIG. 32B]
Figure 32C:
[FIG. 32C]

Moreover, the re-correction unit may generate the second high-resolution image (the thick solid line in FIG. 30B, Px,y(B) in FIG. 47) in which, in an overcorrection component (shoot component) in the first high-resolution image, a component specified using the threshold (see U'x,y in FIGS. 30A, 30B, and 47) calculated on the basis of the difference is removed, and calculate a second value (U'x,y) as the threshold, the overcorrection component being a component that is overcorrected in the enhancement of the edge and causes a neighborhood of the edge to appear bright, the second value being a value for generating the second high-resolution image (the thick solid line in FIG. 30B, FIG. 32C, Px,y(B) in FIG. 47) having a narrower flat portion (the range 106y) than a flat portion (the range 106yC) of the second high-resolution image (FIG. 32B, Px,y(A) in FIG. 47) generated in the case where a first value (Ux,y in FIGS. 30A and 47) is specified as the threshold.

[Embodiment B2]

The following describes the embodiment B2 with reference to drawings.

FIG. 31 is a diagram showing a flow of processing of the image enlargement unit 1504B (FIG. 15) that performs the image enlargement process of Step S1707 (FIG. 17) in the embodiment B2. The following describes the image enlargement process in the embodiment B2 in detail, with reference to FIG. 31.

The image enlargement apparatus 1500 (FIG. 15) in the embodiment B2 includes the image enlargement unit 1504B in FIG. 31, as the image enlargement unit 1504.

(Re-Correction Unit)

The re-correction unit 1807 corrects a pixel value O (first high-resolution image) synthesized by the synthesis unit 1806, using the pixel value O (first high-resolution image) synthesized by the synthesis unit 1806, a pixel value OL (interpolation image) calculated by the interpolation unit 1805, and the feature value including grad1, MIN, and MAX calculated by the feature value analysis unit 1803. The re-correction unit 1807 then outputs a corrected pixel value O' (second high-resolution image).

A method of calculating O' is described below, using the following Math. B4 to Math. B6.

When OL<MIN, NMIN=MIN

LLIM=LIMIT.

When $OL$>MIN, $N$MIN=$OL$−($OL$−MIN)×$E$ $L$LIM=LIMIT+(1−$E$)($OL$−MIN). [Math. B4]

When MAX≤OL, NMAX=MAX

ULIM=LIMIT.

When MAX>$OL$, $N$MAX=$OL$+(MAX−$OL$)×$E$ $U$LIM=LIMIT+(1−$E$)(MAX−$OL$). [Math. B5]

When O>MAX, O'=NMAX+min((O−NMAX)·GAIN, ULIM).

When O<MIN, O'=NMIN−min((NMIN−O)·GAIN, LLIM).

Otherwise, O'=O. [Math. B6]

In the Math. B4 to the Math. B6, E (a mentioned earlier) is a constant. GAIN (C mentioned earlier) and LIMIT (T) are parameters calculated from grad1 by the C multiplication unit 1061 and the threshold clipping unit 1062 in FIG. 45.

The Math. B4 is an expression according to which the re-correction unit 1807 calculates a point NMIN (L'x,y) at which 0 is changed in gradient and a lower clipping value LLIM (TL), using MIN (Lx,y), LIMIT, OL (Ix,y), and the constant E.

The Math. B5 is an expression according to which the re-correction unit 1807 calculates NMAX (U'x,y) at which 0 is changed in gradient and an upper clipping value ULIM (TU), using MAX (Ux,y), LIMIT, OL, and the constant E. In this calculation, the constant E is in a range of 0.0 to 1.0. When E is small, the gradient is adjusted so long as there is even a small difference from the pixel value OL after interpolation enlargement (Px,y(B) in FIG. 47). When E is set to 1.0, the correction is performed only for a portion exceeding MIN or MAX (Px,y(A) in FIG. 47). Note that setting the constant E to 0.5 or less accelerates the gradient change, allowing for a further reduction of unnaturalness caused by edge sharpening.

The following describes differences in output waveform according to the constant E, with reference to FIGS. 32A to 32C.

FIG. 32A is a diagram showing the output (Xx,y in FIG. 47) of the synthesis unit 1806.

FIG. 32B is a diagram showing the output (Px,y(A) in FIG. 47) after re-correction where E=1.0.

FIG. 32C is a diagram showing a part of a horizontal line of the output image (Px,y(B) in FIG. 47) after re-correction where E=0.25.

In each of FIGS. 32A to 32C, a horizontal axis represents a pixel position in the horizontal direction of the image, and a vertical axis represents a pixel value in each pixel position.

In both FIGS. 32B (Px,y(A) in FIG. 47) and 32C (Px,y(B) in FIG. 47), an overshoot or undershoot component occurring in FIG. 32A (Xx,y in FIG. 47) is reduced while sharpening an edge.

In FIG. 32C (Px,y(B) in FIG. 47), the influence of flattening the upper portion is reduced as shown by the narrower range 106y than the range 106yC in FIG. 47 while maintaining the edge gradient, when compared with FIG. 32B (Px,y (A) in FIG. 47). Accordingly, in FIG. 32C (Px,y(B) in FIG. 47), the edge neighborhood is shaped more naturally than in FIG. 32B (Px,y(A) in FIG. 47), enabling a sharp image to be produced.

[Embodiment C]

The following describes the embodiment C with reference to drawings. The embodiment C is a variation of the embodiment A, too. Note that detailed points of the embodiment C may be the same as the embodiment B.

Figure 36:
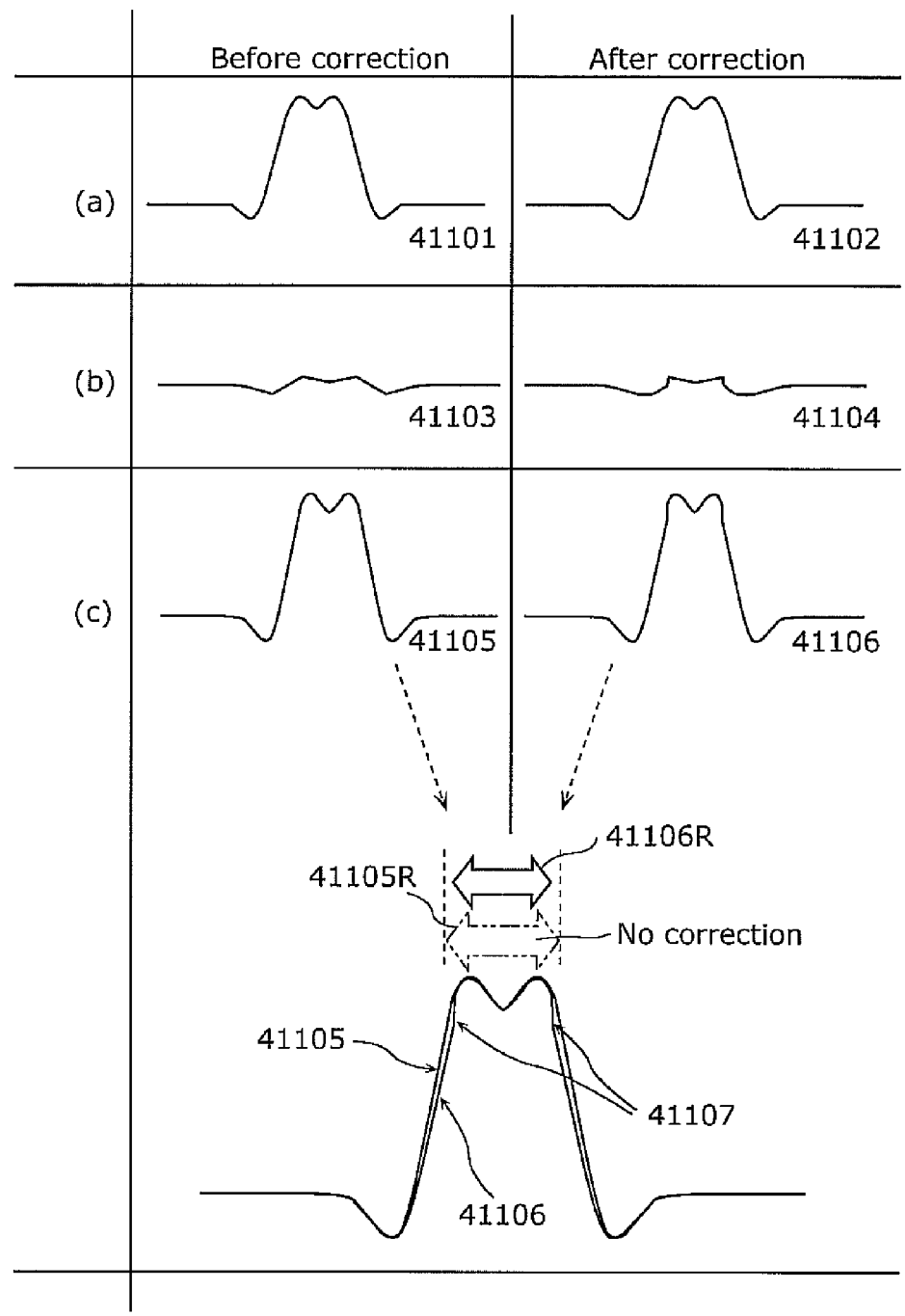
[FIG. 36]
Figure 37:
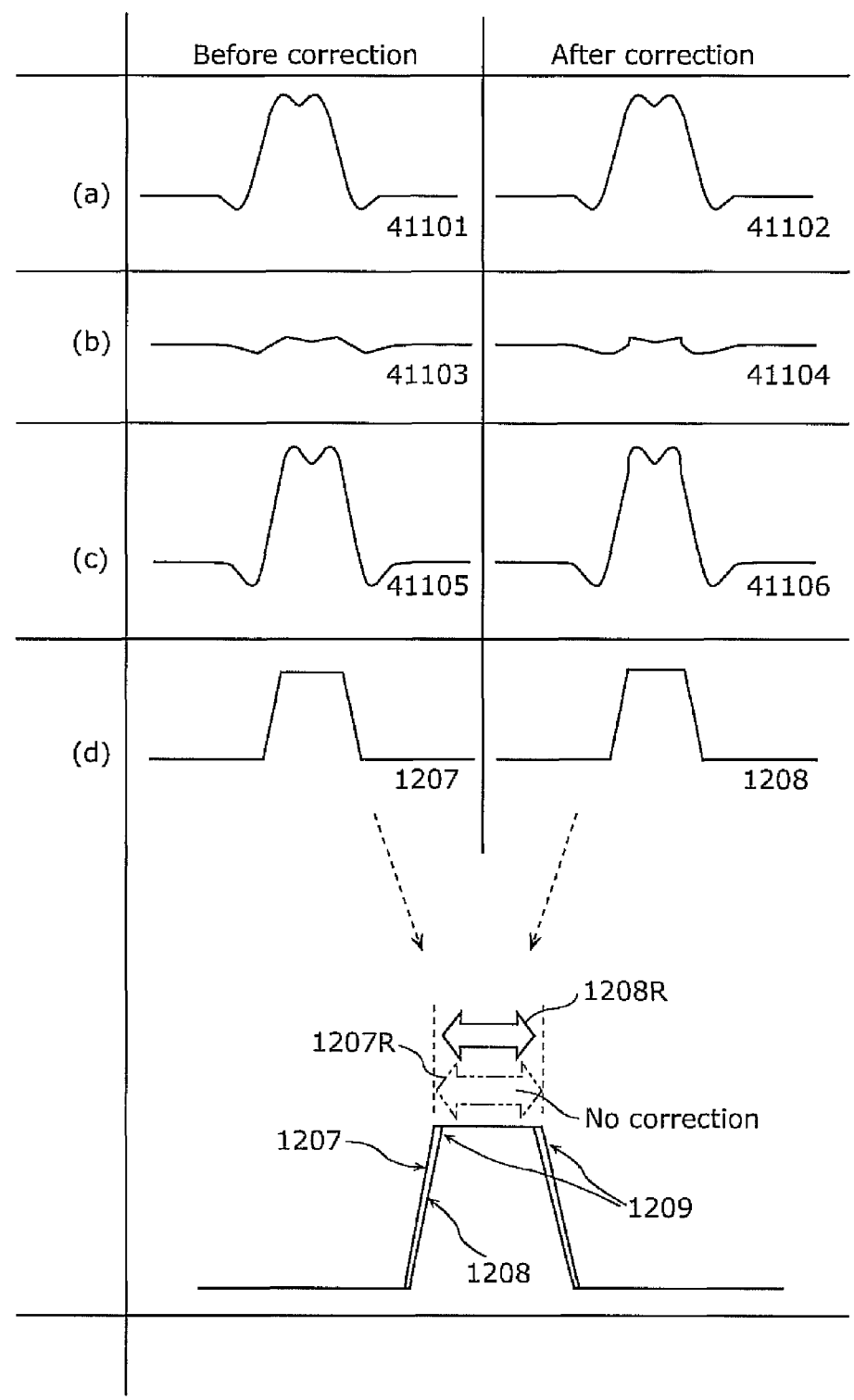
[FIG. 37]

An image enlargement apparatus according to the embodiment C (the image enlargement apparatus 108C, the image enlargement unit 1504C, and the like) includes: an interpolation pixel position generation unit (an interpolation pixel position generation unit 110) that receives image sizes of the low-resolution image and the high-resolution image or an enlargement factor (receives at least one of the enlargement factor and each image size of the low-resolution image and the high-resolution image), and generates, for the low-resolution image, a first interpolation pixel position corresponding to each pixel of the high-resolution image for generating the high-resolution image from the low-resolution image; and a white thinning unit (a white thinning unit 109) that receives the low-resolution image (the input image 101) and the first interpolation pixel position, and corrects the first interpolation pixel position according to a change in pixel value in a neighborhood of the first interpolation pixel position, to generate a second interpolation pixel position as a result of correcting the first interpolation pixel position, wherein the correction amount calculation unit (the correction amount calculation unit 103) receives the second interpolation pixel position and the low-resolution image, and calculates a correction amount of each pixel of the outputted second high-resolution image, the interpolation unit (the interpolation unit 104) receives the low-resolution image and the first interpolation pixel position, and calculates a pixel value corresponding to the received first interpolation pixel position by interpolation, to generate the interpolation image ((a) in FIGS. 36 and 37) having the calculated pixel value in the first interpolation pixel position, and the synthesis unit generates the second high-resolution image (1208 in (d) in FIG. 37), by synthesizing (41106 in (c) in FIGS. 36 and 37) the correction amount ((b) in the right column in FIGS. 36 and 37) calculated from the second interpolation pixel position by the correction amount calculation unit and the pixel value ((a) in FIGS. 36 and 37) generated from the first interpolation pixel position by the interpolation unit.

Figure 33:
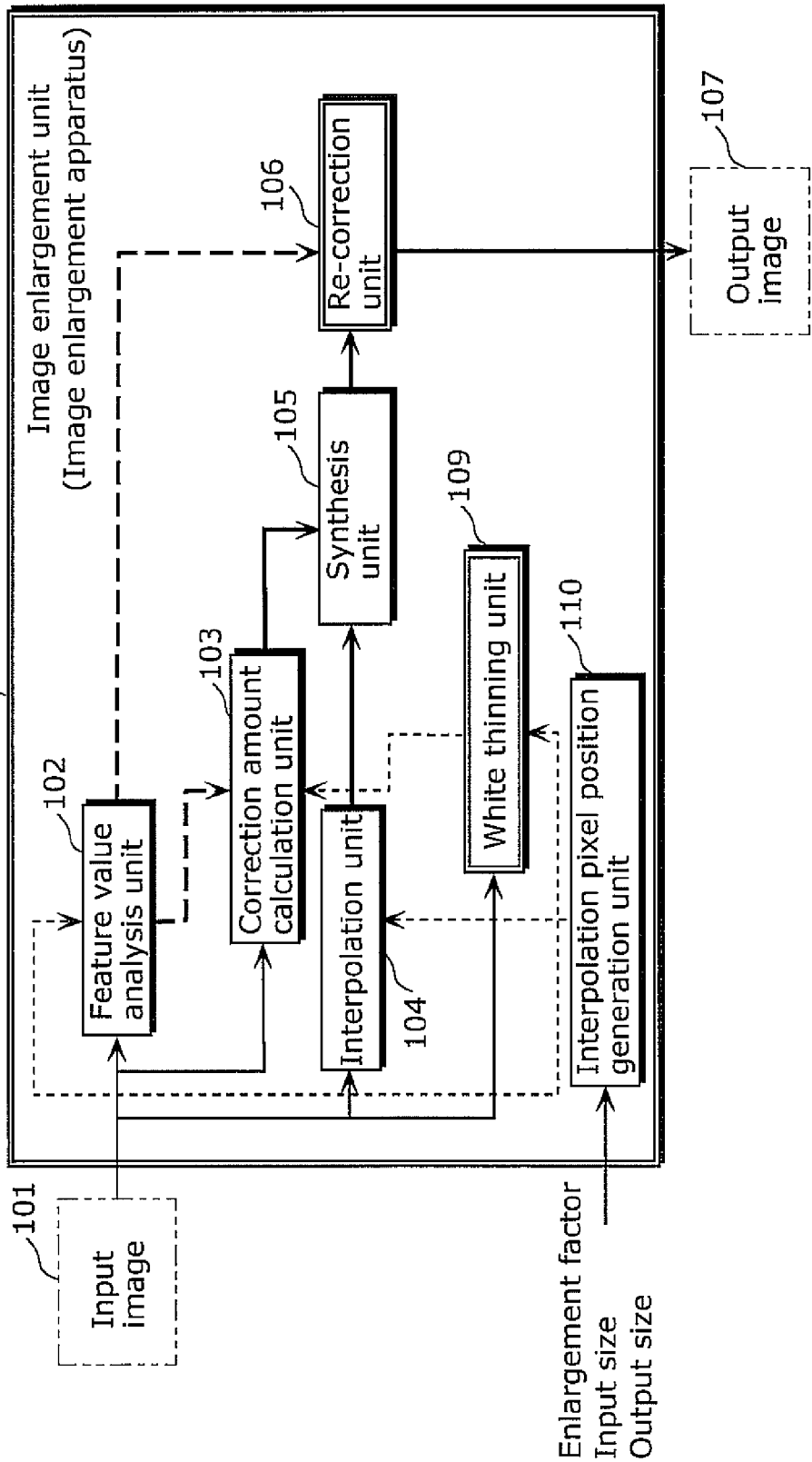
[FIG. 33]

Note that the following is applicable as shown by, for example, an arrow from an interpolation pixel position generation unit 110 to the feature value analysis unit 102 in FIG. 33.

That is, the feature value analysis unit may analyze the feature value of the low-resolution image in the first interpolation pixel position (the position by the interpolation pixel position generation unit 110), and output the feature value for each pixel of the outputted second high-resolution image, wherein the correction amount calculation unit receives the second interpolation pixel position, the low-resolution image, and the feature value analyzed in the first interpolation pixel position, and calculates the correction amount of each pixel of the outputted second high-resolution image.

Figure 39:
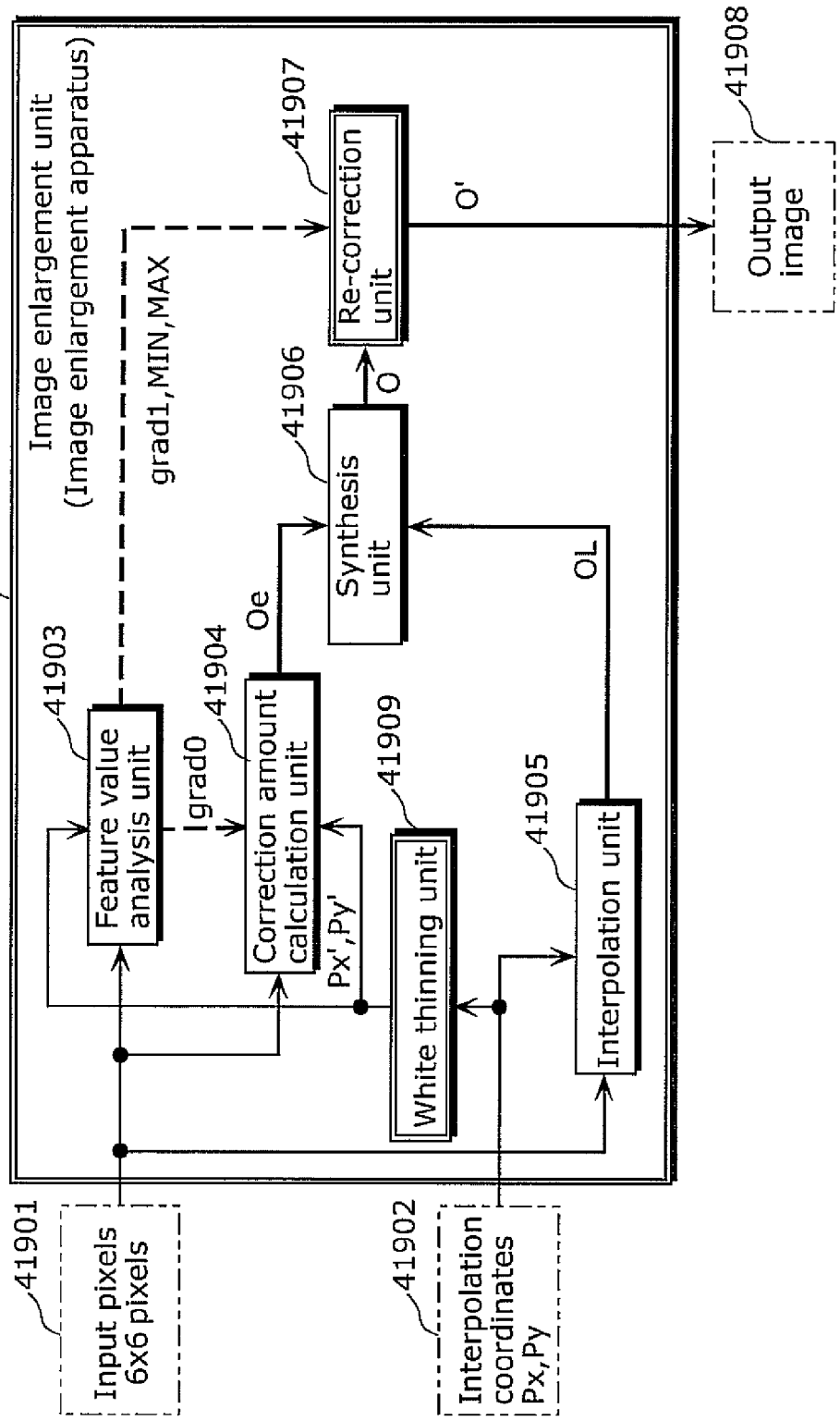
[FIG. 39]

Moreover, the following is applicable as shown by, for example, an arrow from a white thinning unit 41909 to a feature value analysis unit 41903 in FIG. 39.

That is, the feature value analysis unit may analyze the feature value of the low-resolution image in the second interpolation pixel position (the position by the white thinning unit 41909), and output the feature value for each pixel of the outputted second high-resolution image, wherein the correction amount calculation unit receives the second interpolation pixel position, the low-resolution image, and the feature value analyzed in the second interpolation pixel position, and calculates the correction amount of each pixel of the outputted second high-resolution image.

[Embodiment C1]

FIG. 33 is a block diagram of the image enlargement unit 108C (a subordinate conception (an example) of the image enlargement unit 108) in an embodiment C1.

In FIG. 33, 101 denotes a low-resolution input image (original image). 102 denotes a feature value analysis unit that outputs a feature value corresponding to each pixel of an outputted high-resolution image (first high-resolution image, second high-resolution image), from the low-resolution input image 101. 110 denotes an interpolation pixel position generation unit that receives an enlargement factor or image sizes of the input image 101 and the output image 107, and generates a first interpolation pixel position for interpolating each pixel of the high-resolution image according to the sizes. 109 denotes a white thinning unit that calculates, from the input image 101 and the first interpolation pixel position generated by the interpolation pixel position generation unit 110, a second interpolation pixel position by correcting the first interpolation pixel position. 103 denotes a correction amount calculation unit that calculates a correction amount of an edge component corresponding to the second interpolation pixel position calculated by the white thinning unit 109 according to the feature value outputted from the feature value analysis unit 102, and outputs a correction amount of each pixel of the outputted high-resolution image (second high-resolution image). 104 denotes an interpolation unit that receives the low-resolution input image 101 and the first interpolation pixel position before the correction by the white thinning unit 109, and generates an image (interpolation image) having the same number of pixels as the outputted high-resolution image. 105 denotes a synthesis unit that receives a pixel of a high-resolution image (interpolation image) outputted from the interpolation unit 104 and also receives a correction amount corresponding to the pixel from the correction amount calculation unit 103, and outputs a corrected pixel (first high-resolution image). 106 denotes a re-correction unit that re-corrects a synthesis result (first high-resolution image) outputted from the synthesis unit 105 using a feature value corresponding to the output pixel received from the feature value analysis unit 102, and outputs a re-correction result. 107 denotes the outputted high-resolution image (output image, second high-resolution image). 108C denotes the image enlargement unit that receives the low-resolution image (the input image 101) and outputs the high-resolution image (the output image 107, second high-resolution image).

(Interpolation Pixel Position Generation Unit)

The interpolation pixel position generation unit 110 receives the enlargement factor or the sizes of the input image and the output image as a parameter, and calculates an interpolation pixel position (first interpolation pixel position) using the parameter. When the input image size and the output image size are inputted, the interpolation pixel position generation unit 110 calculates the enlargement factor using a ratio between the image sizes. When the enlargement factor is inputted, on the other hand, the interpolation pixel position generation unit 110 uses the inputted enlargement factor directly.

Note that, in the case where the enlargement factor differs between the horizontal direction and the vertical direction, two enlargement factors that are a horizontal enlargement factor and a vertical enlargement factor are inputted. Though only one enlargement factor is necessary when the horizontal enlargement factor and the vertical enlargement factor are the same, it is assumed here that the interpolation pixel position generation unit 110 receives the two enlargement factors, i.e., the horizontal enlargement factor and the vertical enlargement factor.

Figure 34:
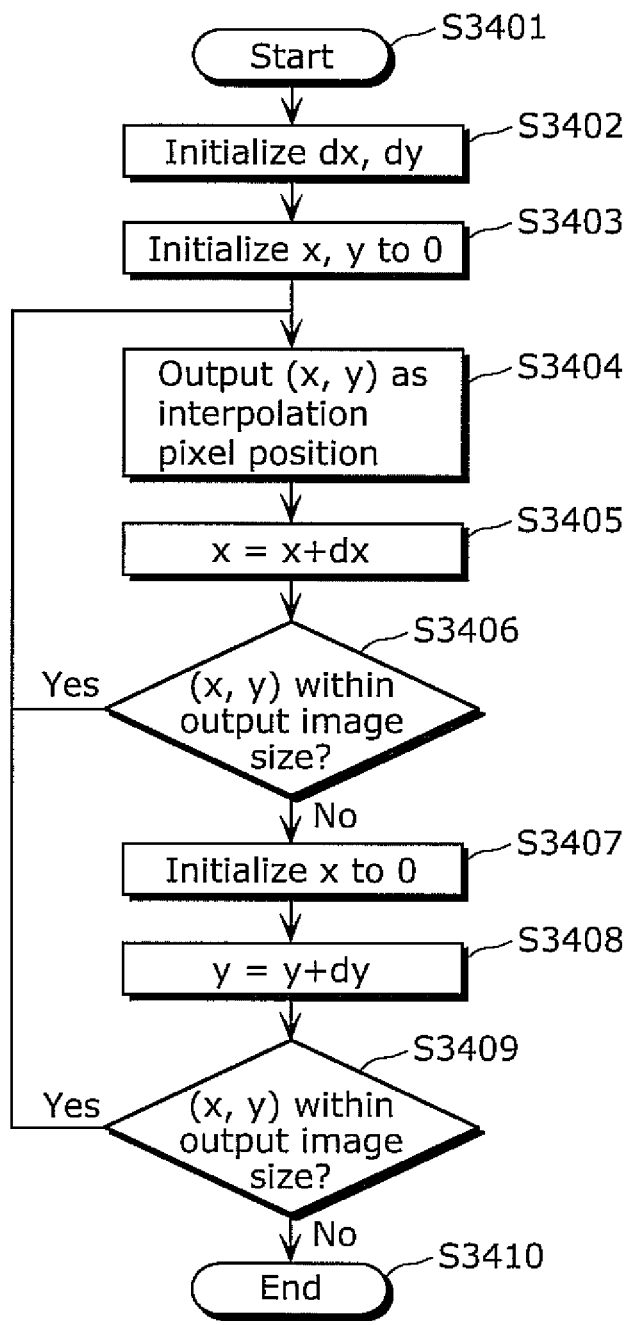
[FIG. 34]

FIG. 34 is a flowchart of calculating the interpolation pixel position from the horizontal and vertical enlargement factors (Steps S3401 to S3410).

First, the interpolation pixel position generation unit 110 calculates displacements dx and dy in the horizontal and vertical directions (Step S3402). dx and dy can be calculated from the enlargement factors. In detail, dx and dy are inverses of the enlargement factors. For example, when the horizontal and vertical enlargement factors are both 2, dx and dy are ½=0.5.

Next, the interpolation pixel position generation unit 110 initializes an interpolation pixel position (x,y) to an initial value (0,0) (Step S3403). Though 0 is set as the initial value here, −0.25 may instead be used in order to prevent a deviation from a center of the enlarged image. In this way, the setting of the initial value is changed according to a phase of the image to be generated as the high-resolution image.

Following this, the interpolation pixel position generation unit 110 outputs (x,y) as the first interpolation pixel position (Step S3404). When the first interpolation pixel position (x,y) is a negative value, the first interpolation pixel position (x,y) is outputted after being clipped to 0.

Next, the interpolation pixel position generation unit 110 shifts the horizontal interpolation position x by dx (Step S3405). When the result x of shifting by dx is within a horizontal size of the input image, the interpolation pixel position generation unit 110 returns to the process of Step S3404 (Step S3406: Yes). When x exceeds the horizontal size (Step S3406: No), the interpolation pixel position generation unit 110 initializes x to the initial value (Step S3407), and updates y by adding dy (Step S3408).

When the vertical position y is within a vertical size of the input image (Step S3409: Yes), the interpolation pixel position generation unit 110 returns to the process of Step S3404 (Step S3409). When y exceeds the vertical size (Step S3409: No), the interpolation pixel position generation unit 110 ends the processing as interpolation pixel positions of all pixels have been outputted.

As a result, the first interpolation pixel position for the size of the high-resolution image is generated.

Note that the first interpolation pixel position calculation method described here is merely an example, and the same advantageous effects as this embodiment can be expected even when an interpolation position calculation method used in a typical enlargement process is employed. Moreover, by appropriately setting the initial value and the displacements dx and dy of the input image, it is also possible to enlarge only one part of the input image according to output image size. In this case, Steps S3406 and S3409 respectively have such conditions that the number of outputted interpolation pixel positions exceeds a horizontal size and a vertical size of the output image.

(White Thinning Unit)

The white thinning unit 109 receives the low-resolution image (the input image 101) and the first interpolation pixel position generated by the interpolation pixel position generation unit 110, and outputs the second interpolation pixel position by correcting the first interpolation pixel position.

Figure 35:
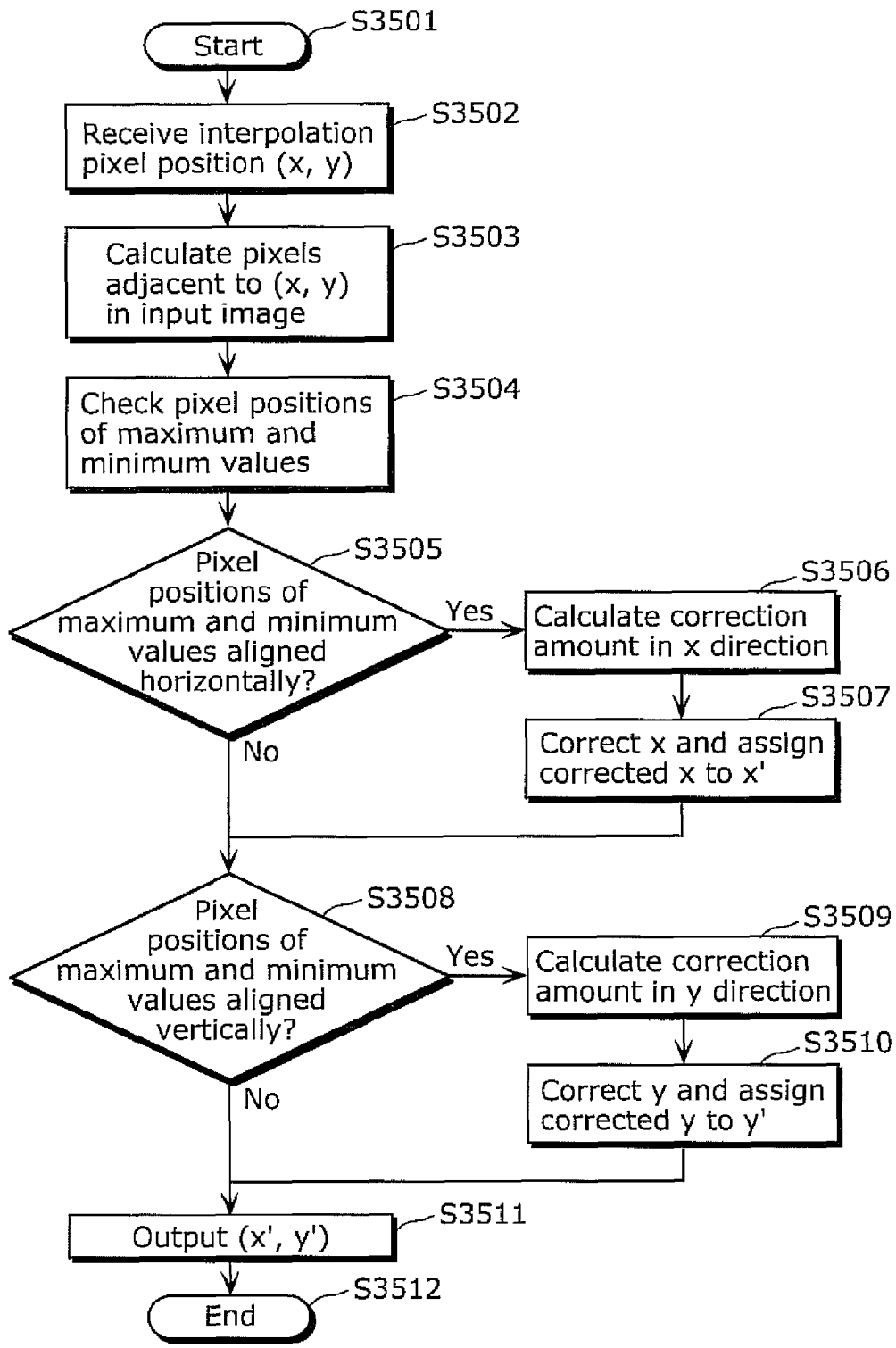
[FIG. 35]

FIG. 35 is a flowchart of a white thinning process (Steps S3501 to S3512).

In the white thinning process, the white thinning unit 109 first receives the first interpolation pixel position (x,y) (Step S3502).

Next, the white thinning unit 109 calculates pixel positions in the input image 101 that are adjacent to the first interpolation pixel position (x,y) (Step S3503). As noted earlier, the first interpolation pixel position is a decimal position. For instance, when (x,y) (10.5,12.5), its adjacent pixels in the input image 101 are pixels in four positions (10,12), (11,12), (10,13), and (11,13).

Following this, the white thinning unit 109 checks which of the calculated adjacent pixels have a maximum pixel value and a minimum pixel value (Step S3504). When the positions of the pixels having the maximum and minimum pixel values are two horizontally aligned positions (Step S3505: Yes), the white thinning unit 109 calculates a correction amount in the x direction, and corrects x (Steps S3506 and S3507). This correction is such a correction that shifts x toward the pixel position having the minimum value.

Note that the amount of shift is determined according to a difference between the maximum value and the minimum value. As an example, x is shifted to a larger extent when the difference is large, and moved little when the difference is small.

In the y direction, too, when the positions of the pixels having the maximum and minimum pixel values are two vertically aligned positions (Step S3508: Yes), the white thinning unit 109 calculates a correction amount in the y direction, and corrects y (Steps S3509 and S3510).

The white thinning unit 109 outputs the corrected (x,y), as a corrected second interpolation pixel position (x',y') (Step S3511).

That is, by specifying the two pixels having the maximum pixel value and the minimum pixel value, a direction of a gradient in the first interpolation pixel position in the input image 101 is specified. A position shifted from the first interpolation pixel position toward the pixel of the minimum value, i.e., toward a darker side, in the specified direction is then determined as the second interpolation pixel position.

According to the above processing, in a portion where the difference between the maximum value and the minimum value of the adjacent pixels is large, that is, in a portion having a large brightness difference, the first interpolation pixel position (x,y) is corrected in a darker direction. By performing interpolation using this corrected interpolation pixel position, it is possible to narrow a bright portion area and as a result thin a white portion, as described in detail later.

Note that, in the case where the gradient in the first interpolation pixel position is flat, the same position as the first interpolation pixel position may be specified as the second interpolation pixel position.

(Feature Value Analysis Unit)

The feature value analysis unit 102 calculates and outputs a feature value for each pixel that is outputted from the interpolation unit 104 after enlargement. The outputted feature value includes a strength of a gradient around a position in the low-resolution image corresponding to the interpolation pixel position (for example, the first interpolation pixel position), and a lower limit and an upper limit of neighboring pixels. The gradient strength is obtained, for example, by a method in which 2×2 pixels in the low-resolution image that are adjacent to the interpolation pixel position are extracted, horizontal and vertical differential components dx and dy are obtained using the filters shown in FIGS. 3 and 4, and a larger one of dx and dy is specified as the gradient strength. Note that the gradient strength calculation method is not limited to this, as a sobel filter, a prewitt filter, or the like may be used. Regarding the upper limit and the lower limit, a maximum pixel value and a minimum pixel value from among n×n pixels in the low-resolution image that are positioned in the neighborhood of the interpolation pixel position are respectively set as the upper limit and the lower limit.

Thus, the feature value analysis unit 102 calculates and outputs the gradient strength, the upper limit, and the lower limit as the feature value.

Though this embodiment describes the case where the interpolation pixel position inputted to the feature value analysis unit 102 is the first interpolation pixel position before correction, the second interpolation pixel position corrected by the white thinning unit 109 may instead be inputted. In this case, the lower limit and the upper limit are also shifted in the direction of the corrected second interpolation pixel position, enabling stronger correction to be performed.

(Correction Amount Calculation Unit)

The correction amount calculation unit 103 calculates a correction amount according to an extent of edge of a pixel corresponding to the second interpolation pixel position. First, the correction amount calculation unit 103 calculates an edge component, using the second interpolation pixel position corrected by the white thinning unit 109 and pixel values of the low-resolution input image. As a method of extracting the edge component, for example, the Laplacian filter shown in FIG. 5 or 6 mentioned above is employed.

Note that the pixel of the interpolation pixel position (for example, a decimal position) is not present in the low-resolution image (for example, made up of only pixels of integer positions). Accordingly, in the case of performing the above filtering, after calculating the pixel value of each corresponding pixel position (for example, integer position) by interpolation, 3×3 filtering is performed.

After extracting the edge component, the correction amount calculation unit 103 calculates an extent of enhancement of the extracted edge using the gradient strength calculated by the feature value analysis unit 102.

By inputting the second interpolation pixel position corrected by the white thinning unit 109 to the correction amount calculation unit 103, the outputted correction amount becomes uneven between a brighter direction and a darker direction. This enables the correction amount to be changed in balance between white and black.

That is, the correction amount calculated in the relatively dark corrected second interpolation pixel position is specified instead of the correction amount calculated in the relatively bright first interpolation pixel position.

(Interpolation Unit)

The interpolation unit 104 generates the high-resolution image (interpolation image) from the low-resolution image (the input image 101) by interpolation enlargement, using the bilinear method, the bicubic convolution method, or the like. Since these typical enlargement techniques are not the essential features of this embodiment, their detailed description is omitted here. A conventionally used enlargement interpolation technique can be employed as the interpolation unit 104.

Note that the interpolation unit 104 does not use the second interpolation pixel position corrected by the white thinning unit 109. This is because the use of the correction result as the pixel position in the interpolation unit 104 causes aliasing to be enhanced in an edge portion changing from white to black. Therefore, the interpolation unit 104 uses the first interpolation pixel position before correction, which is generated by the interpolation pixel position generation unit 110.

(Re-Correction Unit)

The re-correction unit 106 receives the edge enhanced first high-resolution image outputted from the synthesis unit 105 and the upper limit and the lower limit outputted from the feature value analysis unit 102 in correspondence with the first high-resolution image, and re-corrects the first high-resolution image outputted from the synthesis unit 105.

The following describes a procedure of the re-correction.

For a pixel position (x,y) in the first high-resolution image, let $X_{x,y}$ be an output pixel value of the synthesis unit 105, $U_{x,y}$ be an upper limit, and $L_{x,y}$ be a lower limit. The re-correction unit 106 calculates a first correction value $P_{x,y}$ according to the above-mentioned Math. A1.

Next, the re-correction unit 106 calculates a second correction value $P'_{x,y}$ by further correcting the first correction value $P_{x,y}$, according to the above-mentioned Math. A2.

The re-correction unit 106 outputs the second correction value $P'_{x,y}$.

According to the embodiment C1, an enlarged image with reduced undershoot and overshoot can be outputted while thinning a white portion, as a result of the above processing.

FIG. 36 is a diagram showing data in the processing up to the synthesis.

FIG. 37 is a diagram showing data in the processing up to the re-correction.

The following describes the processing and signal flow, with reference to FIGS. 36 and 37. In FIGS. 36 and 37, "before correction" (left column) shows data in the case where the interpolation pixel position is not corrected by the white thinning process, and "after correction" (right column) shows data in the case where the interpolation pixel position is corrected.

FIGS. 36 and 37 each show the output of the interpolation unit 104 (*a*), the output of the correction amount calculation unit 103 (*b*), the output of the synthesis unit 105 (*c*), and the output of the re-correction unit 106 ((*d*) in FIG. 37). Note that the output of the re-correction unit 106 (*d*) is a result where T=0. In FIGS. 36 and 37, a horizontal axis represents a pixel position, and a vertical axis represents a pixel value. The pixel value indicates a brighter color upward, and a darker color downward.

FIG. 36 shows an example up to the output of the synthesis unit 105 (*c*).

Even when the pixel position correction is performed, the first interpolation pixel position before the correction is inputted to the interpolation unit 104, so that signals 41101 and 41102 (interpolation image) are the same in the row (a).

In the row (b) showing the output of the correction amount calculation unit 103, when the pixel position correction is performed (right column), a darker correction amount in the second interpolation pixel position is specified in the first interpolation pixel position in which a relatively bright correction amount is specified in the case of the left column where the pixel position correction is not performed, as a result of which a bright correction amount portion is narrowed. Since such pixel position correction is performed, an upward projecting portion of a signal 41104 in the right column is narrower than that of a signal 41103 in the left column in the row (b).

In the row (c) showing the result of synthesizing (a) and (b), a bright portion 41106R of a signal 41106 in the right column is narrower than a bright portion 41105R of a signal 41105 in the left column in the upper part of the row (c) (see 41107 in the lower part). This enables a white portion to appear thinner.

In FIG. 37, the row (d) shows the result of re-correction by the re-correction unit 106. As shown in (d) in FIG. 37, a bright portion 1208R of a signal 1208 after the re-correction when the pixel position correction is performed (right column) is narrower than a bright portion 1207R of a signal 1207 after the re-correction (see 1209).

Hence, enlarged data having thinner white with no undershoot or overshoot is outputted after the re-correction (right column).

As described above, according to the embodiment C1, edge correction of thinning a bright component after enlargement can be achieved so as to eliminate an impression of thicker white which tends to occur especially in the case where edge correction is performed in addition to an enlargement process. This enables a visually-balanced enlarged image (the output image 107) to be generated.

Note that, in the case of not performing the correction of undershoot and overshoot, the enlargement process may be completed at the process of the synthesis unit 105. In this case, too, the advantageous effect of preventing a white line from appearing thicker can be attained.

Thus, the image enlargement apparatus 108 (the image enlargement apparatus 108C) includes the white thinning unit (the white thinning unit 109).

The white thinning unit corrects the first interpolation pixel position to the second interpolation pixel position, thereby controlling the operation of the edge enhancement unit (the synthesis unit 105) so that the edge enhancement unit calculates the first high-resolution image that is edge-enhanced using the correction amount (41104 in FIG. 36) calculated from the corrected second interpolation pixel position. Through such control, the first high-resolution image (the signal 41106) having a narrower white portion (the portion 41106R in FIG. 36) than a white portion (the portion 41105R) in the case of not performing the control is calculated by the edge enhancement unit.

The white thinning unit further controls the operation of the re-correction unit 106 so that the re-correction unit 106 re-corrects the first high-resolution image whose white portion has been narrowed. Through such control, the second high-resolution image (the signal 1208 in (d) in FIG. 37) having a narrower white portion (the portion 1208R in FIG. 37) than a white portion (the portion 1207R) in the case of not performing the control is calculated by the re-correction unit 106.

[Embodiment C2]

The following describes the embodiment C2, with reference to drawings.

Figure 38:
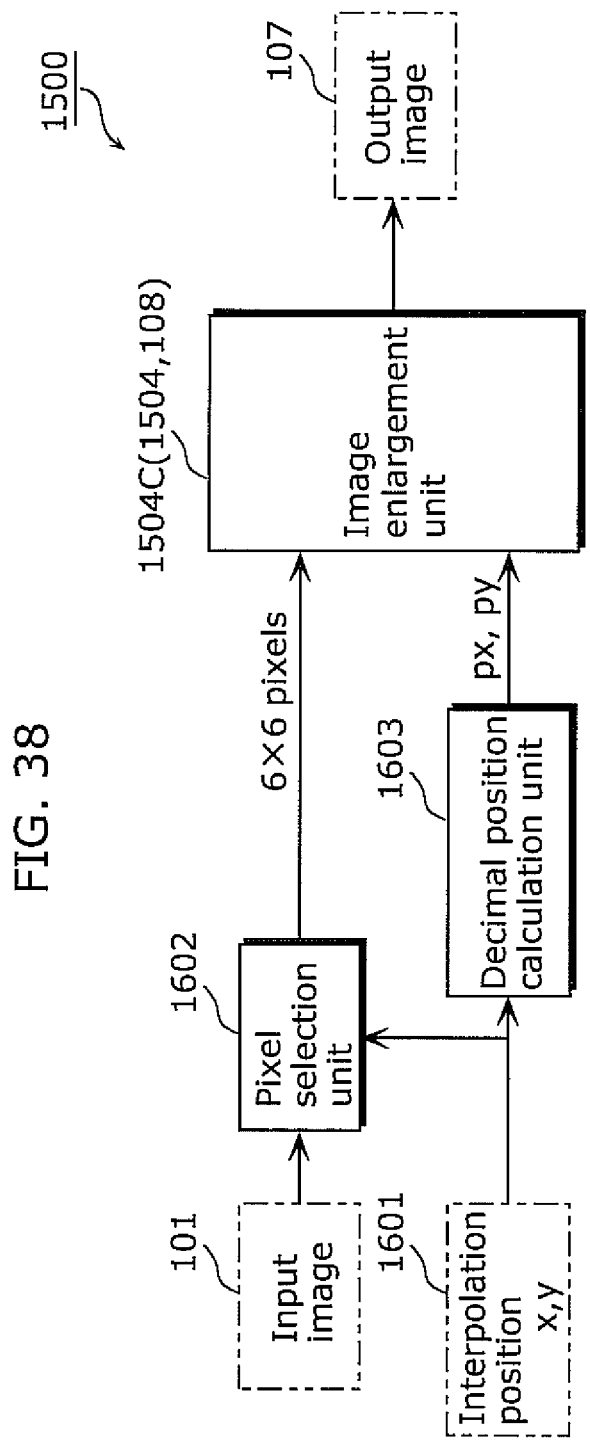
[FIG. 38]

FIG. 38 is a block diagram of the image enlargement apparatus 1500 including the image enlargement unit 1504C in the embodiment C2

In FIG. 38, 101 denotes an input image. 1601 denotes a first interpolation pixel position x,y. 1602 denotes a pixel selection unit that selects neighboring 6×6 pixels of the first interpolation pixel position x,y. 1603 denotes a decimal position calculation unit that extracts a decimal part px,py of the first interpolation pixel position x,y. 1504C denotes an image enlargement unit that receives the 6×6 pixels of the input image and the decimal position px,py, and calculates and outputs a pixel value (second high-resolution image) of the first interpolation pixel position x,y. 107 denotes the second high-resolution image after the enlargement process.

FIG. 39 is a diagram showing a flow of processing of the image enlargement unit 1504C (FIG. 38) that performs the image enlargement process of Step S1707 in FIG. 17 in the embodiment C2. The following describes the image enlargement process in the embodiment C2 in detail, with reference to FIG. 39.

(White Thinning Unit)

Figure 40:
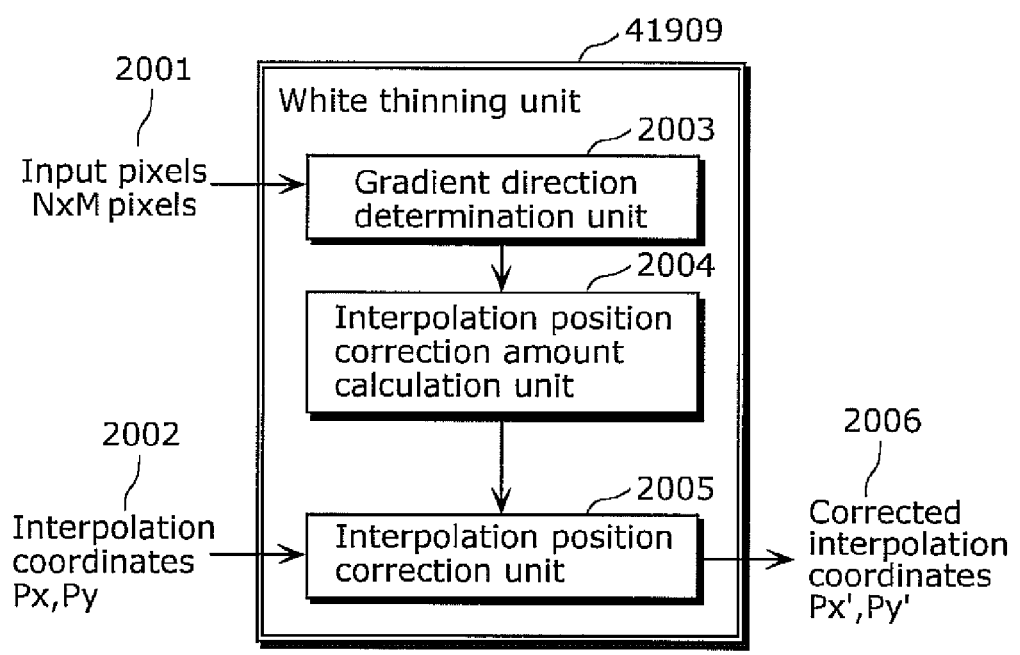
[FIG. 40]

FIG. 40 is a diagram showing a detailed process of the white thinning unit 41909 in FIG. 39.

In the white thinning unit 41909, a gradient direction determination unit 2003 calculates a gradient direction from input pixels.

Figure 41:
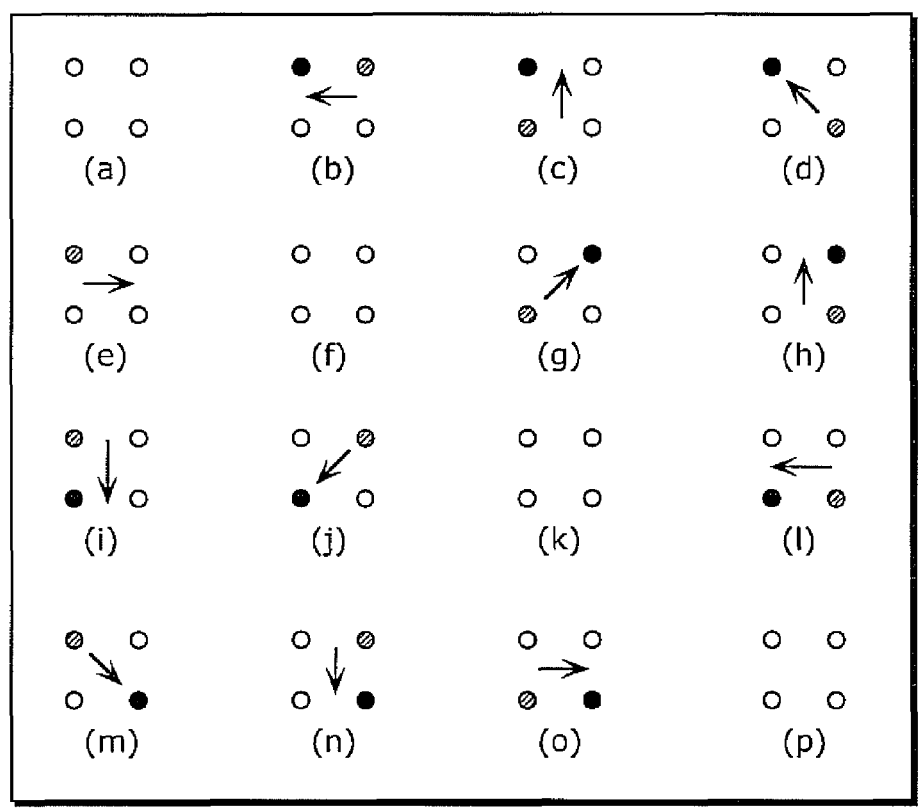
[FIG. 41]

FIG. 41 is an explanatory diagram of a gradient direction detection method.

In FIG. 41, each white circle indicates an adjacent pixel of the first interpolation pixel position, each black circle indicates an adjacent pixel having a maximum value, and each diagonally shaded circle indicates an adjacent pixel having a minimum value (see Step S3504 in FIG. 35 and the like). In patterns (a), (f), (k), and (p) where all four pixels have the same value, all pixels are indicated by white circles.

In FIG. 41, each arrow indicates a direction from the minimum value to the maximum value. When the arrow is horizontal, the correction is performed only in the horizontal direction. When the arrow is vertical, the correction is performed only in the vertical direction. When the arrow is diagonal, the correction is performed both in the horizontal and vertical directions. Note that the gradient direction determination unit 2003 shown here is merely an example, and the gradient direction determination may be made using, for instance, a result of performing the filtering shown in FIG. 3 or 4 on the adjacent pixels.

An interpolation position correction amount calculation unit 2004 calculates a correction amount from a difference between the maximum value and the minimum value. In the correction amount calculation, only a correction amount of x is calculated when the result of the gradient direction determination unit 2003 indicates the correction only in the horizontal direction, only a correction amount of y is calculated when the result indicates the correction only in the vertical direction, and correction amounts of both x and y are calculated when the result indicates the diagonal direction (see Steps S3505 to S3510 in FIG. 35).

For instance, a method using the following Math. C1 and Math. C2 is employed in the correction amount calculation.

$$AX=\text{CLIP}(0,(\text{maximum value}-\text{minimum value})\times K, L) \quad \text{[Math. C1]}$$

$$AY=\text{CLIP}(0,(\text{maximum value}-\text{minimum value})\times K, L) \quad \text{[Math. C2]}$$

In the Math. C1 and the Math. C2, AX is a correction amount in the horizontal direction, AY is a correction amount in the vertical direction, and K and L are each a constant. Moreover, CLIP denotes clipping a calculation result in a range of 0 to L. As mentioned above, in each direction, the calculation by any of the Math. C1 and the Math. C2 is performed only when the correction is performed in the direction, and the correction amount is 0 when the correction is not performed in the direction. As an example, when the correction is performed only in the vertical direction, AX=0. Note that, by setting a negative value to K, not white but black can be thinned. In the image enlargement apparatus 1500, K may be set so as to deliberately make white appear thicker.

In diagonal patterns (d), (g), (j), and (m) in FIG. 41, the following problem arises when the correction amount is calculated according to the Math. C1 and the Math. C2.

Figure 42:
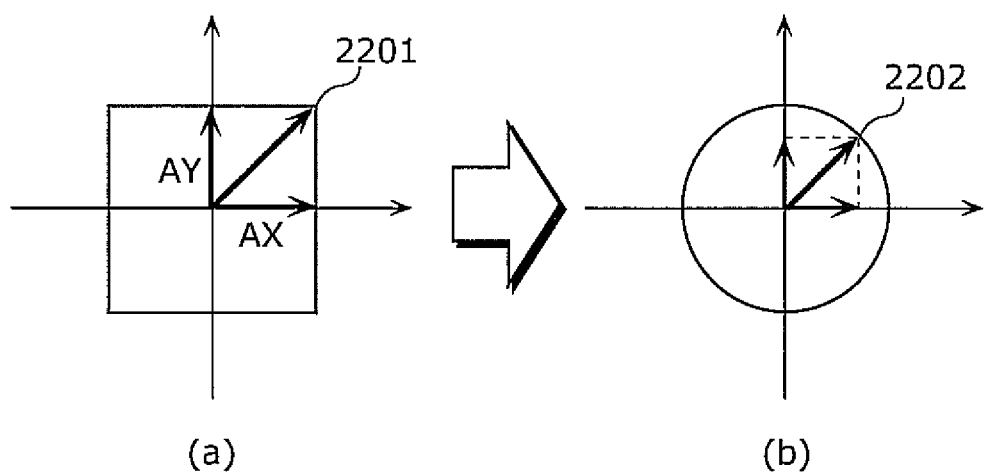
[FIG. 42]

FIG. 42 is a diagram showing the problem that arises in the correction amount calculation.

In FIG. 42, (a) shows an example where the correction amounts AX and AY are set on the basis of the Math. C1 and the Math. C2. As shown in the drawing, the correction amounts form a square whose center is an origin point. In the case of the correction in the diagonal direction (2201), the correction is about 1.414 times longer than the correction only in the horizontal or vertical direction. This causes a diagonal line and the like in the image to be corrected excessively, resulting in jaggies. In view of this, the interpolation position correction amount calculation unit 2004 adjusts AX and AY so as to be positioned on a circumference of circle as shown by 2202 in (b) in FIG. 42, according to the length of AX and AY. By doing so, excessive correction in the diagonal direction can be prevented. Though this correction requires calculation using a trigonometric function, a simpler method such as multiplying AX and AY by $1/\sqrt{2}$ in the case of matching any of the four patterns (d), (g), (j), and (m) in FIG. 41 is also applicable.

Following this, an interpolation position correction unit 2005 performs the correction by adding AX and AY respectively to the interpolation coordinates Px,Py (see the following Math. C3).

$$Px'=CLIP(0,Px+AX,1.0)$$

$$Py'=CLIP(0,Py+AY,1.0) \quad \text{[Math. C3]}$$

In the Math. C3, Px and Py are each normalized in a range of 0 to 1. For example, when Px takes a value from 0 to 255, an expression for calculating Px' is Px'=CLIP(0,Px+AX, 255).

Thus, the corrected second interpolation coordinates Px', Py' (second interpolation pixel position, interpolation coordinates 2006 in FIG. 40) are calculated.

(Feature Value Analysis Unit)

Figure 43:
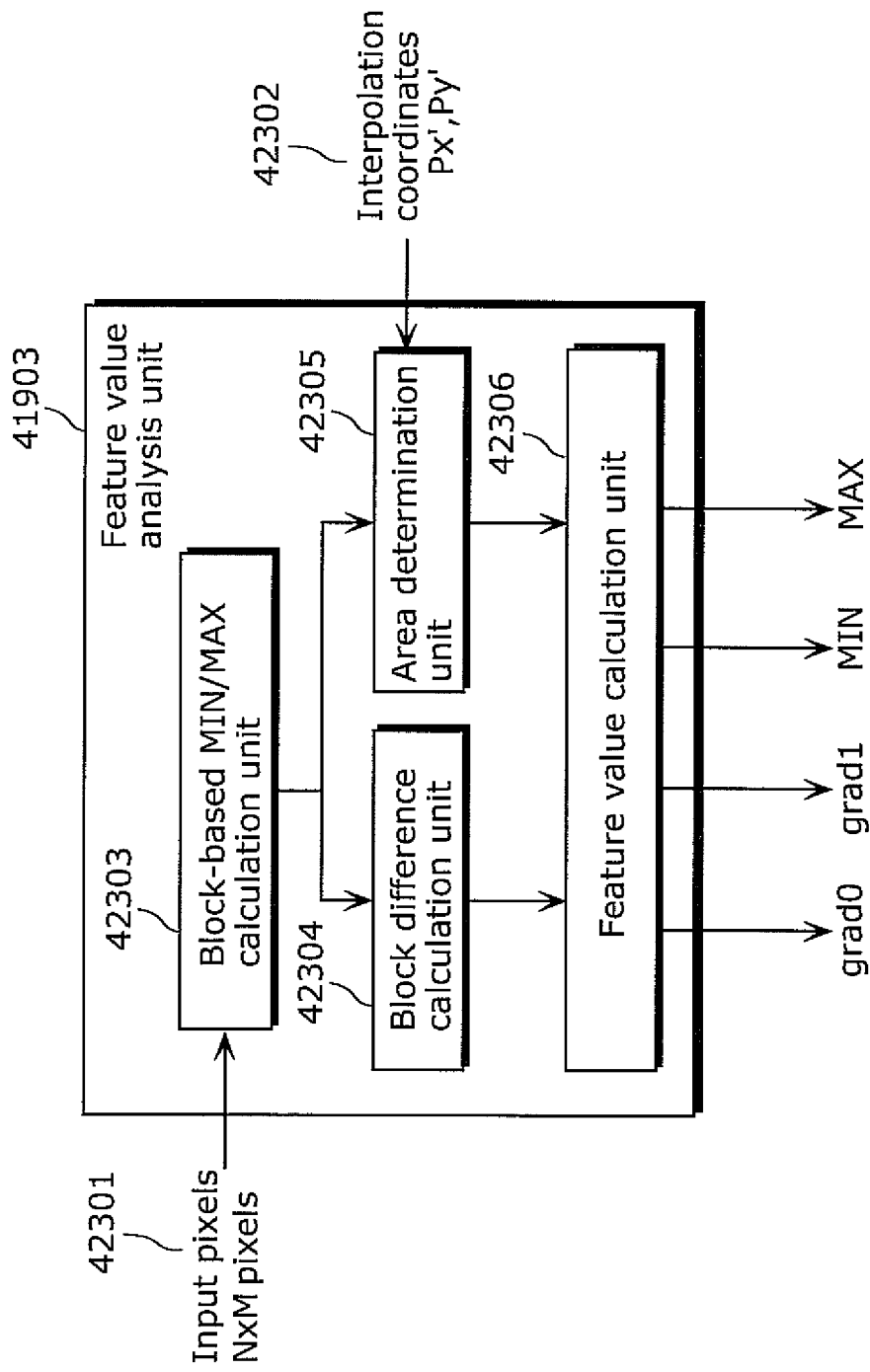
[FIG. 43]

FIG. 43 is a diagram showing a detailed process of a feature value analysis unit 41903 in FIG. 39.

The feature value analysis unit 41903 receives neighboring N×M pixels 42301 of the interpolation position in the input image 101 (FIG. 38) and the second interpolation pixel position px',py' (interpolation coordinates 42302 in FIG. 43) calculated by the white thinning unit 41909, and outputs grad0, grad1, MIN, and MAX as the feature value. It is assumed here that the inputted neighboring N×M pixels are 16 pixels where N=M=4, though the feature value may be calculated using a smaller or larger range.

When 4×4 pixels at the center of 6×6 pixels inputted to the image enlargement unit 1504C are inputted to the feature value analysis unit 41903, the feature value analysis unit 41903 first calculates a maximum value and a minimum value of pixel values of each 2×2 pixel block, in a block-based MIN/MAX calculation unit 42303. As shown in FIG. 20 mentioned earlier, a 2×2 pixel block is a block obtained by dividing 4×4 pixels into nine blocks each having 2×2 pixels. In FIG. 20, each circle indicates a pixel, and each number from 0 to 8 is a block number. Here, the minimum value and the maximum value of each block are denoted by MINn and MAXn (n=0, 1, 2, 3, . . . , 8, which correspond to the block numbers in FIG. 20).

A block difference calculation unit 42304 calculates a difference DIFFn for each block. An expression for calculating DIFFn is given by the Math. A5 mentioned earlier.

An area determination unit 42305 calculates blocks used for calculating MIN and MAX, and DX and DY used for interpolation, from the corrected interpolation coordinates (second interpolation pixel position) px',py'. FIG. 21 mentioned earlier shows relations between 4×4 pixels, px',py', and an interpolation pixel. Since px',py' is a decimal component of the second interpolation pixel position, $0.0 \leq px',py' < 1.0$, and accordingly the position of px',py' is within the diagonally shaded area in FIG. 21.

Depending on which of the areas a, b, c, and d in FIG. 21 px',py' belongs to, MINn and MAXn used for interpolation are changed as shown in FIGS. 22A to 22D. In detail, the diagonally shaded blocks in FIG. 22A indicate MINn and MAXn selected when px',py' belongs to the area a in FIG. 21. The diagonally shaded blocks in FIG. 22B indicate MINn and MAXn selected when px',py' belongs to the area b in FIG. 21. The diagonally shaded blocks in FIG. 22C indicate MINn and MAXn selected when px',py' belongs to the area c in FIG. 21. The diagonally shaded blocks in FIG. 22D indicate MINn and MAXn selected when px',py' belongs to the area d in FIG. 21.

The following Math. C4 is an expression for calculating MI0, MI1, MI2, MI3, MA0, MA1, MA2, MA3, DX, and DY.

(In the Case of the Area a)

$$MI0=MIN0$$

$$MI1=MIN1$$

$$MI2=MIN3$$

$$MI3=MIN4$$

$$MA0=MAX0$$

$$MA1=MAX1$$

$$MA2=MAX3$$

$$MA3=MAX4$$

$$DX=Px'+0.5$$

$$DY=Py'+0.5$$

(In the Case of the Area b)

$$MI0=MIN1$$

$$MI1=MIN2$$

$$MI2=MIN4$$

$$MI3=MIN5$$

$$MA0=MAX1$$

$$MA1=MAX2$$

$$MA2=MAX4$$

$$MA3=MAX5$$

$$DX=Px'-0.5$$

$$DY=Py'+0.5$$

(In the Case of the Area c)

$$MI0=MIN3$$

$$MI1=MIN4$$

$$MI2=MIN6$$

$$MI3=MIN7$$

$$MA0=MAX3$$

$$MA1=MAX4$$

$$MA2=MAX6$$

$$MA3=MAX7$$

$$DX=Px'+0.5$$

$$DY=Py'-0.5$$

(In the Case of the Area d)

$$MI0=MIN4$$

$$MI1=MIN5$$

$$MI2=MIN7$$

$$MI3=MIN8$$

MA0=MAX4

MA1=MAX5

MA2=MAX7

MA3=MAX8

DX=Px'−0.5

DY=Py'−0.5

A feature value calculation unit 42306 calculates grad0, grad1, MIN, and MAX, from DIFFn calculated by the block difference calculation unit 42304 and MI0 to MI3, MA0 to MA3, DX, and DY calculated by the area determination unit 42305.

An expression for this calculation is given by the Math. A7 mentioned earlier.

Though the corrected second interpolation coordinates (second interpolation pixel position) Px',Py' are inputted for the feature value analysis here, the decimal component Px,Py of the first interpolation coordinates (first interpolation pixel position) before the correction may instead be inputted.

(Correction Amount Calculation Unit)

Figure 44:
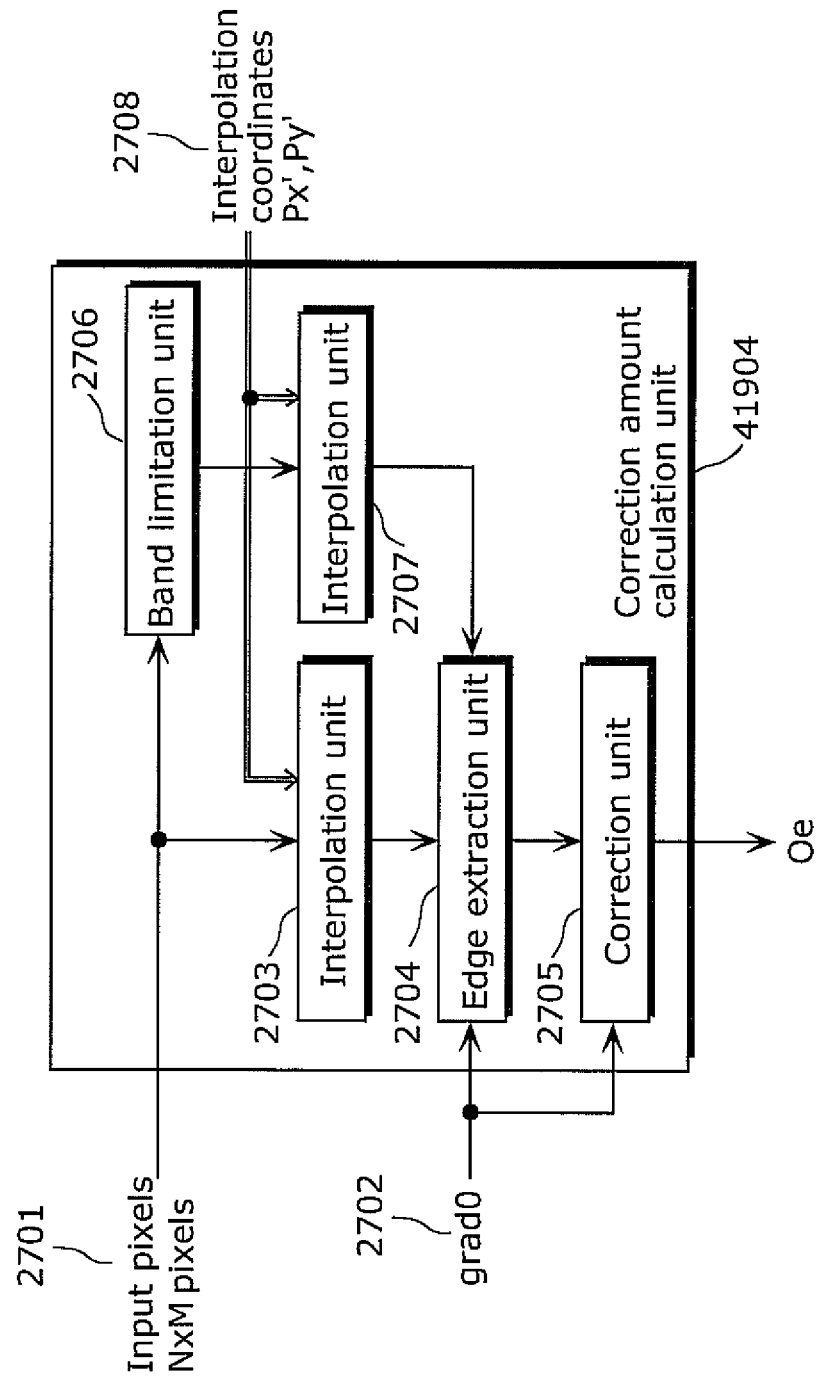
[FIG. 44]

FIG. 44 is a diagram showing a detailed process of a correction amount calculation unit 41904 in FIG. 39 (see FIG. 23).

An interpolation unit 2703 and an interpolation unit 2707 calculate pixel values of positions away from the corrected interpolation position (second interpolation pixel position) px',py' by ±1 pixel, by interpolation. FIG. 24 mentioned earlier shows a pixel position of the interpolation position px', py', where 4×4 input pixel values are denoted by v00 to v33. The positions away from the pixel position 2308 of the interpolation position px',py' as the second interpolation pixel position by ±1 pixel are the eight positions i00, i01, i02, i10, i12, i20, i21, and i22 shown in FIG. 25. The interpolation unit 2703 calculates pixel values of nine points including the position px',py', using the inputted 4×4 pixels. The interpolation unit 2707 calculates pixel values of nine points including the position px',py' by interpolation, using the 4×4 pixels band-limited by a band limitation unit 2706.

As described above, in the correction amount calculation unit 41904, the edge component is calculated using the corrected second pixel position (second interpolation pixel position), so that thickness adjustment can be performed according to edge brightness. This allows the edge correction amount to be changed in balance between a white portion and a black portion, with it being possible to control the thickness.

(Interpolation Unit)

An interpolation unit 41905 (FIG. 39) interpolates the pixel value using the inputted 6×6 pixels 41901 and a decimal position Px,Py 41902 of the first pixel position (first interpolation pixel position) before the correction, and outputs an interpolation image OL.

(Re-Correction Unit)

A re-correction unit 41907 corrects the pixel value using a pixel value O (first high-resolution image) synthesized by a synthesis unit 41906 and the feature value including grad1, MIN, and MAX calculated by the feature value analysis unit 41903, and outputs a corrected pixel value O' (second high-resolution image).

An expression for calculating the output value O is given by the Math. A9 mentioned earlier.

In the Math. A9, GAIN and LIMIT are parameters calculated from grad1. FIG. 27 shows the relation between grad1 and GAIN. In FIG. 27, the gain is increased when grad1 is small, and decreased as grad1 increases.

FIG. 28 shows the relation between grad1 and LIMIT. In FIG. 28, LIMIT is increased when grad1 is small, and decreased when grad1 is large.

As noted earlier with reference to FIGS. 27 and 28, the re-correction unit 41907 may be set to use a constant (at least one of GAIN and LIMIT) corresponding to the feature value. For instance, the re-correction unit 41907 may be set to use LIMIT corresponding to the feature value. According to such setting, in a portion where grad1 is large, that is, in a portion including a strong edge component, clipping by LIMIT is strict (strong), as a result of which a sharp image is generated. In a portion having a small amplitude, on the other hand, clipping is not so strict, and therefore unnaturalness caused by cutting shoot can be suppressed.

As described above, with the image enlargement apparatus 108C (the image enlargement unit 1504C, the image enlargement apparatus 1500 in the embodiment C) in the embodiment C, a natural image having sharp edges with no strong shoot (1208 in FIG. 37) can be generated. Moreover, by calculating the feature value and the correction amount using the corrected second interpolation pixel position, a white portion can be thinned as shown in the "after correction" (the signal 1208 in the right column) in (d) in FIG. 37. This alleviates a phenomenon occurring when black and white are thickened to the same width as a result of performing normal edge gradient correction, i.e., an illusory phenomenon that white appears thicker, with it being possible to maintain a visual balance of black and white after enlargement.

In summary, when enlarging a low-resolution image (the input image 101) to a high-resolution image (the output image 107) and displaying the high-resolution image, there is a problem that edge sharpening (edge enhancement by correction amount addition in the synthesis unit 105) performed together with the enlargement causes an illusory phenomenon that white appears thicker (see FIGS. 49, 50, 36, 37, and the like). In view of this, an image enlargement apparatus (the image enlargement apparatus 108C, the image enlargement unit 1504C) that receives a low-resolution input image and outputs a high-resolution output image includes: a function (the feature value analysis unit 102) that analyzes a feature value of the input image and generates a feature value for the number of pixels of the high-resolution image; a function (the interpolation pixel position generation unit 110) that calculates a first interpolation pixel position from an enlargement factor; a function (the white thinning unit 109) that generates a second interpolation pixel position corrected using a pixel value difference between a plurality of adjacent pixels (see FIG. 41) of the first interpolation pixel position, from the input image and the first interpolation pixel position; a function (the correction amount calculation unit 103) that receives the low-resolution input image and the corrected second interpolation pixel position, and calculates and outputs an edge correction amount for the number of pixels of the high-resolution image on the basis of the feature value; a function (the interpolation unit 104) that generates an enlarged image (interpolation image) by interpolation using the first interpolation pixel position; a function (the synthesis unit 105) that synthesizes the interpolation image and the correction amount; and a function (the re-correction unit 106) that receives the feature value and a synthesized pixel value (first high-resolution image), and re-corrects the pixel value to perform correction according to the input image.

An image enlargement apparatus, an image enlargement method, and a program according to the embodiments can be applied in the case where an output device has a higher resolution than an inputted image. For example, the image enlargement apparatus, the image enlargement method, and the program are applicable when a DVD is displayed on a high-definition television, when a low-resolution image is printed in enlargement by a printer or the like having a high-resolution output function, and when digital zooming is performed in a digital camera or a digital video.

In these applications, it is possible to provide a sharp image by suppressing blurriness caused by enlargement.

Moreover, it is possible to alleviate a visual phenomenon that white appears thicker when enlargement and edge enhancement are performed simultaneously, so that a visually balanced image can be provided.

[Reference Signs List]
101 Input image
102, 1803, 41903 Feature value analysis unit
103 1804, 41904 Correction amount calculation unit
104, 1805, 2303, 2307, 2703, 2707, 41905 Interpolation unit
105, 1806, 41906 Synthesis unit
106, 1807, 41907 Re-correction unit
107 Output image
108, 1504 Image enlargement unit
109, 41909 White thinning unit
110 Interpolation pixel position generation unit
201 Input unit
202 Tuner
203 External terminal
204 Memory card
205 Memory
206 Processor
207 Decoding unit
208 Display unit
209 Video driver
210 Hard disk
211 Display device
1501, 1601 Interpolation position
1502, 1602 Pixel selection unit
1503, 1603 Decimal position calculation unit
1801, 41901 Input pixels (6×6 pixels)
1802, 1902, 2708, 41902 Interpolation coordinates
1808, 41908 Output pixel
1901, 2001, 2301, 2701, 42301 Input pixels (N×M pixels)
1903, 42303 Block-based MIN/MAX calculation unit
1904, 42304 Block difference calculation unit
1905, 42305 Area determination unit
1906, 42306 Feature value calculation unit
2002 Interpolation coordinates Px,Py
2003 Gradient direction determination unit
2004 Interpolation position correction amount calculation unit
2005 Interpolation position correction unit
2006 Corrected interpolation coordinates Px',Py'
2304, 2704 Edge extraction unit
2305, 2705 Correction unit
2306, 2706 Band limitation unit
2702 grad0
2903 Enhancement coefficient determination unit
2904 Edge enhanced image generation unit
2905 Interpolation pixel generation unit
2906 Comparison unit
2907 Weighting synthesis unit
42302 Interpolation coordinates Px',Py'

The invention claimed is:

1. An image enlargement apparatus comprising:
an interpolation unit configured to generate, from an input image, an interpolation image having a resolution higher than a resolution of the input image;
a feature value obtainment unit configured to obtain a feature value from the input image;
a correction unit configured to correct an edge of the interpolation image using the feature value so as to perform a first correction; and
a re-correction unit configured to correct again the interpolation image corrected by the correction unit using the feature value so as to perform a second correction.

2. An image enlargement method comprising:
generating, from an input image, an interpolation image having a resolution higher than a resolution of the input image;
obtaining a feature value from the input image;
correcting an edge of the interpolation image using the feature value so as to perform a first correction; and
correcting again the interpolation image corrected in the correcting of the edge using the feature value so as to perform a second correction.

3. The image enlargement apparatus according to claim 1, wherein the feature value obtainment unit is configured to analyze a feature of the input image, and output the feature value for each of pixels of the interpolation image.

4. The image enlargement apparatus according to claim 1, wherein the feature value includes a gradient amount that is obtained from an extent of a gradient of pixel values of pixels in an interpolation pixel position and neighboring positions of the interpolation pixel position.

5. The image enlargement apparatus according to claim 1, wherein the feature value includes an upper threshold value and a lower threshold value for a pixel of the interpolation image outputted as an interpolation pixel.

6. The image enlargement apparatus according to claim 1, further comprising
a correction amount obtainment unit configured to obtain a correction amount for the interpolation image based on the feature value,
wherein the correction unit is configured to correct an edge of the interpolation image using the correction amount obtained by the correction amount obtainment unit.

7. The image enlargement apparatus according to claim 6, wherein the correction amount obtainment unit is configured to obtain the correction amount based on the feature value and the input image.

8. The image enlargement apparatus according to claim 6, wherein the correction unit is configured to synthesize the correction amount obtained by the correction amount obtainment unit and the interpolation image.

* * * * *